(12) United States Patent
Maeto

(10) Patent No.: US 12,223,986 B1
(45) Date of Patent: Feb. 11, 2025

(54) MAGNETIC DISK DEVICE

(71) Applicants: Kabushiki Kaisha Toshiba, Tokyo (JP); Toshiba Electronic Devices & Storage Corporation, Tokyo (JP)

(72) Inventor: Nobuhiro Maeto, Yokohama Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 18/524,890

(22) Filed: Nov. 30, 2023

(30) Foreign Application Priority Data

Sep. 14, 2023 (JP) .................................. 2023-149092

(51) Int. Cl.
- *G11B 5/09* (2006.01)
- *G11B 5/55* (2006.01)
- *G11B 20/12* (2006.01)

(52) U.S. Cl.
CPC .............. *G11B 5/09* (2013.01); *G11B 5/5547* (2013.01); *G11B 20/1217* (2013.01); *G11B 2020/1238* (2013.01)

(58) Field of Classification Search
None
See application file for complete search history.

(56) References Cited

U.S. PATENT DOCUMENTS

| | | | | |
|---|---|---|---|---|
| 4,589,037 | A * | 5/1986 | Jen ..................... | G11B 5/59627 360/77.04 |
| 9,123,356 | B2 * | 9/2015 | Sankaranarayanan ... | G11B 5/02 |
| 9,443,551 | B1 * | 9/2016 | Varnica ................. | G11B 5/012 |
| 10,224,063 | B1 | 3/2019 | Varnica et al. | |
| 10,658,004 | B2 * | 5/2020 | Kawabe ................ | G11B 5/012 |
| 11,532,321 | B1 * | 12/2022 | Maeto ................... | G11B 5/012 |
| 11,887,633 | B2 * | 1/2024 | Kawabe ............ | G11B 5/59627 |
| 11,929,094 | B1 * | 3/2024 | Maruyama ......... | G11B 20/1879 |
| 11,984,142 | B2 * | 5/2024 | Ogawa ............... | G11B 20/1833 |
| 12,027,180 | B1 * | 7/2024 | Uchida .................... | G11B 5/09 |
| 2015/0015983 | A1 * | 1/2015 | Jeong ............... | G11B 20/10212 360/45 |
| 2021/0201940 | A1 * | 7/2021 | Isokawa ........... | G11B 20/10027 |
| 2023/0260540 | A1 * | 8/2023 | Maeto ................ | G11B 5/59627 360/260 |
| 2023/0306991 | A1 * | 9/2023 | Maruyama ............. | G11B 20/18 |

FOREIGN PATENT DOCUMENTS

| | | |
|---|---|---|
| JP | H10-49996 A | 2/1998 |
| JP | 2013-101734 A | 5/2013 |

* cited by examiner

*Primary Examiner* — Fred Tzeng
(74) *Attorney, Agent, or Firm* — Kim & Stewart LLP

(57) ABSTRACT

According to one embodiment, a magnetic disk device includes a disk, a write head, and a write processing unit. The write processing unit executes first write processing of writing data to a first segment of a first data sector in a first data track. The write processing unit then executes second write processing of writing data to a first segment of a second data sector in the first data track. The write processing unit then executes third write processing of writing data to a second segment of the first data sector in a second data track.

20 Claims, 31 Drawing Sheets

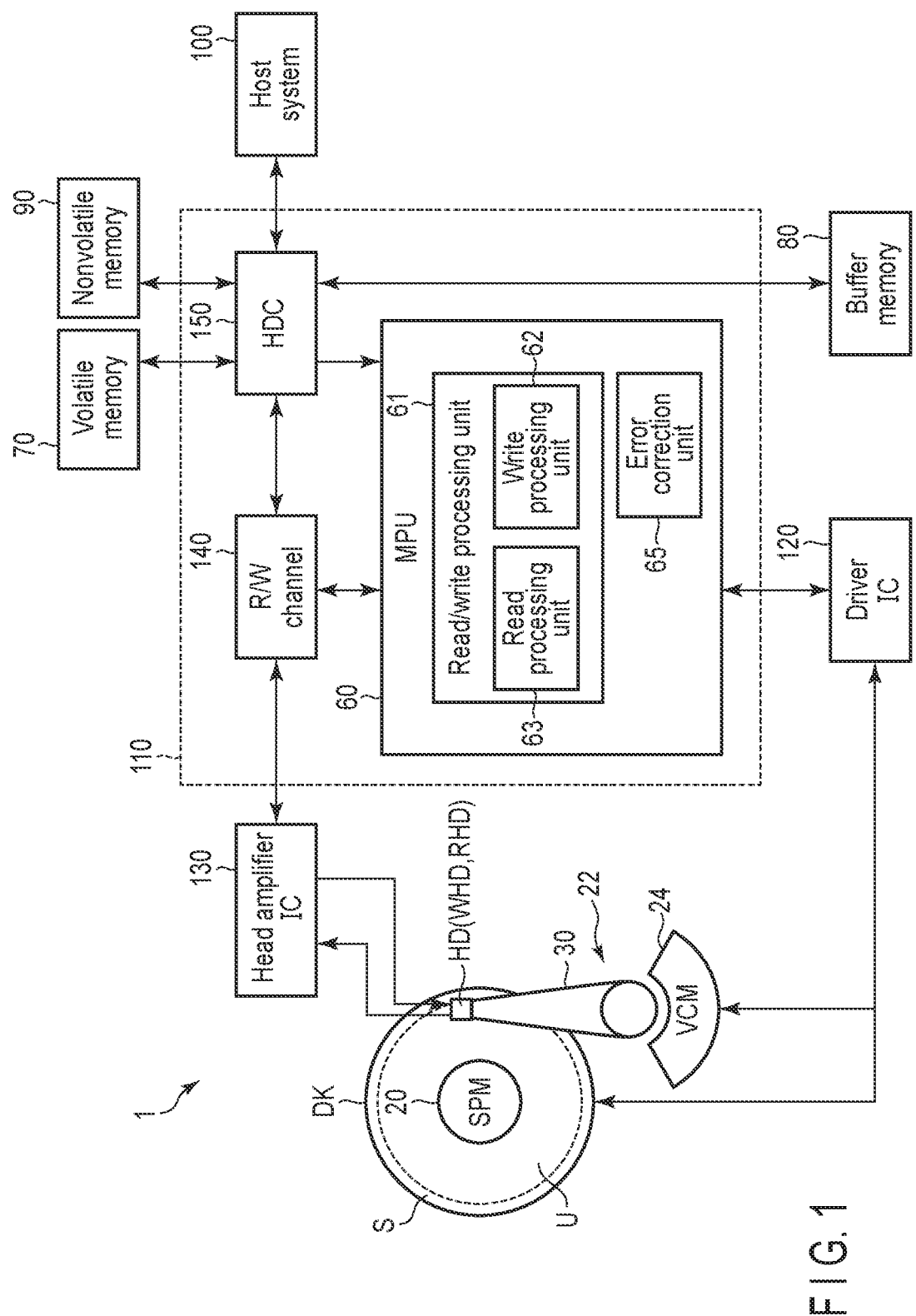
F I G. 1

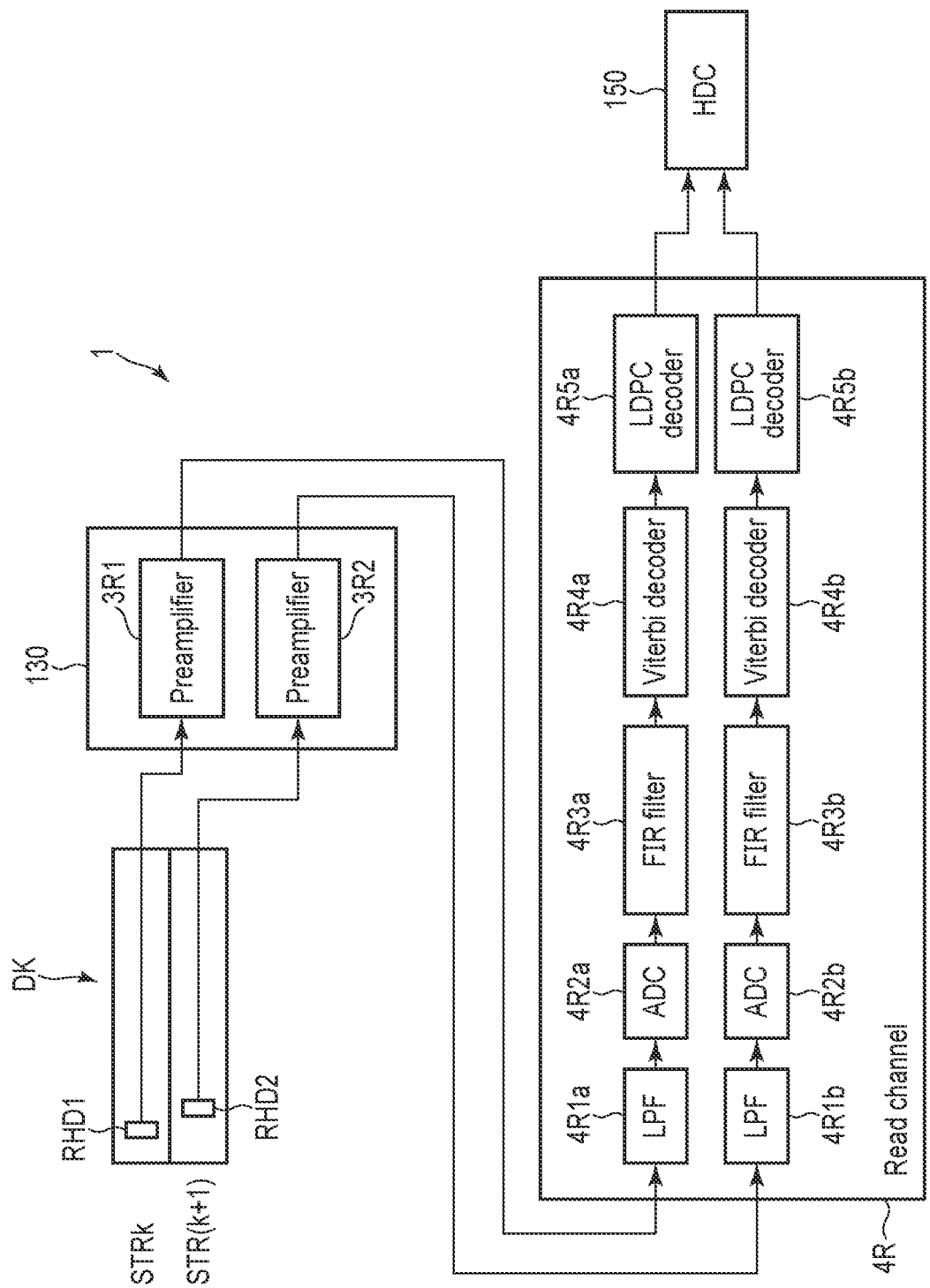
F I G. 10

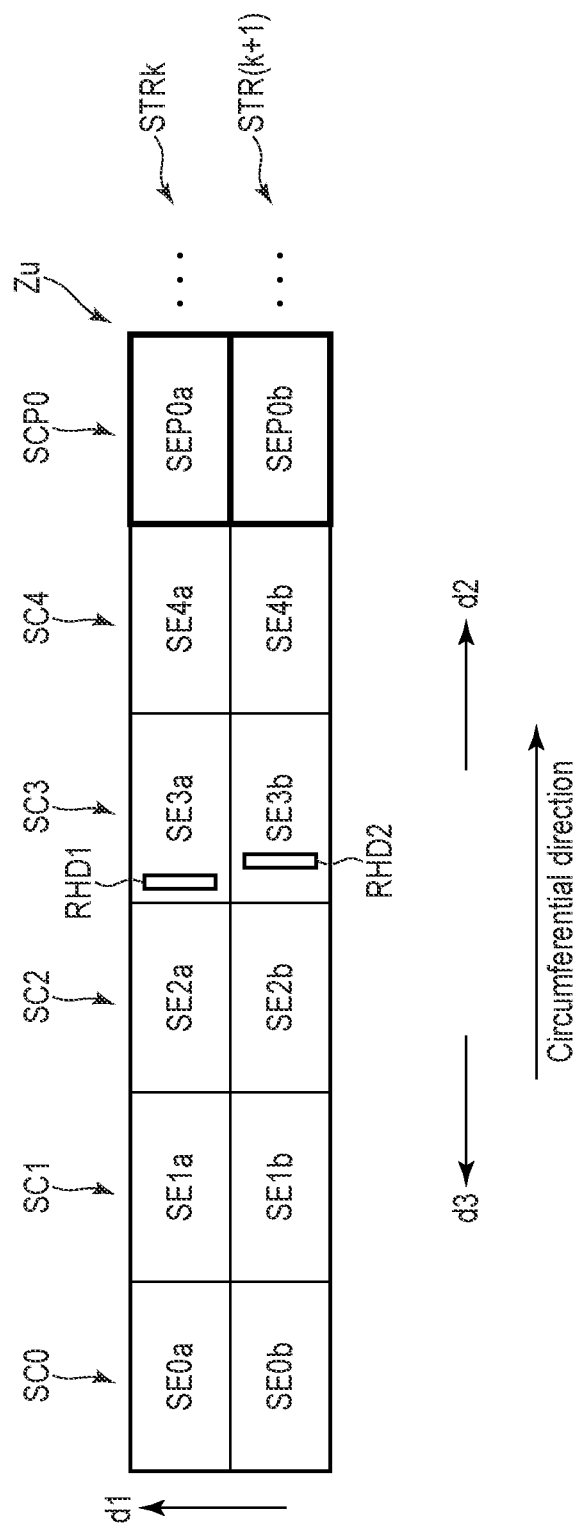
F I G. 11

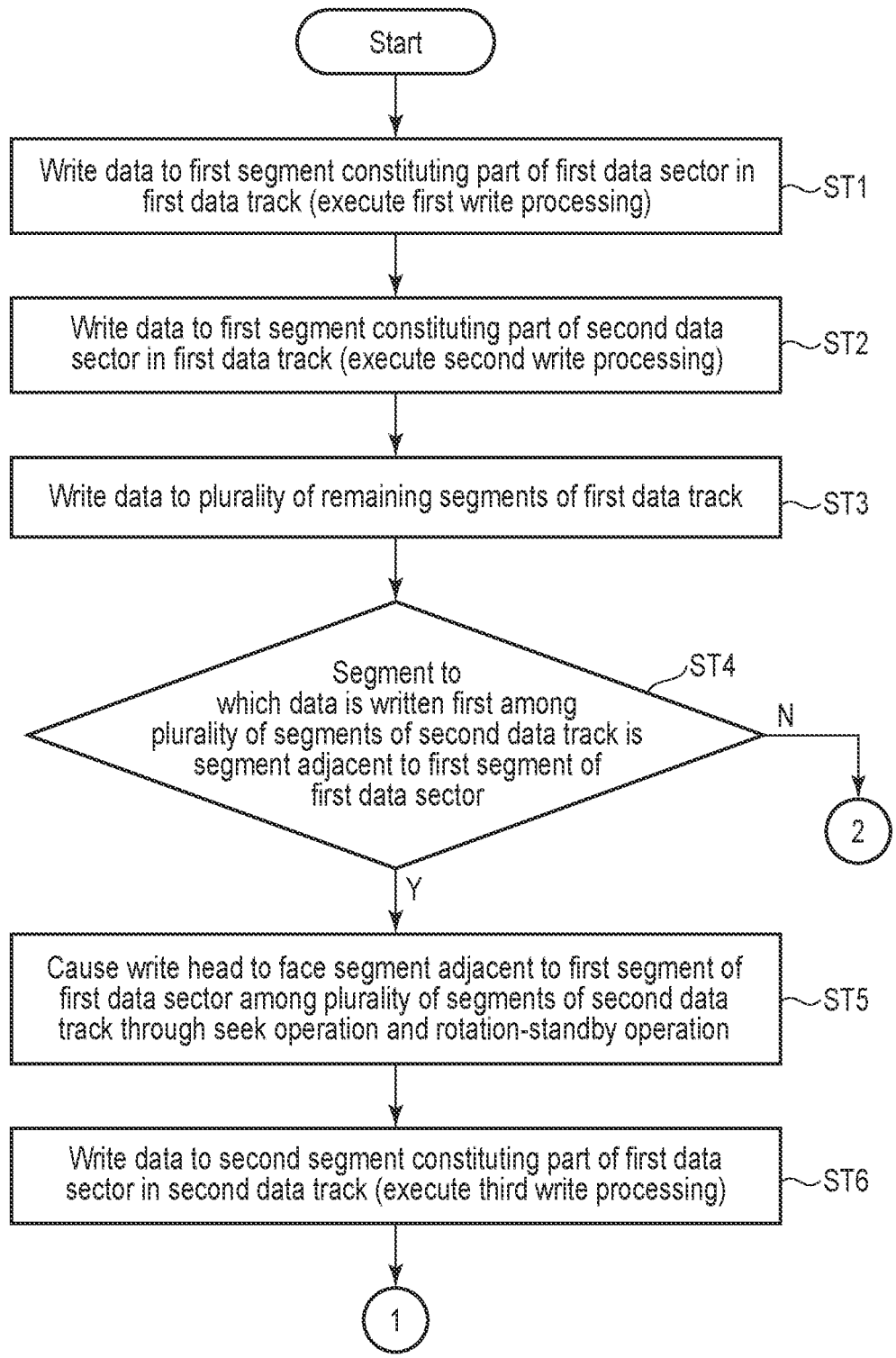
F I G. 12

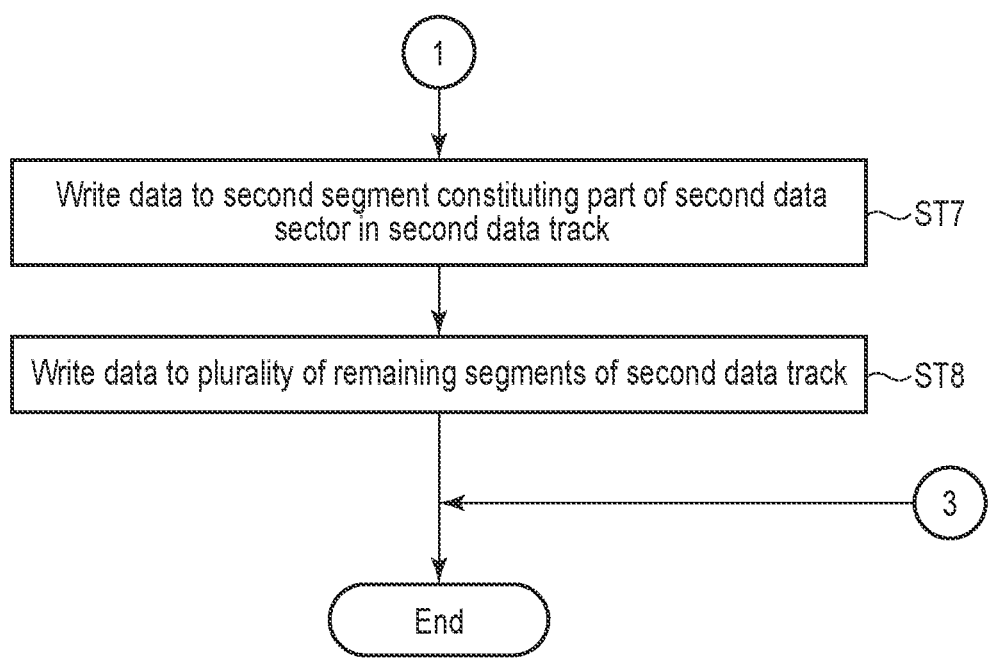
F I G. 13

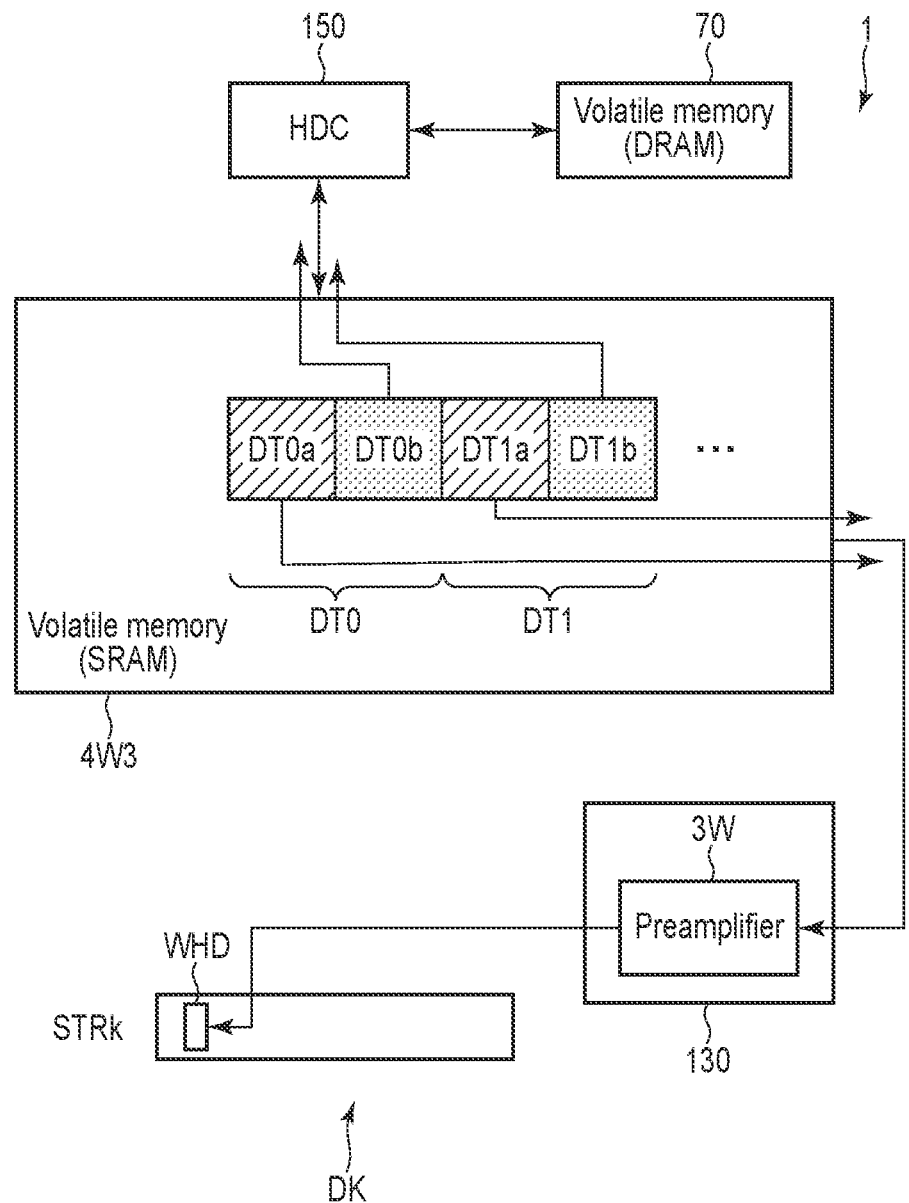
F I G. 15

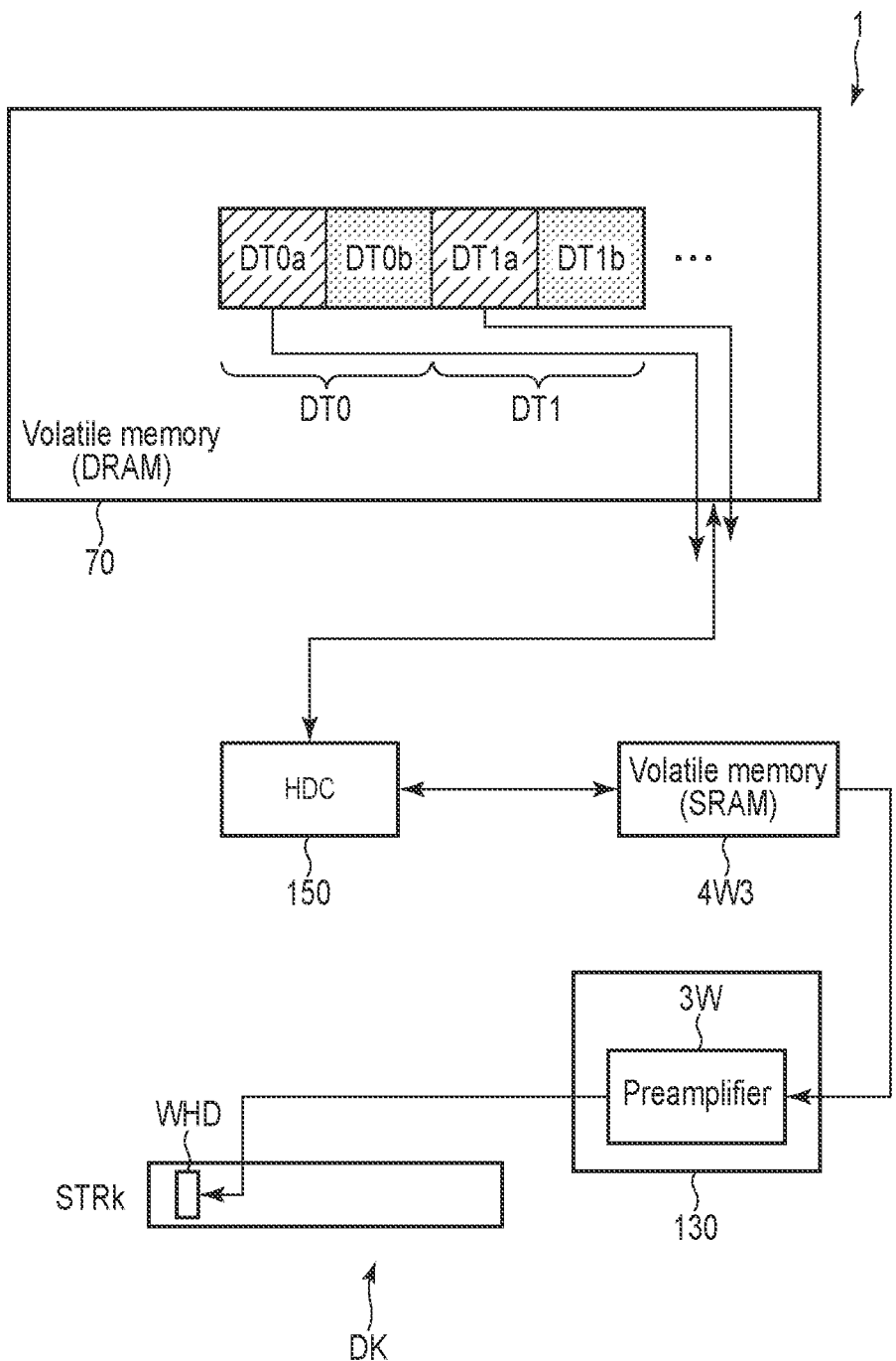
F I G. 16

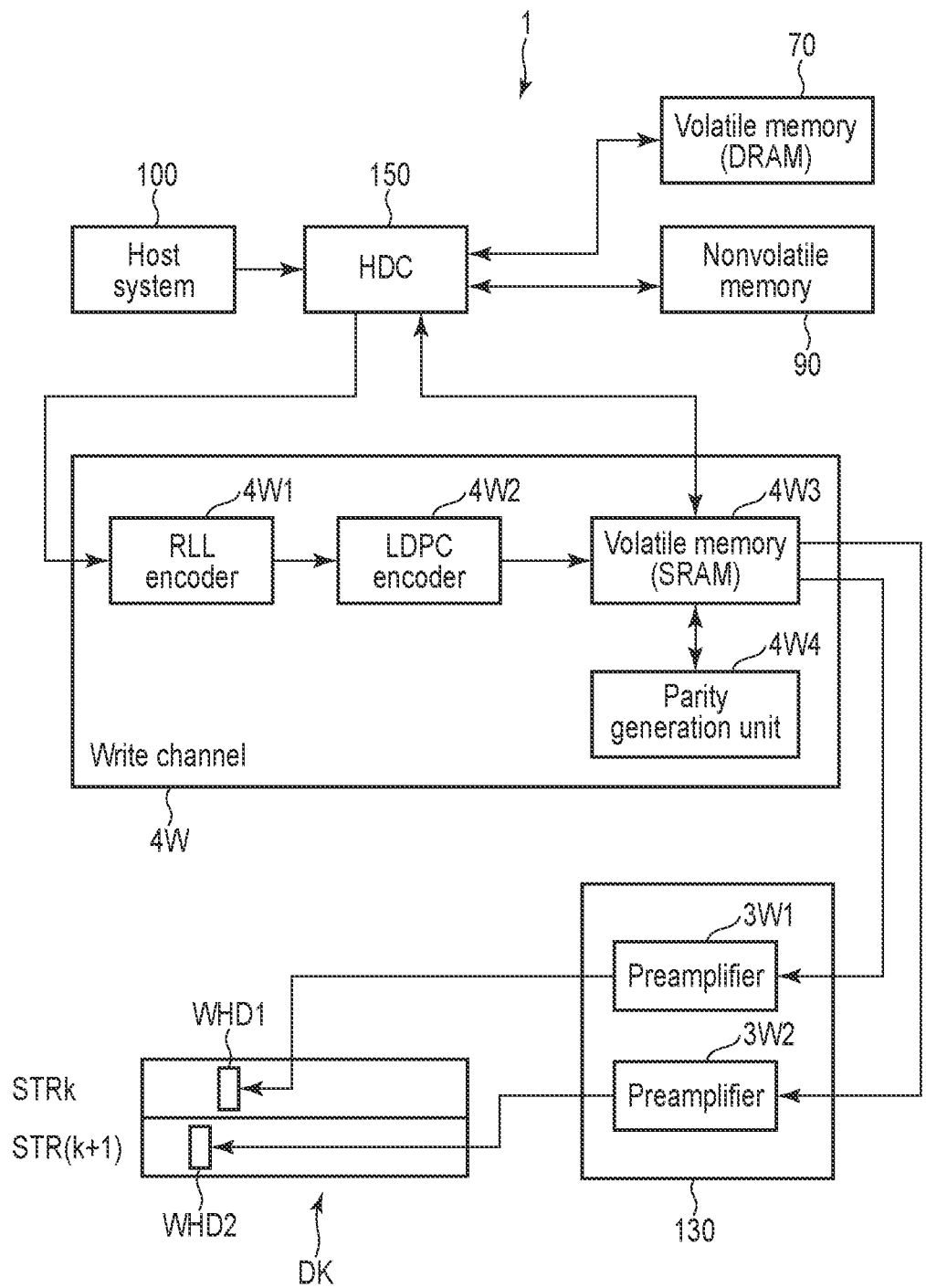
F I G. 17

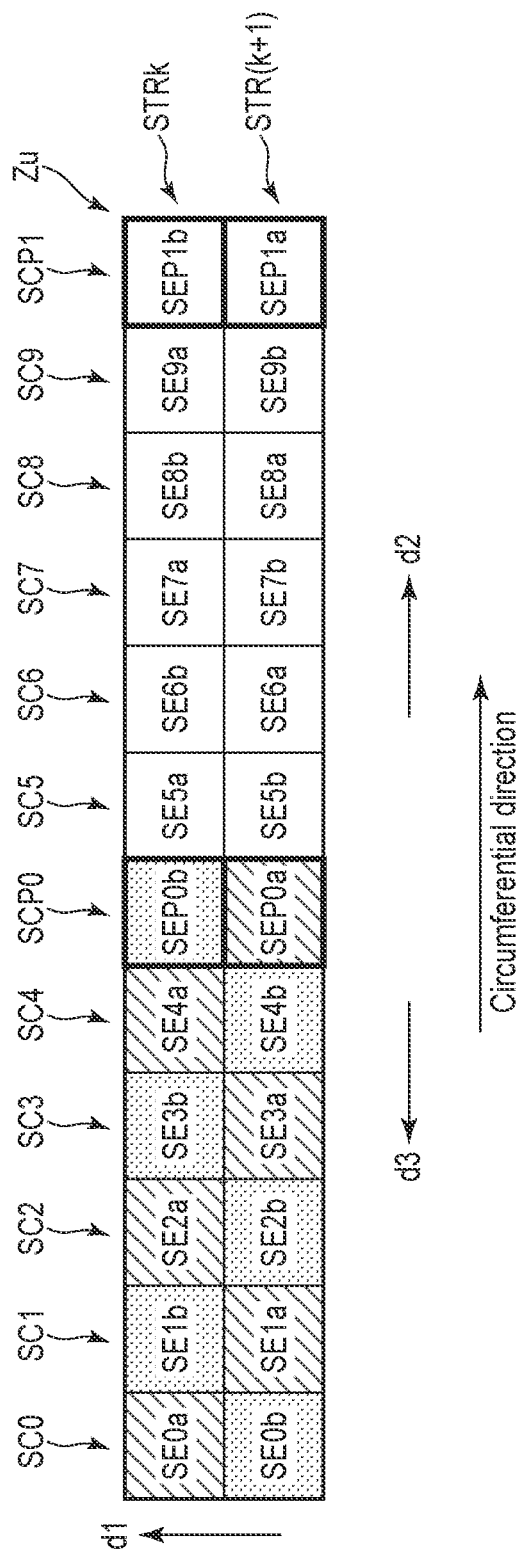
F I G. 18

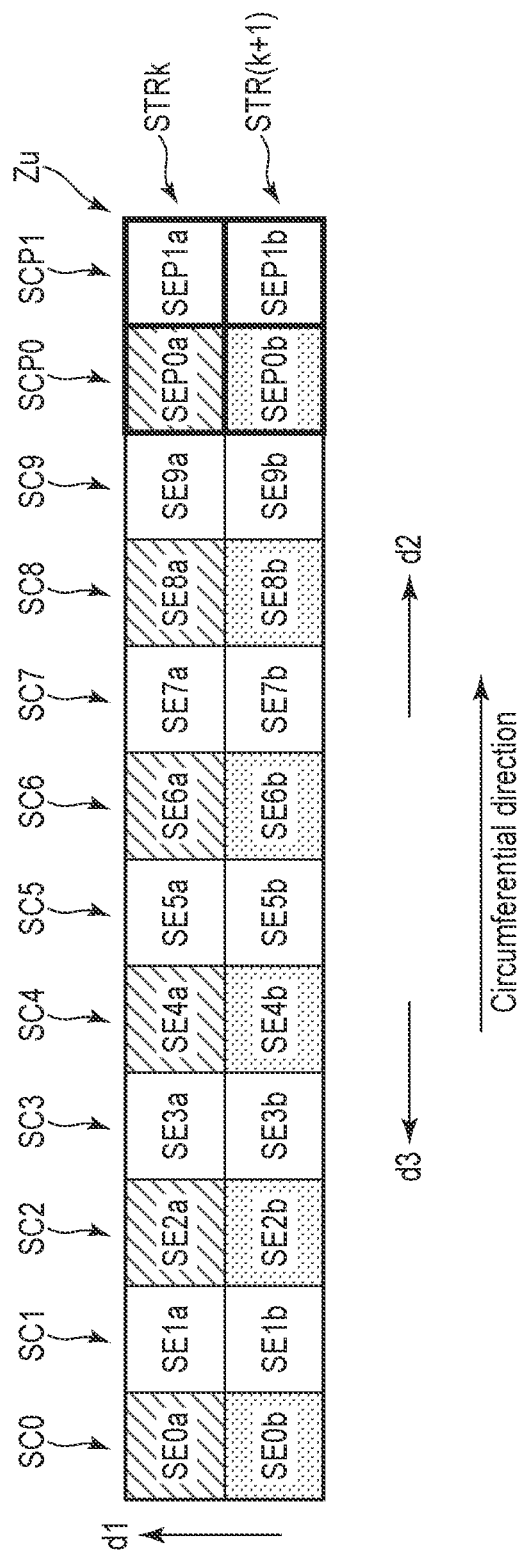
F I G. 20

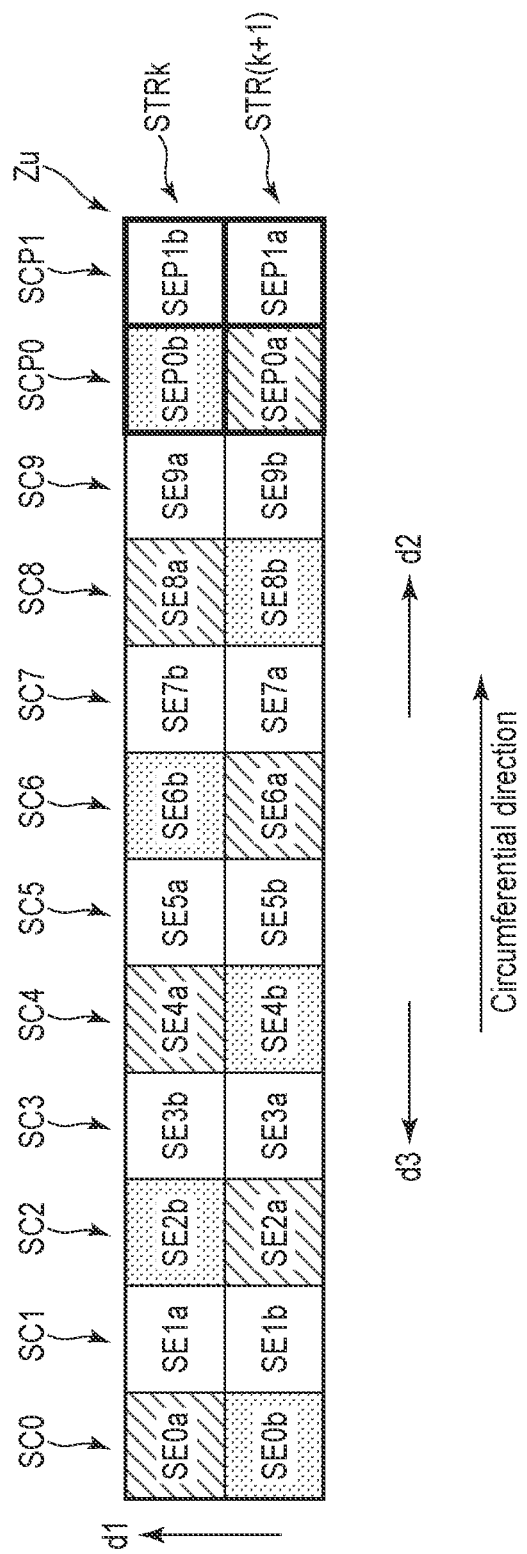
F I G. 21

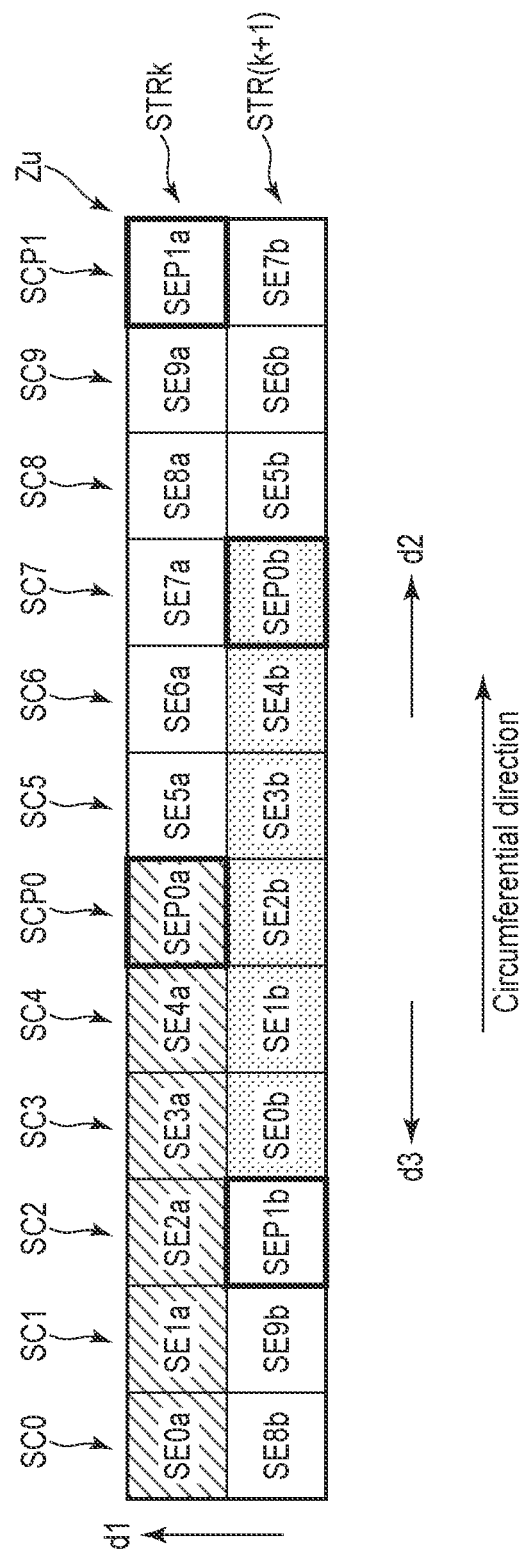
F I G. 22

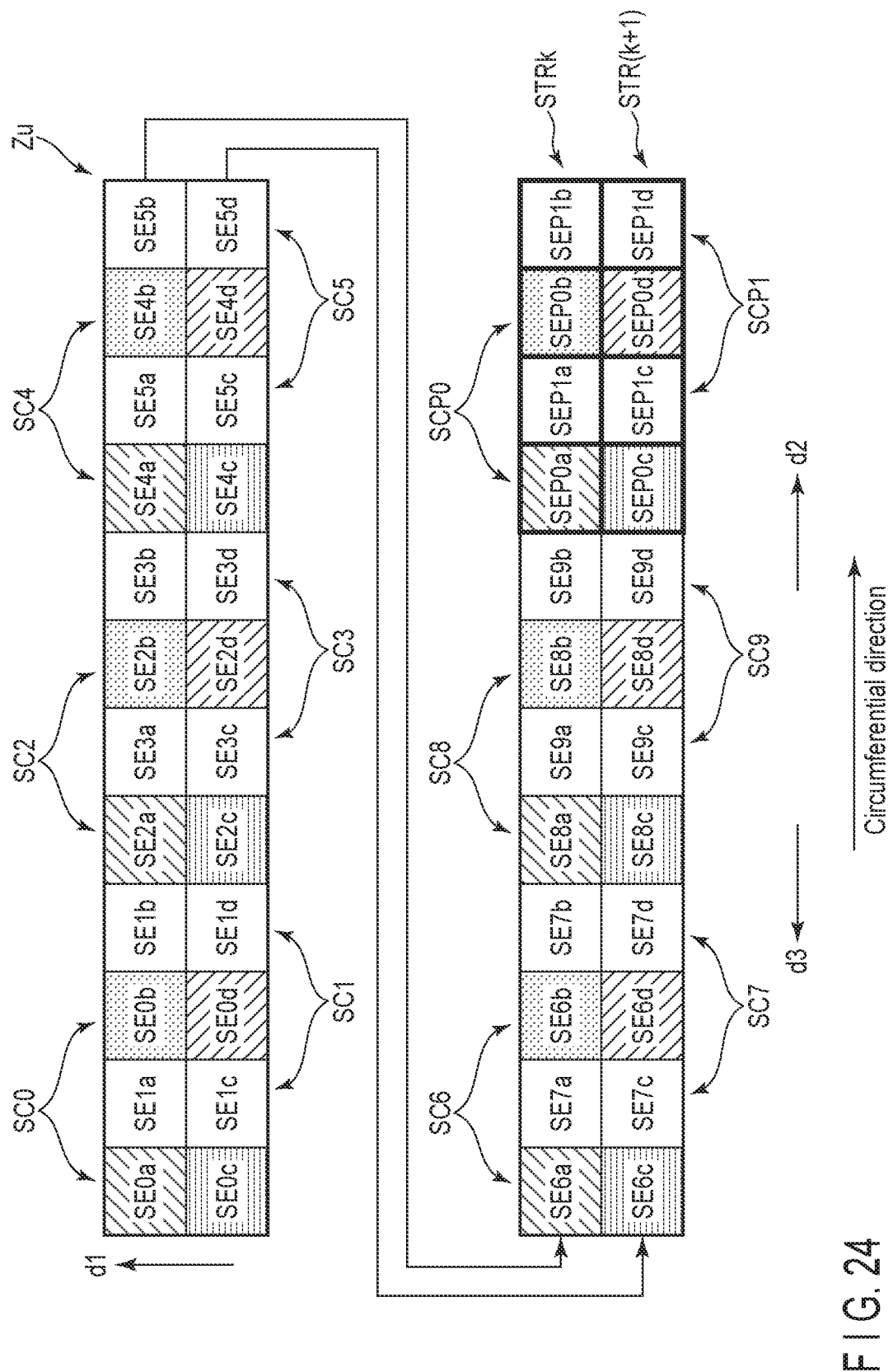
F I G. 24

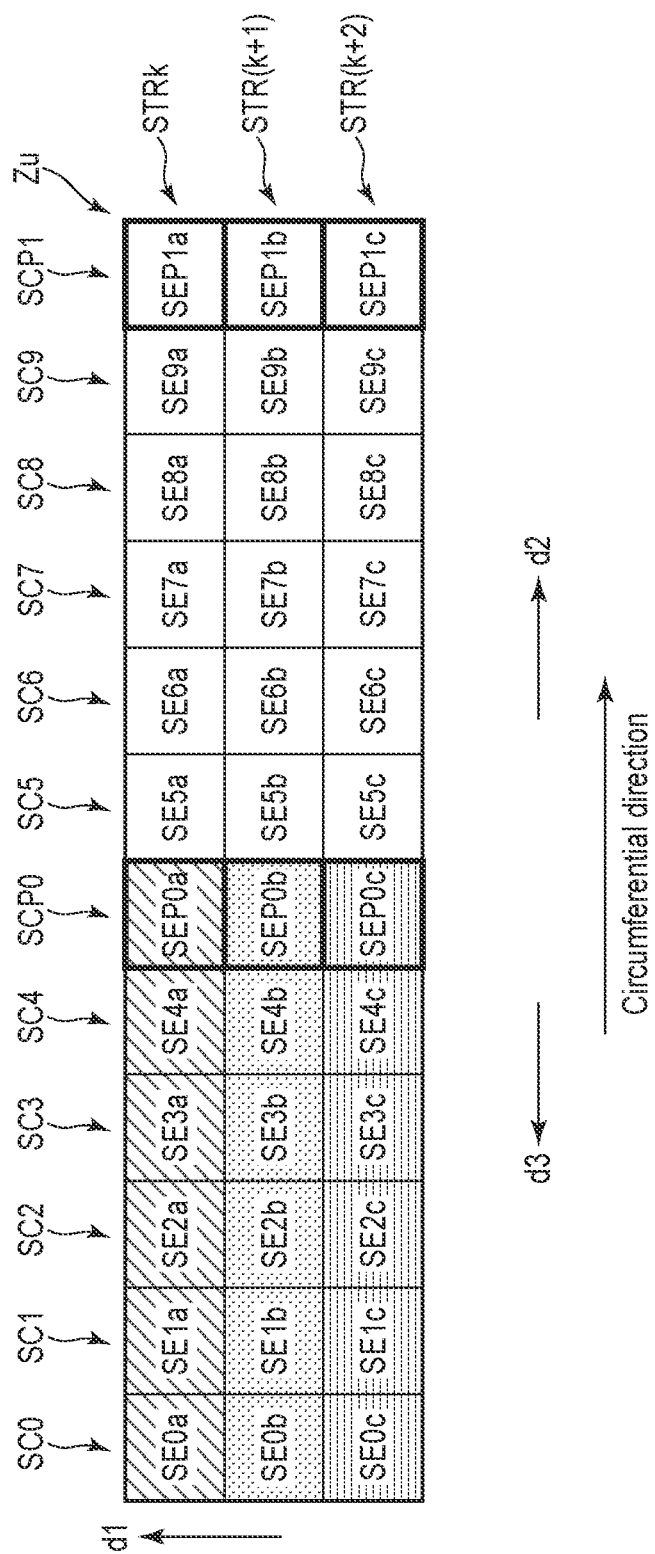
F I G. 27

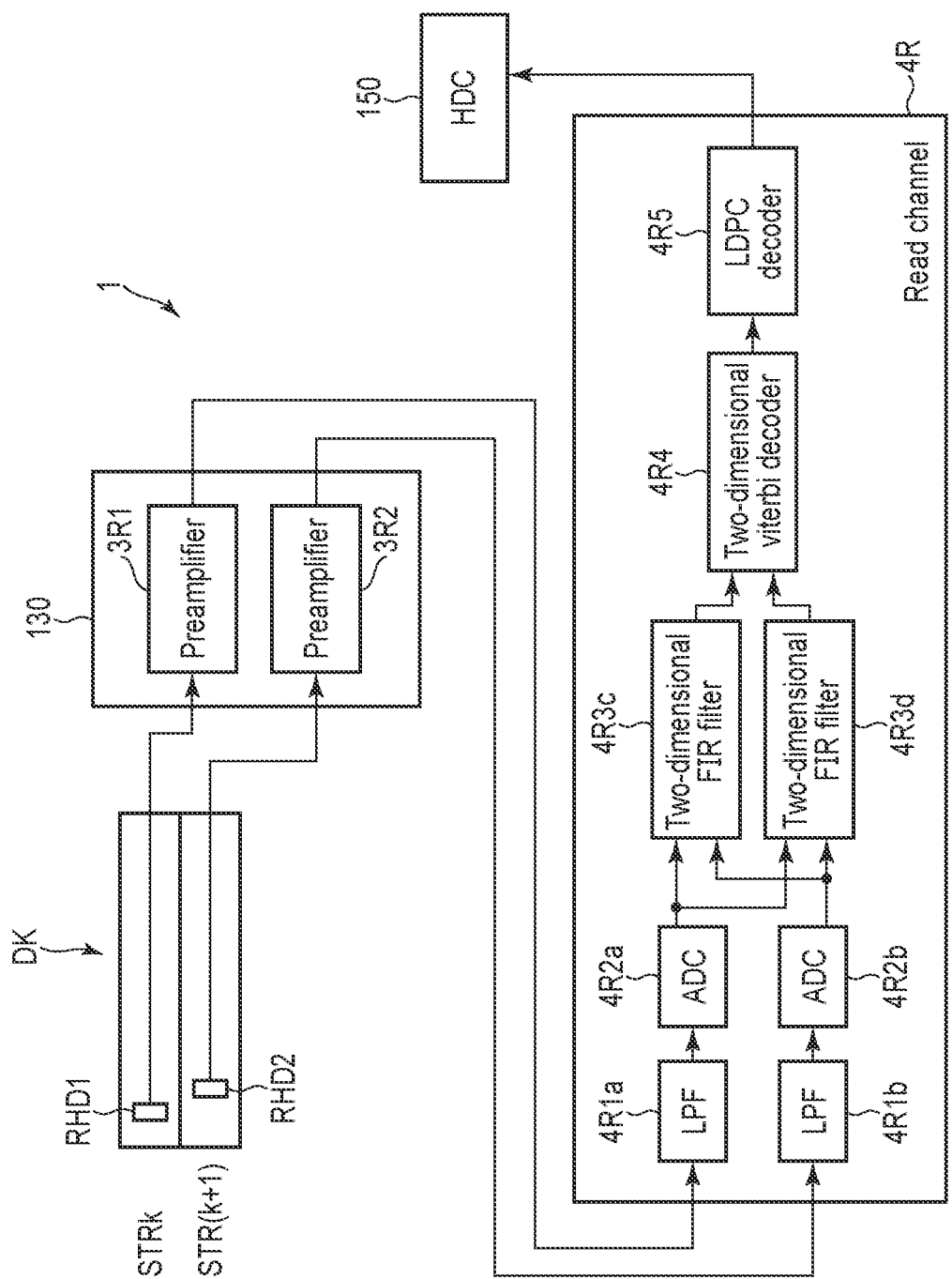
F I G. 28

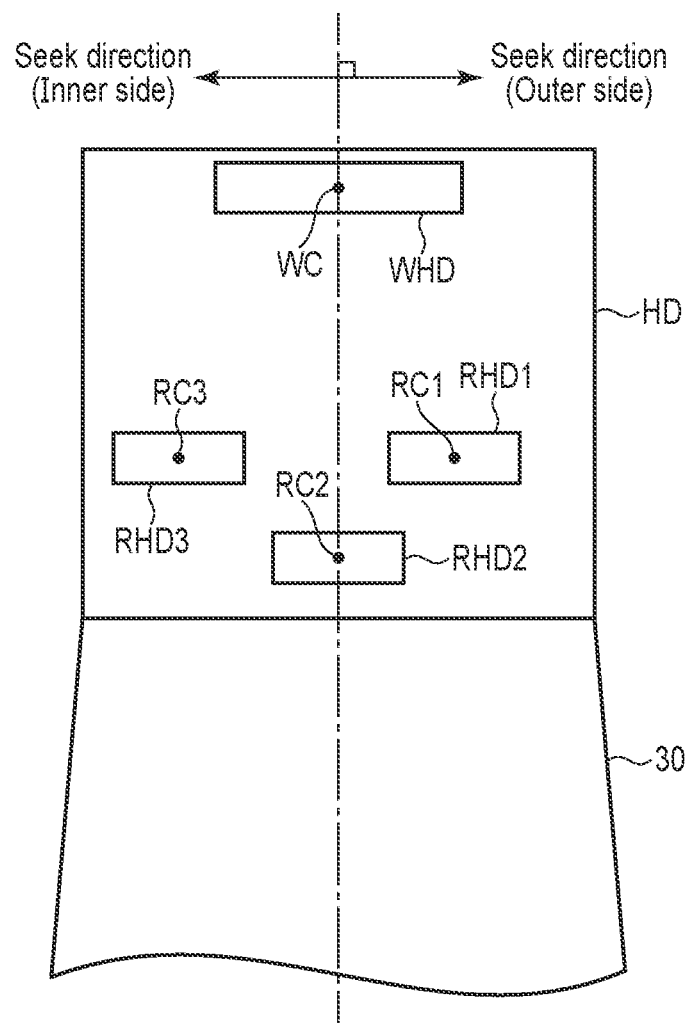
F I G. 30

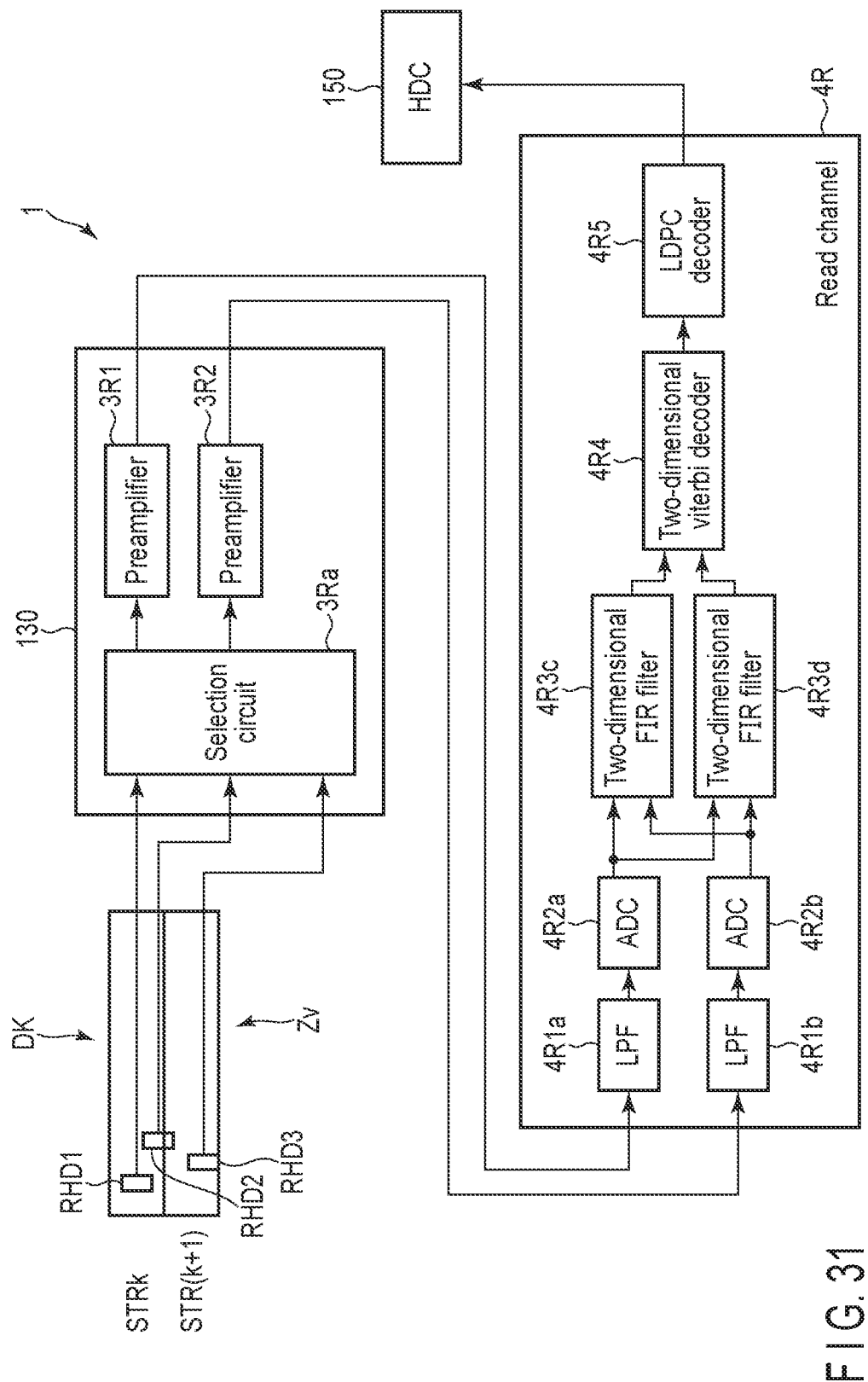
F I G. 31

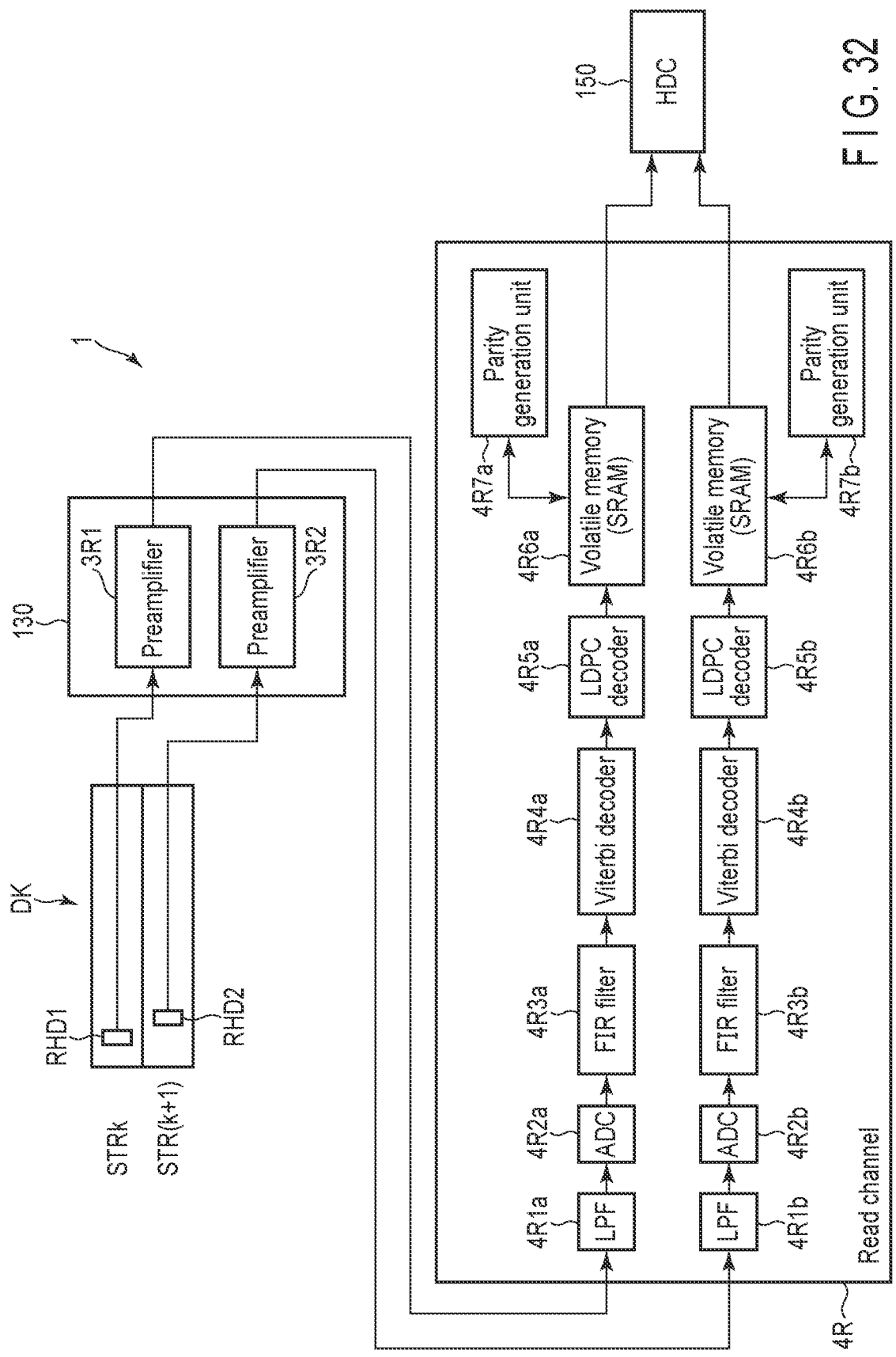
F I G. 32

MAGNETIC DISK DEVICE

CROSS-REFERENCE TO RELATED APPLICATIONS

This application is based upon and claims the benefit of priority from Japanese Patent Application No. 2023-149092, filed Sep. 14, 2023, the entire contents of which are incorporated herein by reference.

FIELD

Embodiments described herein relate generally to a magnetic disk device.

BACKGROUND

As a magnetic disk device, a conventional magnetic recording (CMR) (or a conventional recording) magnetic disk device that performs write on a plurality of tracks at intervals in a radial direction of a disk, a shingled recording (shingled magnetic recording (SMR), or shingled write recording (SWR)) magnetic disk device that performs overwrite on a plurality of tracks in a radial direction of a disk, and a hybrid recording magnetic disk device that selects the conventional magnetic recording mode and the shingled magnetic recording mode and executes the write are known.

BRIEF SUMMARY OF THE INVENTION

The present disclosure presents one or more magnetic disk devices to address one or more issues in conventional magnetic recording. Specifically, a magnetic disk device comprises: a disk that includes a plurality of data tracks including a first data track and a second data track in a recording layer; a write head that writes data to the recording layer of the disk; and a write processing unit that is capable of executing write processing of writing data to the recording layer. The write processing unit executes first write processing of writing data to a first segment constituting a part of a first data sector in the first data track, executes second write processing of writing data to the first segment constituting a part of a second data sector in the first data track after the first write processing is executed, and executes third write processing of writing data to a second segment constituting a part of the first data sector in the second data track after the second write processing is executed.

Another magnetic disk device comprises: a disk that includes a plurality of data tracks including a first data track and a second data track in a recording layer; a first read head, a second read head, and a third read head that each reads data from the recording layer of the disk; an arm that supports the first to third read heads; an actuator that moves the arm; and a read processing unit that is capable of executing read processing of reading data from the recording layer. The first data track includes a first segment constituting a part of a first data sector, the second data track includes a second segment that constitutes a part of the first data sector and being adjacent to the first segment in a radial direction. The read processing unit drives the actuator and controls seek operation of seeking the first to third read heads to move the first read head to a position facing the first data track, selects a first selection read head that is the first read head and a second selection read head that is a read head closest to the second data track of the second and third read heads according to a skew angle of the first read head, and simultaneously reads data corresponding to the first segment of the first data track and data corresponding to the second segment of the second data track by using the first and second selection read heads.

BRIEF DESCRIPTION OF THE DRAWINGS

FIG. 1 is a block diagram illustrating a configuration of a magnetic disk device according to a first embodiment.

FIG. 10 is a block diagram illustrating a configuration of a part of the magnetic disk device, and is a diagram illustrating a configuration of a read channel.

FIG. 11 is a schematic diagram illustrating a part of two tracks in FIG. 8 and two read heads, and is a diagram for explaining a read processing method according to the embodiment.

FIG. 12 is a flowchart illustrating a write processing method according to the embodiment.

FIG. 13 is a flowchart illustrating the write processing method, subsequent to FIG. 12.

FIG. 15 is a block diagram illustrating a configuration of a part of the magnetic disk device, and is a diagram illustrating a configuration of a volatile memory inside a write channel.

FIG. 16 is a block diagram illustrating a configuration of a part of the magnetic disk device, and is a diagram illustrating a configuration of a volatile memory outside a write channel.

FIG. 17 is a block diagram illustrating a configuration of a part of a magnetic disk device according to a first modification example of the first embodiment, and is a diagram illustrating a configuration of a write channel.

FIG. 18 is a schematic diagram illustrating two tracks in a first zone of a magnetic disk device according to a second modification example of the first embodiment.

FIG. 20 is a schematic diagram illustrating two tracks in a first zone of a magnetic disk device according to a third modification example of the first embodiment.

FIG. 21 is a schematic diagram illustrating two tracks in a first zone of a magnetic disk device according to a fourth modification example of the first embodiment.

FIG. 22 is a schematic diagram illustrating two tracks in a first zone of a magnetic disk device according to a fifth modification example of the first embodiment.

FIG. 24 is a schematic diagram illustrating two tracks in a first zone of a magnetic disk device according to a seventh modification example of the first embodiment.

FIG. 27 is a schematic diagram illustrating two tracks in a first zone of a magnetic disk device according to a tenth modification example of the first embodiment.

FIG. 28 is a block diagram illustrating a configuration of a part of a magnetic disk device according to a second embodiment, and is a diagram illustrating a configuration of a read channel.

FIG. 30 is a plan view illustrating an example of a geometric arrangement of a write head and three read heads in the third embodiment.

FIG. 31 is a block diagram illustrating a configuration of a part of a magnetic disk device according to a fourth embodiment, and is a diagram illustrating a configuration of a read channel.

FIG. 32 is a block diagram illustrating a configuration of a part of a magnetic disk device, and is a diagram illustrating a configuration of a read channel.

DETAILED DESCRIPTION

Figure 2:
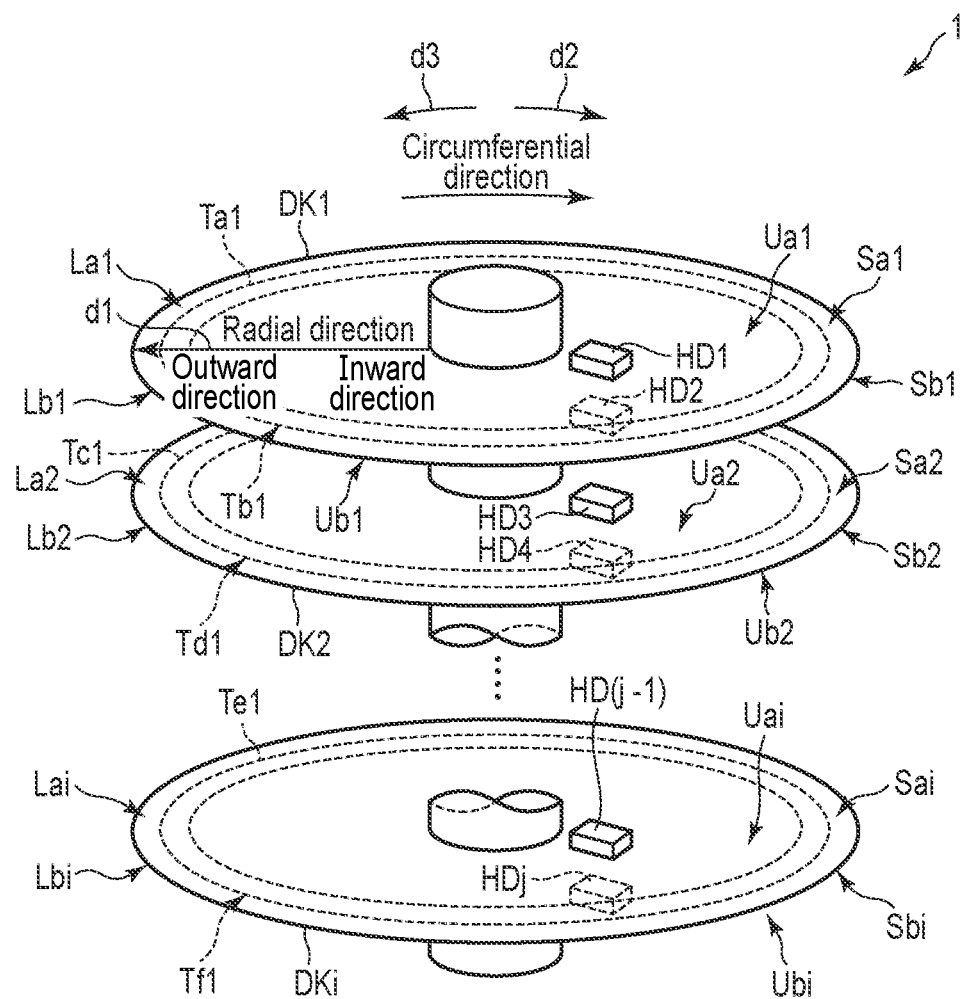
FIG. 2 is a perspective view illustrating a part of the magnetic disk device, and is a view illustrating a plurality of disks and a plurality of heads.

In general, according to one embodiment, there is provided a magnetic disk device comprising: a disk that includes a plurality of data tracks including a first data track and a second data track in a recording layer; a write head that writes data to the recording layer of the disk; and a write processing unit that is capable of executing write processing of writing data to the recording layer, the write processing unit executing first write processing of writing data to a first segment constituting a part of a first data sector in the first data track, executing second write processing of writing data to the first segment constituting a part of a second data sector in the first data track after the first write processing is executed, and executing third write processing of writing data to a second segment constituting a part of the first data sector in the second data track after the second write processing is executed.

According to another embodiment, there is provided a magnetic disk device comprising: a disk that includes a plurality of data tracks including a first data track and a second data track in a recording layer; a first read head, a second read head, and a third read head that each reads data from the recording layer of the disk; an arm that supports the first to third read heads; an actuator that moves the arm; and a read processing unit that is capable of executing read processing of reading data from the recording layer, the first data track including a first segment constituting a part of a first data sector, the second data track including a second segment that constitutes a part of the first data sector and being adjacent to the first segment in a radial direction, and the read processing unit driving the actuator and controlling seek operation of seeking the first to third read heads to move the first read head to a position facing the first data track, selecting a first selection read head that is the first read head and a second selection read head that is a read head closest to the second data track of the second and third read heads according to a skew angle of the first read head, and simultaneously reading data corresponding to the first segment of the first data track and data corresponding to the second segment of the second data track by using the first and second selection read heads.

Hereinafter, a magnetic disk device 1 according to each embodiment and a magnetic disk device 1 according to each modification example will be described with reference to the drawings.

First Embodiment

First, a configuration of a magnetic disk device 1 according to a first embodiment will be described. FIG. 1 is a block diagram illustrating a configuration of the magnetic disk device 1 according to the first embodiment. In the present embodiment, the magnetic disk device 1 is a hybrid recording magnetic disk device that selects a conventional magnetic recording mode and a shingled magnetic recording mode and executes write. However, the technology to be described later may be applied to a shingled magnetic recording magnetic disk device, or may be applied to a conventional magnetic recording magnetic disk device.

As illustrated in FIG. 1, the magnetic disk device 1 includes a plurality of, for example, one to ten disks (magnetic disks) DK as a recording medium, a spindle motor (SPM) 20 as a drive motor, a head stack assembly 22, a driver IC 120, a head amplifier integrated circuit (hereinafter, a head amplifier IC or a preamplifier) 130, a volatile memory 70, a buffer memory (buffer) 80, a nonvolatile memory 90, and a system controller 110 which is a one-chip integrated circuit. Furthermore, the magnetic disk device 1 is connected to a host system (hereinafter, simply referred to as a host) 100.

For example, each of the disks DK is formed to have a diameter of 97 mm (3.8 inches) and has recording layers (magnetic recording layers) on both surfaces thereof. In the present embodiment, the magnetic disk device 1 includes 1 to 11 disks DK, but the number of disks DK is not limited thereto. Furthermore, the magnetic disk device 1 may include a single disk DK.

The head stack assembly 22 can control a head HD mounted on an arm 30 to move to a target position on the disk DK by driving a voice coil motor (hereinafter referred to as VCM) 24, that is, can perform seek operation.

In the disk DK, a user data region U available to the user and a system region S for writing information necessary for system management are allocated to a region where data can be written.

The head HD records and reads information on and from the disk DK. The head HD includes a write head WHD and a read head RHD, which are mounted on a slider as a main body. The write head WHD writes data to the recording layer of the disk DK. The read head RHD reads data from a data track of the recording layer of the disk DK.

The driver IC 120 controls driving of the SPM 20 and the VCM 24 according to control of the system controller 110 (specifically, an MPU 60 to be described later). The SPM 20 supports and rotates a plurality of the disks DK.

The head amplifier IC 130 includes a read amplifier and a write driver. The read amplifier amplifies a read signal read from the disk DK and outputs the amplified read signal to the system controller 110 (specifically, a read/write (R/W) channel 140 to be described later). The write driver outputs a write current corresponding to the signal output from the R/W channel 140 to the head HD. The read amplifier corresponds to a preamplifier 3R to be described later, and the write driver corresponds to a preamplifier 3W to be described later.

The volatile memory 70 is a semiconductor memory in which stored data is lost when power supply is cut off. The volatile memory 70 stores data necessary for processing in each unit of the magnetic disk device 1. The volatile memory 70 is a random access memory (RAM). The volatile memory 70 is, for example, a dynamic random access memory (DRAM). However, the volatile memory 70 may be a synchronous dynamic random access memory (SDRAM).

The buffer memory 80 is a semiconductor memory that temporarily records data transmitted and received between the magnetic disk device 1 and the host 100. The buffer memory 80 may be configured integrally with the volatile memory 70. The buffer memory 80 is, for example, a DRAM, a static random access memory (SRAM), an SDRAM, a ferroelectric random access memory (FeRAM), a magnetoresistive random access memory (MRAM), or the like.

The nonvolatile memory 90 is a semiconductor memory that records stored data even when the power supply is cut off. The nonvolatile memory 90 is, for example, a NAND flash read only memory (FROM). However, the nonvolatile memory 90 may be a NOR flash ROM.

The system controller (controller) 110 is realized by using, for example, a large-scale integrated circuit (LSI) called a system-on-a-chip (SoC) in which a plurality of elements are integrated on a single chip. The system controller 110 includes the read/write (R/W) channel 140, a hard disk controller (HDC) 150, and a micro-processing unit (MPU) 60. The system controller 110 is electrically connected to the driver IC 120, the head amplifier IC 130, the volatile memory 70, buffer memory 80, the nonvolatile memory 90, and the host 100.

The R/W channel 140 executes signal processing on read data transferred from the disk DK to the host 100 and write data transferred from the host 100 in response to an instruction from the MPU 60. The R/W channel 140 has a circuit or a function of modulating the write data. Furthermore, the R/W channel 140 has a circuit that measures the signal quality of the read data, a circuit that equalizes and decodes the waveform of the read data, or a function thereof. The R/W channel 140 is electrically connected to, for example, the head amplifier IC 130, the HDC 150, the MPU 60, and the like.

The HDC 150 controls data transfer between the host 100 and the R/W channel 140 in response to an instruction from the MPU 60 to be described later. The HDC 150 is electrically connected to, for example, the R/W channel 140, the MPU 60, the volatile memory 70, the buffer memory 80, the nonvolatile memory 90, and the like.

The MPU 60 is a control unit that controls each unit of the magnetic disk device 1 and is a main controller. The MPU 60 controls the VCM 24 via the driver IC 120 to execute servo control for positioning the head HD. The MPU 60 controls write-operation of data to the disk DK and selects a storage destination of write data transferred from the host 100. Furthermore, the MPU 60 controls read-operation of data from the disk DK, and controls processing of read data transferred from the disk DK to the host 100. The MPU 60 is connected to each unit of the magnetic disk device 1. The MPU 60 is electrically connected to, for example, the driver IC 120, the R/W channel 140, the HDC 150, and the like.

The MPU 60 includes a read/write processing unit 61 and an error correction unit 65. The MPU 60 executes processing of these units such as the read/write processing unit 61, the error correction unit 65, and the like on firmware. The MPU 60 may include these units as a circuit.

The read/write processing unit 61 includes a write processing unit 62 and a read processing unit 63. In accordance with a command from the host 100, the write processing unit 62 controls data write processing, and the read processing unit 63 controls data read processing. The write processing unit 62 can execute write processing of writing data to a recording layer L of the disk DK. The read processing unit 63 can execute read process of reading data from the recording layer L. The read/write processing unit 61 controls the VCM 24 via the driver IC 120, positions the head HD at a target position (a predetermined radial position) on the disk DK, and executes read processing or write processing.

The error correction unit 65 can recover the data in the data region of the track of the disk DK. For example, in a case where the read processing unit 63 detects that a read error has occurred in the data region of the track of a disk DK1, the error correction unit 65 can recover the data in the data region based on the data in the data region and the parity in a parity region, and write the recovered data in the data region.

The error correction unit 65 executes processing of correcting an error of error data or an error of an error sector based on an error correction code (ECC) (hereinafter, it may be referred to as ECC processing or error correction processing). The error correction unit 65 executes the ECC processing (hereinafter, it may be referred to as track ECC processing or sector ECC processing) on the error data or the error sector based on an ECC corresponding to the error data of a predetermined track (hereinafter, it may be referred to as a track ECC) or an ECC corresponding to the error sector (hereinafter, it may be referred to as a sector ECC). The ECC processing corresponds to error correction or error correction processing in units of sectors.

FIG. 2 is a perspective view illustrating a part of the magnetic disk device 1, and is a view illustrating a plurality of the disks DK and a plurality of the heads HD.

As illustrated in FIG. 2, in the circumferential direction of each of the disks DK, a direction in which the disk DK is rotated is referred to as a rotation direction d3. In the example illustrated in FIG. 2, the rotation direction is indicated in a counterclockwise direction, but may be indicated in an opposite direction (clockwise direction). Furthermore, the progressing direction d2 of the head HD with respect to the disk DK is opposite to the rotation direction d3. The progressing direction d2 is a direction in which the head HD sequentially writes and reads data with respect to the disk DK in the circumferential direction, that is, a direction in which the head HD progresses with respect to the disk DK in the circumferential direction.

The magnetic disk device 1 includes i disks of disks DK1 to DKi, and j heads of heads HD1 to HDj. In the present embodiment, the number of heads HD is twice the number of disks DK (j=2×i).

The disks DK1 to DKi are coaxially provided and overlapped at intervals. The diameters of the disks DK1 to DKi are the same. Here, terms such as "same", "identical", "coincide", and "equivalent" include not only exactly the same meaning but also the meaning of being different to the extent that it can be regarded as being substantially the same. The diameters of the disks DK1 to DKi may be different from each other.

Each disk DK has recording layers L on both sides. For example, the disk DK1 includes a first recording layer La1 and a second recording layer Lb1 on the opposite side of the first recording layer La1. The disk DK2 includes a first recording layer La2 and a second recording layer Lb2 on the opposite side of the first recording layer La2. The disk DKi includes a first recording layer Lai and a second recording layer Lbi on the opposite side of the first recording layer Lai. Each first recording layers La may be referred to as a front surface or a recording surface. Each second recording layers Lb may be referred to as a back surface or a recording surface.

Each recording layer L has a user data region U and a system region S. The first recording layer La1 has a user data region Ua1 and a system region Sa1. The second recording layer Lb1 has a user data region Ub1 and a system region Sb1. The first recording layer La2 has a user data region Ua2 and a system region Sa2. The second recording layer Lb2 has a user data region Ub2 and a system region Sb2. The first recording layer Lai has a user data region Uai and a system region Sai. The second recording layer Lbi has a user data region Ubi and a system region Sbi.

In the user data region Ua1 (first recording layer La1), a track sandwiched between double dashed lines in the drawing is set as a track Ta1. In the user data region Ub1 (second recording layer Lb1), a track located on the opposite side of the track Ta1 is set as a track Tb1.

In the user data region Ua2 (first recording layer La2), a track sandwiched between double dashed lines in the drawing is set as a track Tc1. In the user data region Ub2 (second recording layer Lb2), a track located on the opposite side of the track Tc1 is set as a track Td1.

In the user data region Uai (first recording layer Lai), a track sandwiched between double dashed lines in the drawing is set as a track Te1. In the user data region Ubi (second recording layer Lbi), a track located on the opposite side of the track Te1 is set as a track Tf1.

In the present embodiment, the tracks Ta1, Tb1, Tc1, Td1, Te1, and Tf1 are located in the same cylinder.

The head HD faces the disk DK. In the present embodiment, one head HD faces each recording layer L of the disk DK. For example, the head HD1 faces the first recording layer La1 of the disk DK1, writes data in the first recording layer La1, and reads data from the first recording layer La1. The head HD2 faces the second recording layer Lb1 of the disk DK1, writes data in the second recording layer Lb1, and reads data from the second recording layer Lb1. The head HD3 faces the first recording layer La2 of the disk DK2, writes data in the first recording layer La2, and reads data from the first recording layer La2. The head HD4 faces the second recording layer Lb2 of the disk DK2, writes data in the second recording layer Lb2, and reads data from the second recording layer Lb2. The head HDj−1 faces the first recording layer Lai of the disk DKi, writes data in the first recording layer Lai, and reads data from the first recording layer Lai. The head HDj faces the second recording layer Lbi of the disk DKi, writes data in the second recording layer Lbi, and reads data from the second recording layer Lbi.

Figure 3:
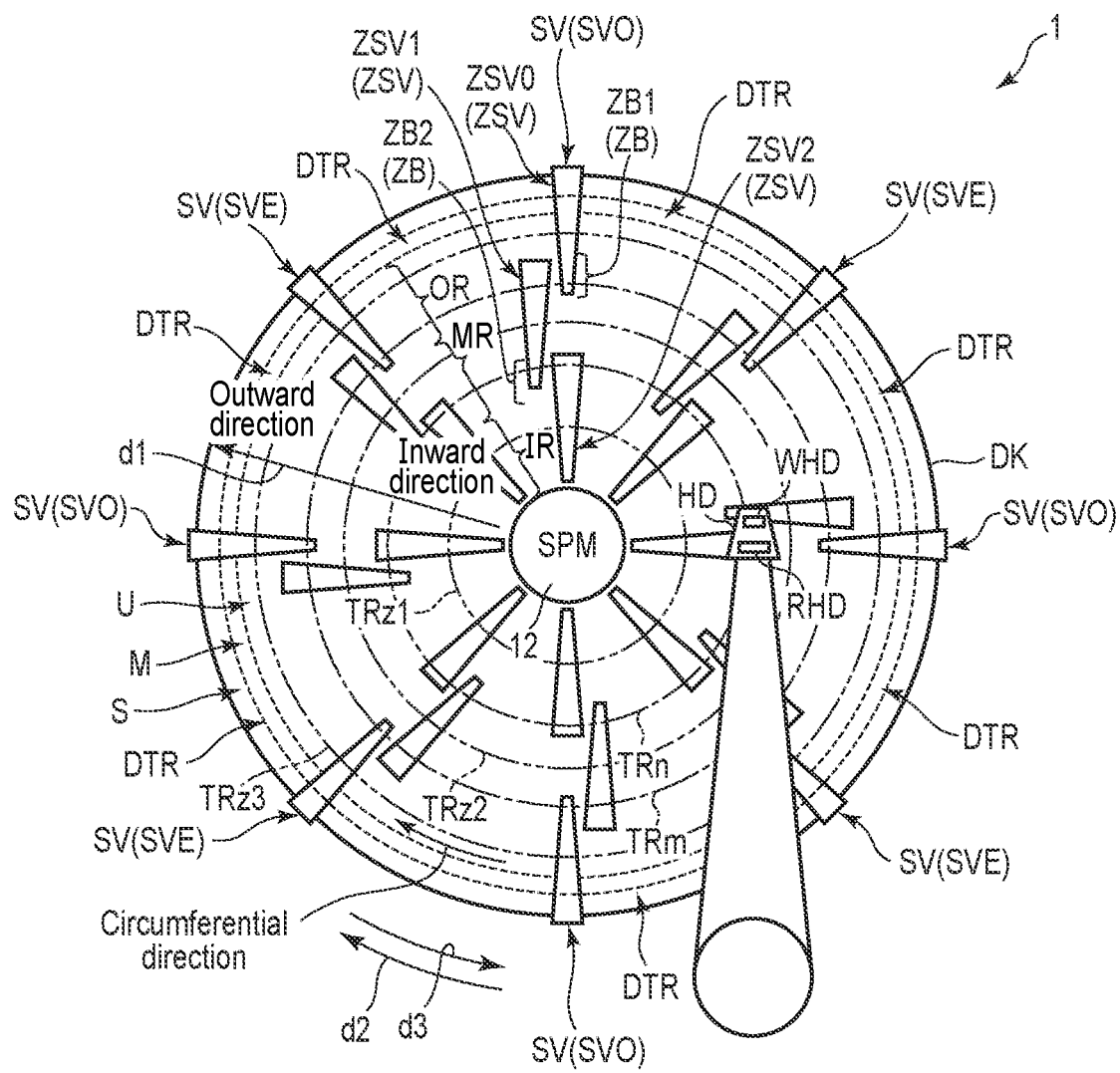
FIG. 3 is a schematic view illustrating an example of arrangement of a plurality of servo regions and a plurality of data regions of one disk according to the embodiment.

FIG. 3 is a schematic view illustrating an example of arrangement of a plurality of servo regions SV and a plurality of data regions DTR of one disk DK according to the present embodiment. As illustrated in FIG. 3, in a radial direction d1 of the disk DK, a direction toward the outer circumference of the disk DK is referred to as an outward direction (outer side), and a direction opposite to the outward direction is referred to as an inward direction (inner side).

In FIG. 3, the user data region U is divided into an inner circumference region IR located in the inward direction, an outer circumference region OR located in the outward direction, and a middle circumference region MR located between the inner circumference region IR and the outer circumference region OR.

The disk DK has a plurality of the servo regions SV and a plurality of the data regions DTR. For example, a plurality of the servo regions SV may extend radially in the radial direction of the disk DK and be discretely disposed at predetermined intervals in the circumferential direction. For example, a plurality of the servo regions SV may extend linearly from the inner circumference to the outer circumference and be discretely disposed at predetermined intervals in the circumferential direction. For example, a plurality of the servo regions SV may extend spirally from the inner circumference to the outer circumference and be discretely disposed at predetermined intervals in the circumferential direction. Furthermore, for example, a plurality of the servo regions SV may be disposed like islands in the radial direction and discretely disposed by changing predetermined intervals in the circumferential direction.

Hereinafter, one servo region SV in a predetermined track may be referred to as a "servo sector". The "servo region SV" may also be referred to as a "servo sector SV". The servo sector includes servo data. Hereinafter, the "arrangement and the like of several pieces of servo data configuring a servo sector" may be referred to as a "servo pattern". The "servo data written in the servo sector" may also be referred to as a "servo sector".

Each of a plurality of the data regions DTR is disposed between a plurality of the servo regions SV. For example, the data region DTR corresponds to a region between two consecutive servo regions SV in the circumferential direction. Hereinafter, one data region DTR in a predetermined track may be referred to as a "data sector". The "data region DTR" may also be referred to as a "data sector DTR". The data sector includes user data. The "user data written in the data sector" may also be referred to as a "data sector". The "data sector" may also be referred to as a "user data". Furthermore, a "pattern configured of several pieces of data" may be referred to as a "data pattern". In the example illustrated in FIG. 2, the data pattern of a predetermined track includes a plurality of pieces of servo data (servo sectors) and a plurality of pieces of user data (data sectors).

The servo region SV includes a plurality of zone servo regions ZSV. In addition to the zone servo regions ZSV, the servo region SV may include a region including a gap (shift of circumferential positions of two zone servo regions), a region including servo data, and a data region DTR. A plurality of the zone servo regions ZSV are discretely disposed along the radial direction. Each of a plurality of the zone servo regions ZSV extends in the radial direction.

One zone servo region (servo region) ZSV in a predetermined track may be referred to as a "zone servo sector" or a "servo sector". The "zone servo region (servo region) ZSV" may also be referred to as a "zone servo sector ZSV" or a "servo sector ZSV". The "servo data written in the zone servo sector" may also be referred to as a "zone servo sector" or a "servo sector". Hereinafter, the "arrangement and the like of several pieces of servo data configuring the zone servo sector" may be referred to as a "zone servo pattern" or a "servo pattern". Hereinafter, one servo region SV in a predetermined track may be referred to as a "zone pattern sector".

The "servo region SV" may also be referred to as a "zone pattern sector". "At least one piece of data or the like written in the zone pattern sector" may also be referred to as a "zone pattern sector". The zone pattern sector includes at least one zone servo sector. Hereinafter, the "data pattern of the zone pattern sector" may be referred to as a "zone data pattern".

In the example illustrated in FIG. 3, the servo region SV has zone servo regions ZSV0, ZSV1, and ZSV2. The zone servo regions ZSV0, ZSV1, and ZSV2 are disposed in a staggered manner in the radial direction. The zone servo regions ZSV0, ZSV1, and ZSV2 may be disposed stepwise in the radial direction.

The zone servo region ZSV2 is located on the inner circumference side in relation to the zone servo region ZSV1. The zone servo region ZSV0 is located on the outer circumference side in relation to the zone servo region ZSV1. For example, the zone servo region ZSV2 is disposed from the inner circumference region IR to the middle circumference region MR, the zone servo region ZSV1 is disposed from the inner circumference region IR to the outer circumference region OR, and the zone servo region ZSV0 is disposed from the middle circumference region MR to the outer circumference region OR. Hereinafter, in a predetermined servo region SV, a predetermined region in the radial direction in which a plurality of the zone servo regions ZSV are disposed in the circumferential direction may be referred to as a zone servo boundary region, a double servo region, or a double zone servo region ZB.

In the example illustrated in FIG. 3, a main servo region SVO and a sub-servo region SVE are alternately disposed at intervals in the circumferential direction. For example, one sub-servo region SVE is disposed between two main servo regions SVO disposed consecutively at intervals in the circumferential direction. In other words, one sub-servo region SVE is disposed between two main servo regions SVO disposed consecutively at intervals in the circumferential direction. For example, in a case where consecutive numbers are sequentially assigned to all the servo regions SV of the disk DK, the main servo region SVO corresponds to an odd-numbered servo region SV, and the sub-servo region SVE corresponds to an even-numbered servo region SV. Two or more sub-servo regions SVE may be disposed between two main servo regions SVO disposed consecutively at intervals in the circumferential direction.

The main servo region SVO and the sub-servo region SVE may include, for example, only a servo region (hereinafter, it may be referred to as a normal servo region) that reads and demodulates servo data as a whole. Hereinafter, "reading and demodulating servo data" may be referred to as "performing servo-read". The main servo region SVO and the sub-servo region SVE may include, for example, a normal servo region and a servo region (hereinafter, it may be referred to as a short servo region) in which servo-read is performed in a smaller circumferential range of the servo data than a circumferential range of the servo data in which the servo-read is performed in the normal servo region.

A media cache M is allocated to the disk DK. However, the media cache M may not be disposed on the disk DK.

By using a plurality of pieces of the servo data described above, it is possible to position the head HD so as to obtain a predetermined off-track amount, and to detect a shake amount and a shake direction of the head HD.

In the description of the present embodiment, the case where the number of zones of the disk DK is three has been described as an example, but the number of zones of the disk DK can be variously changed. The number of zones of the disk DK may range from 30 to 40. Furthermore, each zone has a plurality of bands. For example, each zone has hundreds of bands.

Figure 4:
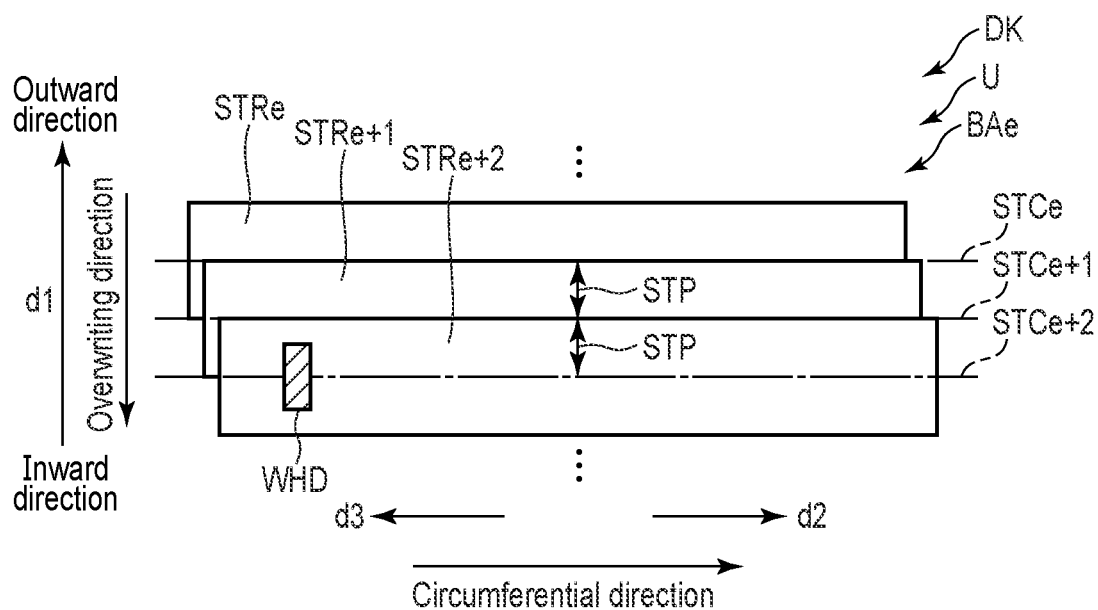
FIG. 4 is a schematic diagram illustrating three tracks in a user data region in which shingled magnetic recording processing of the disk illustrated in FIG. 3 is performed and a write head.

FIG. 4 is a schematic diagram illustrating three tracks STR and a write head WHD in the user data region U in which shingled magnetic recording processing of the disk DK illustrated in FIG. 3 is performed. The user data region U is a shingled magnetic recording region. In the user data region U, sequential writing of data in units of bands is permitted, that is, shingled magnetic recording is permitted. The track STR is a data track.

As illustrated in FIG. 4, the write head WHD can sequentially write data to the disk DK in the progressing direction d2. The read head RHD illustrated in FIG. 3 can also sequentially read data written to the disk DK in the progressing direction d2.

A direction in which a plurality of tracks STR are continuously subjected to shingled magnetic recording in a direction parallel to the radial direction d1, that is, a direction in which a track STR to be written next overlaps a track STR written one ahead in the radial direction d1 is referred to as an overwriting direction or a record-progressing direction. In a band BAe illustrated in FIG. 4, the overwriting direction is the inward direction, but the overwriting direction may be the outward direction.

For example, the overwriting direction applied to a plurality of bands BA (a plurality of zones Z) located on the outer circumference side in relation to a specific radial position and the overwriting direction applied to a plurality of the bands BA (a plurality of zones Z) located on the inner circumference side in relation to a specific radial position may be opposite to each other.

The band BAe includes a plurality of the tracks STR including tracks STRe, STRe+1, and STRe+2. The tracks STRe, STRe+1, and STRe+2 are continuously overwritten in the overwriting direction in the order of these tracks. Among the tracks STRe, STRe+1, and STRe+2, the track STRe corresponds to a track to which data is written first, and the track STRe+2 corresponds to a track to which data is written last.

The track STRe includes a track center STCe at the center in the radial direction d1 in a case where another track is not overwritten. The track STRe+1 includes a track center STCe+1 at the center in the radial direction d1 in a case where another track is not overwritten. The track STRe+2 includes a track center STCe+2 at the center in the radial direction d1 in a case where another track is not overwritten.

In the example illustrated in FIG. 4, the tracks STRe, STRe+1, and STRe+2 are written at a pitch (shingled magnetic recording track pitch) STP. The track center STCe of the track STRe and the track center STCe+1 of the track STRe+1 are separated by the pitch STP in the radial direction d1. The track center STCe+1 of the track STRe+1 and the track center STCe+2 of the track STRe+2 are separated by the pitch STP in the radial direction d1. The tracks STRe to STRe+2 may be written at different pitches.

The width of a region in which the track STRe+1 is not overwritten on the track STRe in the radial direction d1 is the same as the width of a region in which the track STRe+2 is not overwritten on the track STRe+1 in the radial direction d1. The width of the region in which the track STRe+1 is not overwritten on the track STRe in the radial direction d1 may be different from the width of the region in which the track STRe+2 is not overwritten on the track STRe+1 in the radial direction d1.

In FIG. 4, for convenience of description, each track STR is illustrated in a rectangular shape, but is actually curved along the circumferential direction. Furthermore, each track STR may have a wave shape extending in the circumferential direction while varying in the radial direction d1. Although three tracks STR are overwritten in FIG. 4, more than three tracks STR may be overwritten. A plurality of the tracks STR are only required to be overwritten in units of bands BAe.

The write processing unit 62 can select a shingled magnetic recording mode in which data is written to a plurality of the tracks STR in an overlapping manner in the radial direction d1 of the disk DK and execute the write processing. In the example illustrated in FIG. 4, the write processing unit 62 sequentially performs shingled magnetic recording of the tracks STRe to STRe+2 at the pitch STP in the inward direction (overwriting direction) in the band BAe.

The write processing unit 62 writes the track STRe+1 at the pitch STP in the inward direction of the track STRe and overwrites the track STRe+1 on a part of the inner circumference side of the track STRe. The write processing unit 62 writes the track STRe+2 at the pitch STP in the inward direction of the track STRe+1 and overwrites the track STRe+2 on a part of the inner circumference side of the track STRe+1.

Figure 5:
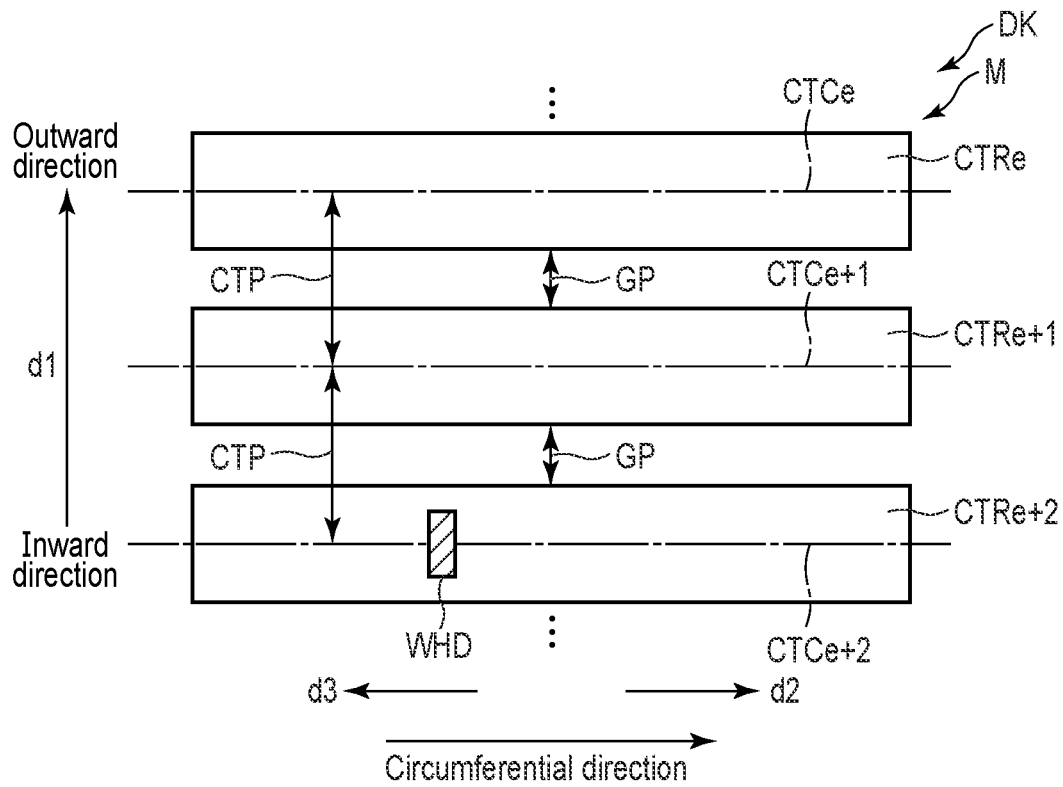
FIG. 5 is a schematic diagram illustrating three tracks in a media cache in which conventional magnetic recording processing of the disk illustrated in FIG. 3 is performed and a write head.

FIG. 5 is a schematic diagram illustrating three tracks CTR and the write head WHD in the media cache M in which conventional magnetic recording processing of the disk DK illustrated in FIG. 3 is performed. The media cache M and the system region S illustrated in FIG. 3 are conventional magnetic recording region. In the media cache M and the system region S, random writing of data is permitted, that is, conventional magnetic recording is permitted. Each of the tracks CTR is a data track.

As illustrated in FIG. 5, the media cache M includes a plurality of the tracks CTR including tracks CTRe, CTRe+1, and CTRe+2. For example, widths (track widths) of the tracks CTRe, CTRe+1, and CTRe+2 in the radial direction d1 are the same. The track widths of the tracks CTRe to CTRe+2 may be different from each other.

The track CTRe includes a track center CTCe at the center in the radial direction d1, the track CTRe+1 includes a track center CTCe+1 at the center in the radial direction d1, and the track CTRe+2 includes a track center CTCe+2 at the center in the radial direction d1. In the example illustrated in FIG. 4, the tracks CTRe, CTRe+1, and CTRe+2 are written at a pitch (conventional magnetic recording track pitch) CTP. The track center CTCe of the track CTRe and the track center CTCe+1 of the track CTRe+1 are separated by the pitch CTP. The track center CTCe+1 of the track CTRe+1 and the track center CTCe+2 of the track CTRe+2 are separated by the pitch CTP.

The track CTRe and the track CTRe+1 are separated by a gap GP. The track CTRe+1 and the track CTRe+2 are separated by the gap GP. The tracks CTRe to CTRe+2 may be written at different pitches. In FIG. 5, for convenience of description, each track CTR is illustrated in a rectangular shape, but is actually curved along the circumferential direction. Furthermore, each track CTR may have a wave shape extending in the circumferential direction while varying in the radial direction d1.

The write processing unit 62 can select a conventional magnetic recording mode in which data is written to a plurality of the tracks CTR at intervals in the radial direction d1 of the disk DK and execute the write processing. In the example illustrated in FIG. 4, the write processing unit 62 positions the write head WHD at the track center CTCe in a predetermined region of the disk DK and performs conventional magnetic recording on the track CTRe or a predetermined sector of the track CTRe.

The write processing unit 62 positions the write head WHD at the track center CTCe+1 spaced apart from the track center CTCe of the track CTRe in the inward direction by the pitch CTP, and performs conventional magnetic recording on the track CTRe+1 or a predetermined sector of the track CTRe+1. The write processing unit 62 positions the write head WHD at the track center CTCe+2 spaced apart from the track center CTCe+1 of the track CTRe+1 in the inward direction by the pitch CTP, and performs conventional magnetic recording on the track CTRe+2 or a predetermined sector of the track CTRe+2.

The write processing unit 62 may perform conventional magnetic recording on the tracks CTRe, CTRe+1, and CTRe+2 sequentially in a predetermined region of the disk DK, and may randomly performs conventional magnetic recording on a predetermined sector of the track CTRe, a predetermined sector of the track CTRe+1, and a predetermined sector of the track CTRe+2.

Figure 6:
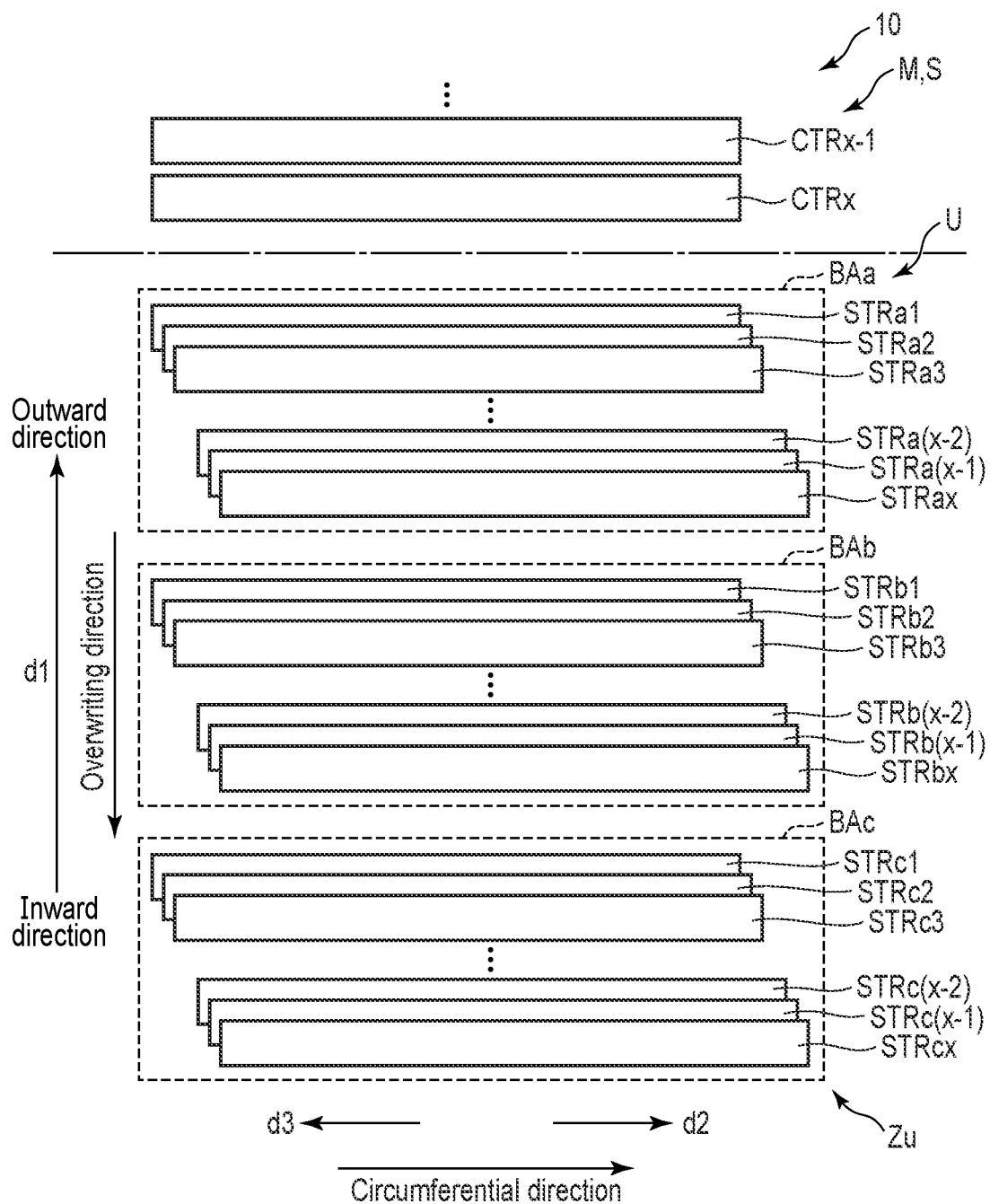
FIG. 6 is a schematic diagram illustrating an example of data write processing in a disk.

FIG. 6 is a schematic diagram illustrating an example of data write processing in the disk DK. As illustrated in FIG. 6, the user data region U includes bands BAa, BAb, and BAc. The bands BAa, BAb, and BAc belong to the same zone (first zone Zu). In the first zone Zu, the bands BAa, BAb, and BAc are intermittently disposed in the overwriting direction in the order of these bands.

The first zone Zu is provided in a first data region of the recording layer L of the disk DK. In the present embodiment, the first zone Zu (first data region) is located on the outer circumference side of the user data region U.

The bands BAa and BAb are adjacent to each other in the radial direction d1, and the bands BAb and BAc are adjacent to each other in the radial direction d1.

The band BAa includes tracks STRa1, STRa2, STRa3, . . . , STRa(x−2), STRa(x−1), and STRax. Each of a plurality of the tracks STR is a data track. The tracks STRa1 to STRax are subjected to shingled magnetic recording in the overwriting direction in the order of these tracks. In the band BAa, the track STRa1 corresponds to a head track to which data is written first, and the track STRax corresponds to a tail track to which data is written last.

The band BAb includes tracks STRb1, STRb2, STRb3, . . . , STRb(x−2), STRb(x−1), and STRbx. The tracks STRb1 to STRbx are subjected to shingled magnetic recording in the overwriting direction in the order of these tracks. In the band BAb, the track STRb1 corresponds to a head track to which data is written first, and the track STRbx corresponds to a tail track to which data is written last.

The band BAc includes tracks STRc1, STRc2, STRc3, . . . , STRc(x−2), STRc(x−1), and STRcx. The tracks STRc1 to STRcx are subjected to shingled magnetic recording in the overwriting direction in the order of these tracks. In the band BAc, the track STRc1 corresponds to a head track to which data is written first, and the track STRcx corresponds to a tail track to which data is written last.

The number of tracks STR included in each band BA belonging to the same zone Z is the same. For example, the number of tracks STR included in each band BA belonging to the first zone Zu is the same. In other words, the number of tracks STR included in the band BA is fixed for each zone Z.

FIG. 6 illustrates tracks CTRx−1 and CTRX. In FIG. 6, the tracks CTRx−1 and CTRx are subjected to conventional magnetic recording in the media cache M or the system region S. The tracks CTRx−1 and CTRx are adjacent to each other in the radial direction d1.

Unlike the conventional magnetic recording, in the shingled magnetic recording method, the MPU 60 manages the track group of the user data region U in units called bands based on a part of the track STR being overlapped.

A guard band is generally provided between the bands BA adjacent in the radial direction d1. The guard band includes one or more guard tracks and has a role of suppressing interference between the adjacent bands BA. With the guard band, shingled magnetic recording can be performed in units of one band BA, and a range (band BA) in which write is sequentially performed can be separated.

The recording capacity of each band BA of the user data region U is usually determined in advance based on a required specification from the user. The MPU 60 can record data having the same capacity in each band BA. In general, the recording capacity of each band BA is 128 MiB or 256 MiB.

Figure 7:
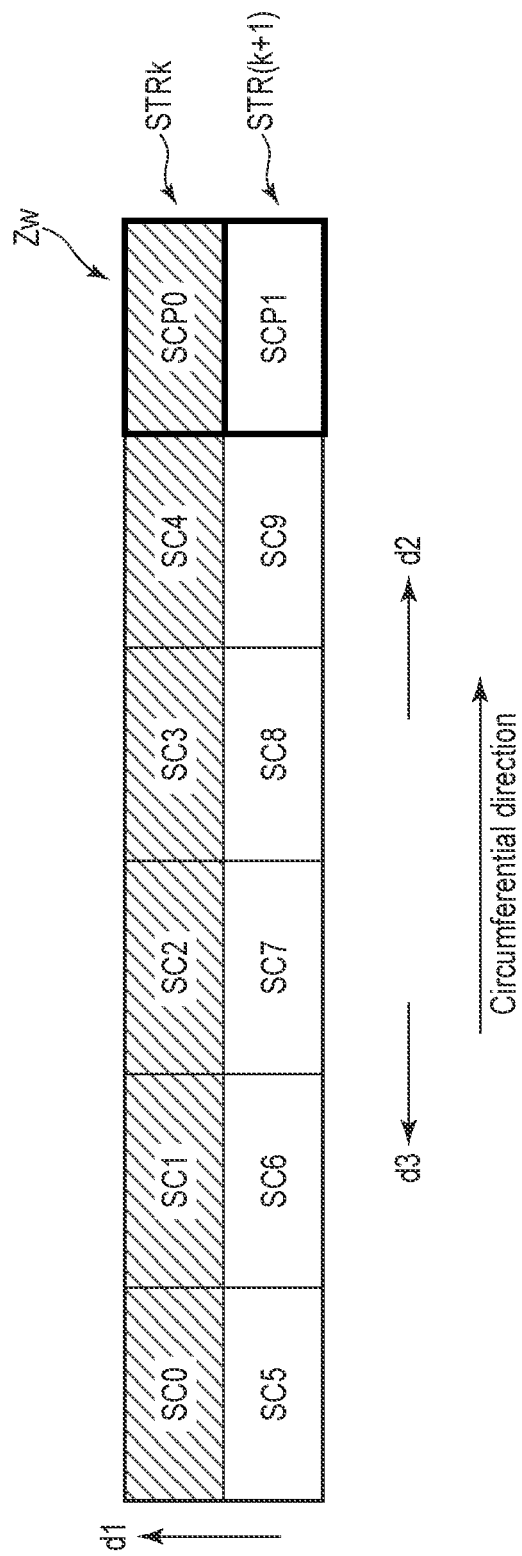
FIG. 7 is a schematic diagram illustrating two tracks of a second zone located on an inner circumference side of the user data region.

FIG. 7 is a schematic diagram illustrating two tracks STRk and STR(k+1) of a second zone Zw located on the inner circumference side in relation to the first zone Zu in the user data region U. In FIG. 7, the tracks STRk and STR(k+1) are illustrated in a rectangular shape, but actually, the tracks STRk and STR(k+1) are curved along the circumferential direction. Furthermore, in FIG. 7, the servo region of each track STR is omitted.

As illustrated in FIG. 7, the second zone Zw is provided in a second data region of the recording layer L of the disk DK, the second data region being located to be shifted in the radial direction d1 from the first data region. In the present embodiment, the second data region is located on the inner circumference side in relation to the first data region.

Each track STR includes a plurality of sectors SC. Each track STR is a data track, and each of the sectors SC is a data sector. The number of sectors SC included in each track STR belonging to the same zone Z is the same.

The track STRk includes six sectors of a sector SC0, a sector SC1, a sector SC2, a sector SC3, a sector SC4, and a parity sector SCP0. The data written to the parity sector SCP0 is a parity generated based on a plurality of the sectors SC0, SC1, SC2, SC3, and SC4 of the track STRk. The parity of the parity sector SCP0 is a parity for error correction, which is generated by executing an exclusive OR (XOR) operation on the data of a plurality of the sectors SC0 to SC4.

The track STR(k+1) includes six sectors of a sector SC5, a sector SC6, a sector SC7, a sector SC8, a sector SC9, and a parity sector SCP1. The data written to the parity sector SCP1 is a parity generated based on a plurality of the sectors SC5, SC6, SC7, SC8, and SC9 of the track STR(k+1). The parity of the parity sector SCP1 is a parity for error correction, which is generated by executing the XOR operation on the data of a plurality of the sectors SC5 to SC9.

In the drawing, hatching is applied to regions indicating the sector SC0, the sector SC1, the sector SC2, the sector SC3, the sector SC4, and the parity sector SCP0. Furthermore, the outer peripheral edges of the regions indicating the parity sector SCP0 and the parity sector SCP1 are indicated by thick lines.

In the second zone Zw (second data region), all of the sectors SC are allocated to the same track STR. For example, all sectors SC0 are allocated to the track STRk, all sectors SC1 are allocated to the track STRk, and all parity sectors SCP0 are allocated to the track STRk. In the present embodiment, the track STRk of the second zone Zw functions as a third data track, and the sector SC0 of the second zone Zw functions as a third data sector.

In the second data region located on the inner circumference side in relation to a predetermined radial position, such as the second zone Zw, all of the sectors SC are allocated to the same track STR. The predetermined radial position is, for example, a boundary of the zone Z. The number of sectors SC included in each track STR is as small as in the zone Z on the inner circumference side. As compared with the first data region (first zone Zu), in the second data region, the track density is lowered or the data recording quality is lowered. The track density refers to the number of tracks STR per inch in the radial direction d1, and is represented by track per inch (TPI).

As described above, the recording layer L may have the second data region (the second zone Zw or the like) in which all of the sectors SC are allocated to the same track STR.

Figure 8:
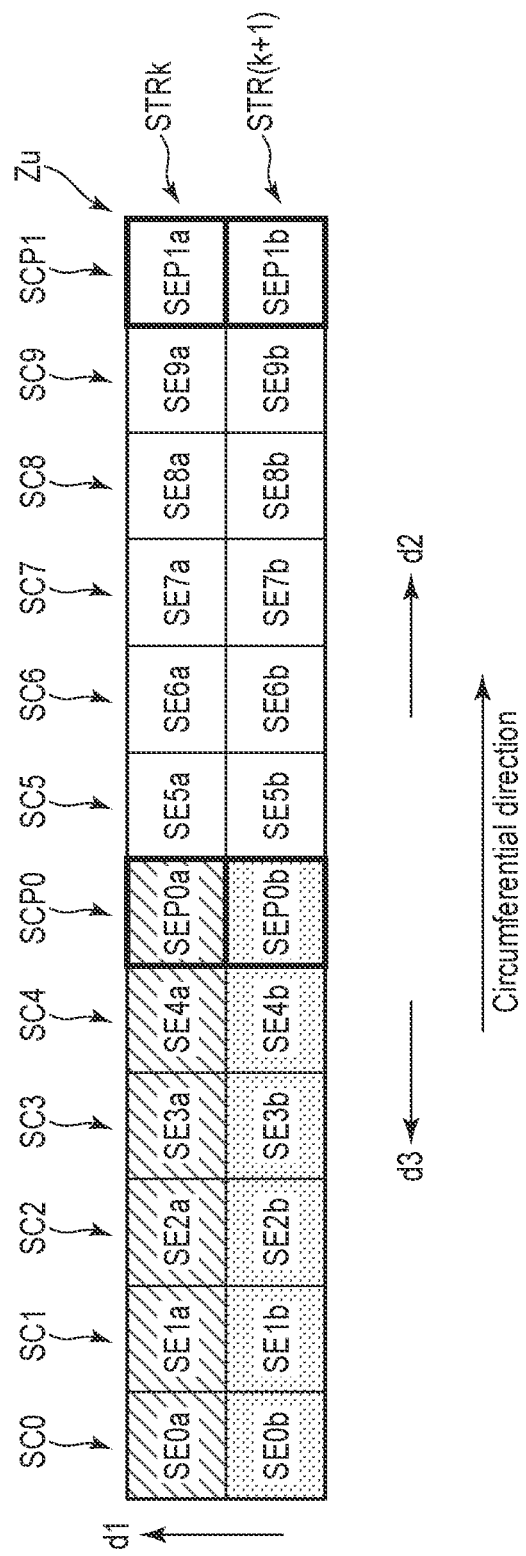
FIG. 8 is a schematic diagram illustrating two tracks of a first zone located on an outer circumference side in relation to the second zone of FIG. 7.

FIG. 8 is a schematic diagram illustrating two tracks STRk and STR(k+1) of the first zone Zu located on an outer circumference side in relation to the second zone Zw of FIG. 7. In FIG. 8, the tracks STRk and STR(k+1) are illustrated in a rectangular shape, but actually, the tracks STRk and STR(k+1) are curved along the circumferential direction. Furthermore, in FIG. 8, the servo region of each track STR is omitted.

As illustrated in FIG. 8, the first zone Zu is provided in the first data region of the recording layer L of the disk DK. Each track STR includes a plurality of segments SE. Each segment SE constitutes a part of the corresponding sector SC. Each track STR is a data track, and each of the sectors SC is a data sector. The number of segments SE included in each track STR belonging to the same zone Z is the same.

The track STRk includes 12 segments of a segment SE0a, a segment SE1a, a segment SE2a, a segment SE3a, a segment SE4a, a segment SEP0a, a segment SE5a, a segment SE6a, a segment SE7a, a segment SE8a, a segment SE9a, and a segment SEP1a.

The data written to the segment SEP0a is a parity segment generated based on a plurality of the segments SE0a, SE1a, SE2a, SE3a, and SE4a of the track STRk. The parity segment of the segment SEP0a is a parity segment for error correction, which is generated by executing the XOR operation on the data of a plurality of the segments SE0a to SE4a.

The data written to the segment SEP1a is a parity segment generated based on a plurality of the segments SE5a, SE6a, SE7a, SE8a, and SE9a of the track STRk. The parity segment of the segment SEP1a is a parity segment for error correction, which is generated by executing the XOR operation on the data of a plurality of the segments SE5a to SE9a.

The track STR(k+1) includes 12 segments of a segment SE0b, a segment SE1b, a segment SE2b, a segment SE3b, a segment SE4b, a segment SEP0b, a segment SE5b, a segment SE6b, a segment SE7b, a segment SE8b, a segment SE9b, and a segment SEP1b.

The data written to the segment SEP0b is a parity segment generated based on a plurality of the segments SE0b, SE1b, SE2b, SE3b, and SE4b of the track STR(k+1). The parity segment of the segment SEP0b is a parity segment for error correction, which is generated by executing the XOR operation on the data of a plurality of the segments SE0b to SE4b.

The data written to the segment SEP1b is a parity segment generated based on a plurality of the segments SE5b, SE6b, SE7b, SE8b, and SE9b of the track STR(k+1). The parity segment of the segment SEP1b is a parity segment for error correction, which is generated by executing the XOR operation on the data of a plurality of the segments SE5b to SE9b.

Each sector SC is divided into two segments of a first segment and a second segment. In the present embodiment, each sector SC is divided into a segment SEa provided in the track STRk and corresponding to the first half of the sector SC and a segment SEb provided in the track STR(k+1) and corresponding to the second half of the sector SC.

A person skilled in the art can determine that the segment SEa and the segment SEb constitute the same sector SC. In the first zone Zu (first data region), all of the sectors SC are not allocated to the same track STR.

The segment SE0a and the segment SE0b, which are adjacent in the radial direction d1, constitute the sector SC0. The segment SE1a and the segment SE1b, which are adjacent in the radial direction d1, constitute the sector SC1. The segment SE2a and the segment SE2b, which are adjacent in the radial direction d1, constitute the sector SC2. The segment SE3a and the segment SE3b, which are adjacent in the radial direction d1, constitute the sector SC3. The segment SE4a and the segment SE4b, which are adjacent in the radial direction d1, constitute the sector SC4. The segment SEP0a and the segment SEP0b, which are adjacent in the radial direction d1, constitute the parity sector SCP0.

The segment SE5a and the segment SE5b, which are adjacent in the radial direction d1, constitute the sector SC5. The segment SE6a and the segment SE6b, which are adjacent in the radial direction d1, constitute the sector SC6. The segment SE7a and the segment SE7b, which are adjacent in the radial direction d1, constitute the sector SC7. The segment SE8a and the segment SE8b, which are adjacent in the radial direction d1, constitute the sector SC8. The segment SE9a and the segment SE9b, which are adjacent in the radial direction d1, constitute the sector SC9. The segment SEP1a and the segment SEP1b, which are adjacent in the radial direction d1, constitute the parity sector SCP1.

In the drawing, in the sector SC0, the sector SC1, the sector SC2, the sector SC3, the sector SC4, and the parity sector SCP0, hatching is applied to regions indicating a plurality of the segments SEa of the track STRk, and a dot pattern is applied to regions indicating a plurality of the segments SEb of the track STR(k+1). Furthermore, outer peripheral edges of the regions indicating the segment SEP0a, the segment SEP0b, the segment SEP1a, and the segment SEP1b are indicated by thick lines. In the present embodiment, the track STRk of the first zone Zu functions as a first data track, and the track STR(k+1) of the first zone Zu functions as a second data track.

For example, in a case where the segments SE0b and SE1b of the track STR(k+1) are squeezed to the track STRk side at the time of the write processing, the segments SE0a and SE1a of the track STRk are adversely affected. For example, squeezing the segment SE0b to the track STRk side means that the center of the segment SE0b in the radial direction d1 is separated from the target position in the radial direction d1 (for example, the track center in the track STR(k+1)) toward the track STRk, which is an undesirable event. The data of the segment SE0a and the data of the segment SE1a are excessively overwritten with the data of the segments SE0b and the data of the segment SE1b.

However, the segments SE0b and SE1b are further separated from the adjacent track STR(k+2) (not illustrated). In the sector SC0, the segment SE0a is adversely affected by the squeezing, but the segment SE0b is not adversely affected by the squeezing. Similarly, in the sector SC1, the segment SE1a is adversely affected by the squeezing, but the segment SE1b is not adversely affected by the squeezing. The region in which each of the sectors SC0 and SC1 is adversely affected by the squeezing is the half, not the whole.

In FIG. 7, in a case where the sector SC5 of the track STR(k+1) is squeezed to the track STRk side at the time of the write processing, the entire region of the sector SC0 of the track STRk is adversely affected.

The adverse effect caused by the squeezing in each of the sectors SC0 and SC1 of FIG. 8 is reduced to the half as compared with the sector SC0 of FIG. 7. By dividing each sector SC into two tracks STR, it is possible to contribute to high TPI.

For example, in a case where the sector SC5 is squeezed to the sector SC0 side by 5 nm at the time of the write processing in the second zone Zw of FIG. 7, the error correction unit 65 cannot recover the data of the sector SC0, and a read error occurs at the time of the read processing of the sector SC0.

On the other hand, even when the segments SE0b and SE1b are squeezed toward the segments SE0a and SE1a by 10 nm at the time of the write processing in the first zone Zu of FIG. 8, the error correction unit 65 can recover the data of the segments SE0a and SE1a. Therefore, as the squeeze margin is reduced, it is possible to contribute to higher TPI and to improve the recording density.

Furthermore, as an example, in a case where six segments of the segments SE0b to SE4b and SEP0b of the track STR(k+1) are squeezed to the track STRk side, the segments SE0a to SE4a and SEP0a of the track STRk are adversely affected. When the squeeze amount is large, a read error occurs in the six segments SE0a to SE4a and SEP0a.

Even when the error correction unit 65 performs ECC processing, only the maximum of three segments among the segments SE0a to SE4a and SEP0a can be recovered. The recover capability of the error correction unit 65 is determined by the hardware configuration and the signal processing capability. There is a limit to the correction capability of the ECC processing.

Figure 9:
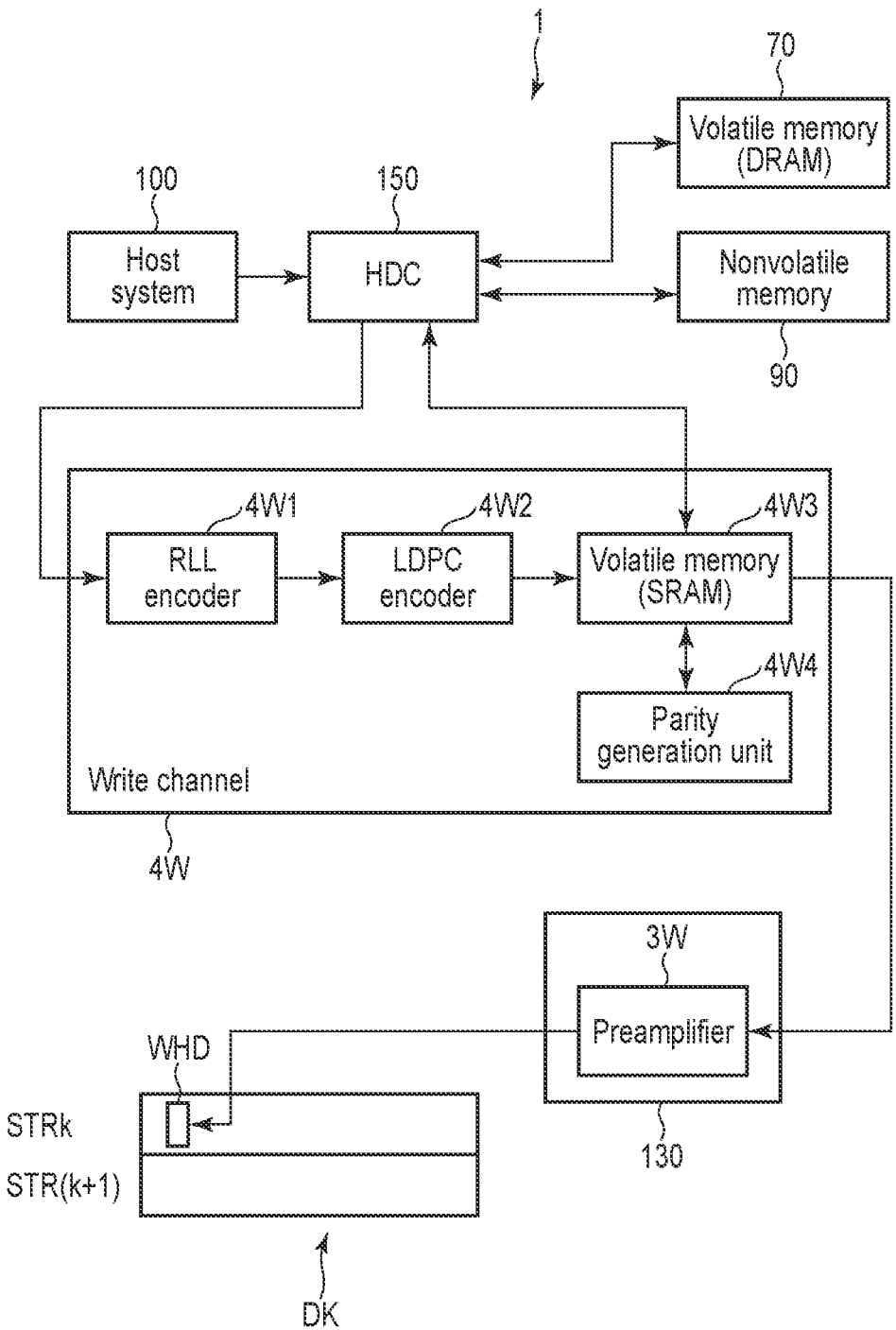
FIG. 9 is a block diagram illustrating a configuration of a part of the magnetic disk device, and is a diagram illustrating a configuration of a write channel.

FIG. 9 is a block diagram illustrating a configuration of a part of the magnetic disk device 1, and is a diagram illustrating a configuration of a write channel 4W.

As illustrated in FIG. 9, the write channel 4W of the R/W channel 140 includes a run length limited (RLL) encoder 4W1, a low density parity check (LDPC) encoder 4W2, a volatile memory 4W3, and a parity generation unit 4W4.

The RLL encoder 4W1 and the LDPC encoder 4W2 function as a data processing unit that processes the received data. In the present embodiment, the data processing unit performs processing of encoding the received data. The received data is RLL-encoded by the RLL encoder 4W1 and LDPC-encoded by the LDPC encoder 4W2. The parity generation unit 4W4 is configured to perform an XOR operation on the data processed by the data processing units (the RLL encoder 4W1 and the LDPC encoder 4W2).

The volatile memory 4W3 inside the write channel 4W includes a plurality of storage regions such as a first storage region, a second storage region, a third storage region, and a fourth storage region. The data processed by the data processing unit and the data subjected to the XOR operation by the parity generation unit 4W4 are written to the volatile memory 4W3. The volatile memory 4W3 is a RAM and functions as a first memory.

The data processed by the data processing unit and the data subjected to the XOR operation by the parity generation unit 4W4 are temporarily held in the volatile memory 4W3. For example, the data in the volatile memory 4W3 is transferred to the volatile memory 70. The volatile memory 70 functions as a second memory. The volatile memory 70 includes a plurality of recording regions such as a first recording region and a second recording region. The volatile memory 70 has a recording capacity capable of recording at least data corresponding to two tracks among a plurality of tracks (a plurality of data tracks). The data processed by the data processing unit and the data subjected to the XOR operation by the parity generation unit 4W4 are written to the volatile memory 70.

A plurality of addresses of the volatile memory 70 are linked, and data corresponding to a plurality of the segments SE of the track STRk are retransferred to the volatile memory 4W3, sent to the write head WHD via the preamplifier 3W of the head amplifier IC 130, and written to the track STRk. The volatile memory 70 continues to hold data corresponding to a plurality of the segments SE of the track STR(k+1). After writing the data to the track STRk is completed, the write head WHD seeks to the track STR(k+1), and the data corresponding to a plurality of the segments SE of the track STR(k+1) are retransferred from the volatile memory 70 to the volatile memory 4W3, sent to the write head WHD via the preamplifier 3W, and written to the track STR(k+1).

Alternatively, the data may be sent to the write head WHD via the preamplifier 3W without transferring the data from the volatile memory 4W3 to the volatile memory 70.

Data received from the host 100 first enters the buffer memory 80 (cache), and then is sent to the write channel 4W and the volatile memory 70 in this order. However, the data received from the host 100 may be sent to the write channel 4W without entering the buffer memory 80.

FIG. 10 is a block diagram illustrating a configuration of a part of the magnetic disk device 1, and is a diagram illustrating a configuration of a read channel 4R.

As illustrated in FIG. 10, the read channel 4R of the R/W channel 140 includes low pass filters (LPFs) 4R1a and 4R1b, analog to digital converters (ADCs) 4R2a and 4R2b, finite impulse response (FIR) filters 4R3a and 4R3b, viterbi decoders 4R4a and 4R4b, and LDPC decoders 4R5a and 4R5b.

The LPF 4R1a is connected to a read head RHD1 of the head HD via a preamplifier 3R1 of the head amplifier IC 130. The LPF 4R1a can remove noise included in a first read signal read by the read head RHD1 and amplified by the preamplifier 3R1. The ADC 4R2a is connected to the LPF 4R1a and can convert the first read signal into a digital signal.

The FIR filter 4R3a is connected to the ADC 4R2a. The FIR filter 4R3a is a one-dimensional FIR filter. The FIR filter 4R3a can perform waveform equalization processing of equalizing the waveform of the first read signal such that the error rate of the first read signal is minimized. The FIR filter 4R3a can output first waveform equalization data.

The viterbi decoder 4R4a is connected to the FIR filter 4R3a. The viterbi decoder 4R4a is a one-dimensional viterbi decoder. The viterbi decoder 4R4a can output first decoding data obtained by decoding the first waveform equalization data.

The LDPC decoder 4R5a is connected to the viterbi decoder 4R4a. The LDPC decoder 4R5a can execute decoding processing of the LDPC code on the first decoding data (error detection and correction processing). The data (signal) processed by the LDPC decoder 4R5a is sent to the HDC 150.

The LPF 4R1b is connected to a read head RHD2 of the head HD via a preamplifier 3R2 of the head amplifier IC 130. The LPF 4R1b can remove noise included in a second read signal read by the read head RHD2 and amplified by the preamplifier 3R2. The ADC 4R2b is connected to the LPF 4R1b and can convert the second read signal into a digital signal.

The FIR filter 4R3b is connected to the ADC 4R2b. The FIR filter 4R3b is a one-dimensional FIR filter. The FIR filter 4R3b can perform waveform equalization processing of equalizing the waveform of the second read signal such that the error rate of the second read signal is minimized. The FIR filter 4R3b can output second waveform equalization data.

The viterbi decoder 4R4b is connected to the FIR filter 4R3b. The viterbi decoder 4R4b is a one-dimensional viterbi decoder. The viterbi decoder 4R4b can output second decoding data obtained by decoding the second waveform equalization data.

The LDPC decoder 4R5b is connected to the viterbi decoder 4R4b. The LDPC decoder 4R5b can execute decoding processing of the LDPC code on the second decoding data (error detection and correction processing). The data (signal) processed by the LDPC decoder 4R5b is sent to the HDC 150.

The read channel 4R in FIG. 10 is a read channel block in which data of two tracks STR can be simultaneously read. In a read channel path including the read head RHD1, the LPF 4R1a, the ADC 4R2a, the FIR filter 4R3a, the viterbi decoder 4R4a, and the LDPC decoder 4R5a, only the track STRk is read. In a read channel path including the read head RHD2, the LPF 4R1b, the ADC 4R2b, the FIR filter 4R3b, the viterbi decoder 4R4b, and the LDPC decoder 4R5b, only the track STR(k+1) is read.

The internal operation of each of the FIR filter 4R3a, the viterbi decoder 4R4a, the FIR filter 4R3b, and the viterbi decoder 4R4b is an algorithm considering one track. The internal tap coefficient in the FIR filter 4R3, the signal average value in a metric operation of the viterbi decoder 4R4, a noise variance value, and the tap coefficient of a noise whitening filter are optimized so as to minimize a bit error rate (BER).

FIG. 11 is a schematic diagram illustrating a part of two tracks STRk and STR(k+1) in FIG. 8 and two read heads RHD1 and RHD2, and is a diagram for explaining a read processing method according to the present embodiment. In FIG. 11, for convenience of description, each track STR is illustrated in a rectangular shape.

As illustrated in FIG. 11, the size of each sector SC is 4096 bytes or 512 bytes. In the present embodiment, since each sector SC is divided into two segments SE, the size of each segment SE is 2048 bytes or 256 bytes.

In the circumferential direction of the disk DK, the distance between the read head RHD1 and the read head RHD2 is about 10 bits long and sufficiently shorter than the length of the segment SE. For example, the data of the segment SE3a and the segment SE3b which are adjacent in the radial direction d1 can be simultaneously read by the read head RHD1 and the read head RHD2, and the data of the sector SC3 can be collectively read. The read head RHD1 functions as a first read head, and the read head RHD2 functions as a second read head.

As illustrated in FIG. 11 and FIG. 1, the arm 30 supports the read head RHD1 and the read head RHD2. The VCM 24 as an actuator can move the arm 30. The read processing unit 63 can execute read processing of reading data from the recording layer L of the disk DK.

The read processing unit 63 drives the VCM 24, controls seek operation of seeking the read heads RHD1 and RHD2, and moves the read head RHD1 to a position facing the track STRk. For example, the read processing unit 63 can simultaneously read the data of the segment SE3a of the track STRk and the data of the segment SE3b of the track STR(k+1) by using the read heads RHD1 and RHD2.

Thereafter, the read processing unit 63 can drive the VCM 24, control seek operation of seeking the read heads RHD1 and RHD2, and move the read head RHD1 to a position facing the track STR(k+2). The seek operation can be performed in units of two tracks at the time of the read processing. The read processing unit 63 can simultaneously read the data of the track STR(k+2) and the data of the track STR(k+3) adjacent to the track STR(k+2) by using the read heads RHD1 and RHD2.

In the read processing method described above, the magnetic disk device 1 includes two read heads RHD1 and RHD2. Therefore, the read processing unit 63 can read the data of the track STRk and data of the track STR(k+1) in one rotation of the disk DK. Since the data of the track STRk and the data of the track STR(k+1) can be read at the same time, the efficiency of the data read processing can be enhanced.

For example, in a case where the magnetic disk device 1 includes one read head RHD, two or more rotations are required to read the data of the track STRk and the data of the track STR(k+1). In that case, since the time period required for the seek operation and the rotation-standby operation increases, it is difficult to increase the efficiency of the data read processing.

Figure 14:
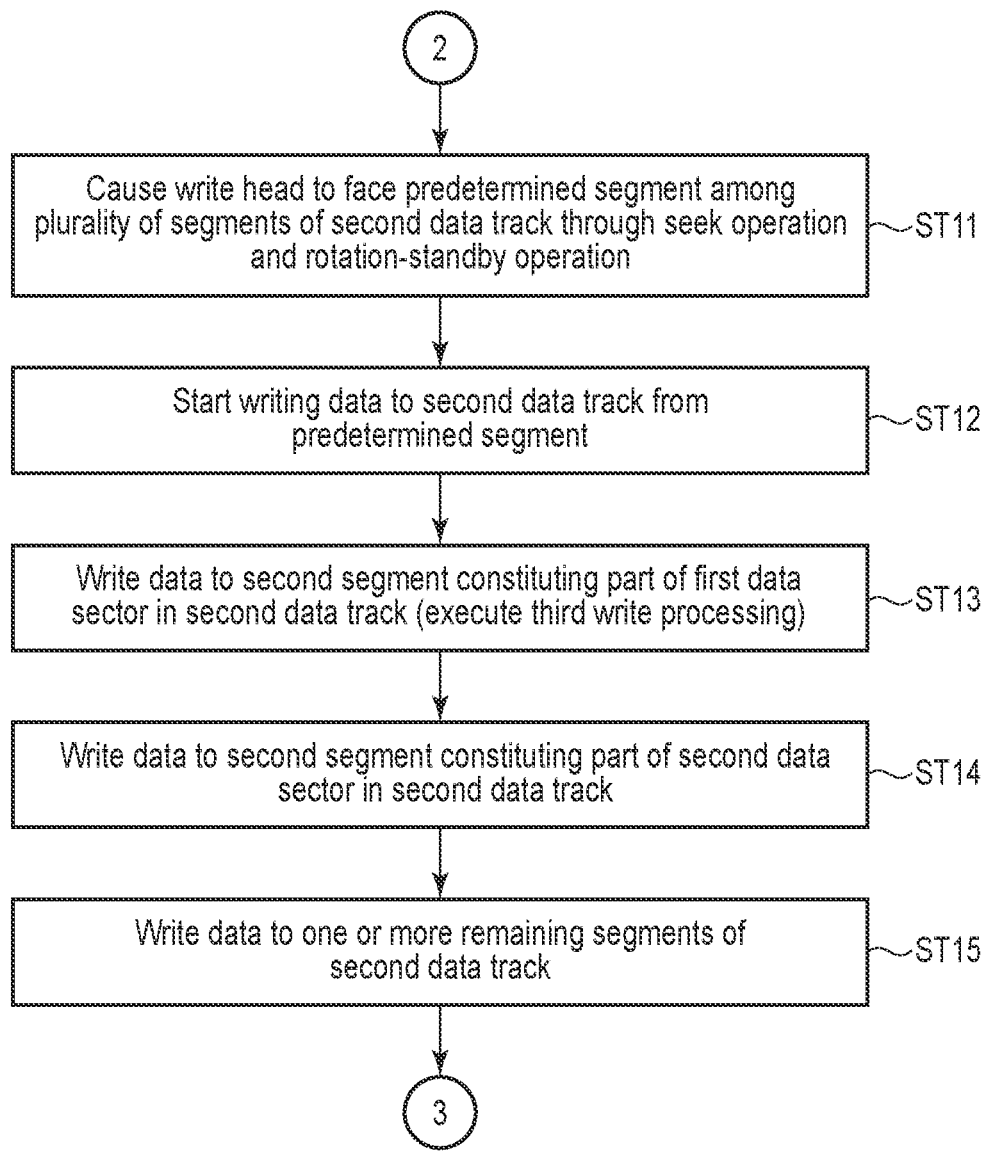
FIG. 14 is another flowchart illustrating the write processing method, subsequent to FIG. 12.

Next, the write processing method according to the present embodiment will be described. FIG. 12, FIG. 13, and FIG. 14 are flowcharts illustrating an example of a write processing method according to the present embodiment.

As illustrated in FIG. 12, FIG. 1, FIG. 8, and FIG. 9, the arm 30 supports the write head WHD. The write processing unit 62 can drive the VCM 24 and control the seek operation of seeking the write head WHD.

When the write processing method is started, first, in step ST1, the write processing unit 62 executes first write processing of writing data to a first segment (segment SE0a) constituting a part of a first data sector (sector SC0) in the first data track (track STRk). When executing the first write processing, the write processing unit 62 moves the write head WHD to a position facing the first data track by the seek operation.

Subsequently, in step ST2, the write processing unit 62 executes second write processing of writing data to a first segment (segment SE1a) constituting a part of a second data sector (sector SC1) in the first data track. When executing the second write processing, the write processing unit 62 maintains a state in which the write head WHD faces the first data track.

Next, in step ST3, the write processing unit 62 writes data to a plurality of the remaining segments SEa (segments SE2a, SE3a, SE4a, SEP0a, SE5a, SE6a, SE7a, SE8a, SE9a, and SEP1a) of the first data track.

In the present embodiment, the data is written to all of the segments SE0a, SE1a, SE2a, SE3a, and SE4a, and then the data is written to the segment SEP0a. However, the data can be written to the segment SEP0a before the data is written to all of the segments SE0a, SE1a, SE2a, SE3a, and SE4a.

In a case where the data corresponding to the first segment of the parity sector SCP is written to the first or second data track before the data corresponding to all the first segments belonging to the same group are written to at least one of the first or second data tracks, the parity generation unit 4W4 can perform an XOR operation on the data corresponding to all the first segments belonging to the group and complete the data corresponding to the first segment of the parity sector SCP in advance.

As a specific example, in a case where the data corresponding to the segments SE3a, SE4a, and SEP0a are written to the track STRk before the data corresponding to the segments SE0a, SE1a, and SE2a are written to the track STRk, the parity generation unit 4W4 can perform an XOR operation on the data corresponding to the segments SE0a, SE1b, SE2b, SE3b, and SE4b belonging to the same group and complete the data corresponding to the segment SEP0a of the parity sector SCP0 in advance.

Before the data corresponding to the segments SE0a, SE1a, and SE2a are written, the result of the XOR operation of the data corresponding to the segments SE0a, SE1a, and SE2a can be applied to the data corresponding to the segment SEP0a. After the data is written to the segment SE4a, the data can be written to the segment SEP0a. Therefore, it is possible to implement sequential write processing of sequentially writing data to the track STRk.

In the track STRk, the segment in which data is written first is the segment SE0a, and the segment in which data is written last is the segment SEP1a. In the track STRk, the segment SE0a corresponds to a head segment, and the segment SEP1a corresponds to a tail segment. Furthermore, the positions of the head segments of a plurality of the tracks STR are aligned in the radial direction d1 in units of bands. For example, since the segment SE0b is adjacent to the segment SE0a in the radial direction d1, the segment SE0b is set as the head segment of the track STR(k+1).

Thereafter, the processing proceeds to step ST4, and in step ST4, the write processing unit 62 determines whether or not the segment to which data is written first among a plurality of the segments SEb of the second data track (track STR(k+1)) is a segment adjacent to the first segment (segment SE0a) of the first data sector.

In a case where the segment to which data is written first in the second data track is the segment (segment SE0b) adjacent to the first segment (segment SE0a) (step ST4), the processing proceeds to step ST5.

In step ST5, the write processing unit 62 causes the write head WHD to face the second data track through the seek operation, and causes the write head WHD to face the segment (segment SE0b) adjacent to the first segment of the first data sector among a plurality of the segments SEb of the second data track through the rotation-standby operation. The write head WHD is used to write data to the first data track (track STRk) and write data to the second data track (track STR(k+1)).

Subsequently, in step ST6, the write processing unit 62 executes third write processing of writing data to the second segment (segment SE0b) constituting a part of the first data sector (sector SC0) in the second data track (track STR(k+1)).

As illustrated in FIG. 13, FIG. 1, FIG. 8, and FIG. 9, next, in step ST7, the write processing unit 62 writes data to the second segment (segment SE1b) constituting a part of the second data sector (sector SC1) in the second data track. At that time, the write processing unit 62 maintains a state in which the write head WHD faces the second data track.

Thereafter, in step ST8, the write processing unit 62 writes data to a plurality of the remaining segments SEb (segments SE2b, SE3b, SE4b, SEP0b, SE5b, SE6b, SE7b, SE8b, SE9b, and SEP1b) of the second data track.

Thus, the write processing method ends.

On the other hand, in step ST4 (FIG. 12), in a case where the segment to which data is written first in the second data track is not the segment (segment SE0b) adjacent to the first segment (segment SE0a), the processing proceeds to step ST11.

As illustrated in FIG. 14, FIG. 1, FIG. 8, and FIG. 9, in step ST11, the write processing unit 62 causes the write head WHD to face the second data track through the seek operation, and causes the write head WHD to face a predetermined segment (for example, the segment SE3b) among a plurality of the segments SEb of the second data track through the rotation-standby operation.

Subsequently, in step ST12, the write processing unit 62 starts writing data to the second data track (track STR(k+1)) from a predetermined segment (segment SE3b).

Thereafter, the data is continuously written to the second data track. In a case where the data corresponding to the second segment of the parity sector SCP is written to the first or second data track before the data corresponding to all the second segments belonging to the same group are written to at least one of the first or second data tracks, the parity generation unit 4W4 performs an XOR operation on the data corresponding to all the second segments belonging to the group and completes the data corresponding to the second segment of the parity sector SCP in advance.

In the present embodiment, before the data corresponding to the segments SE0b, SE1b, SE2b, SE3b, and SE4b of all the sectors SC0, SC1, SC2, SC3, and SC4 belonging to the same group are written to at least one of the track STRk or the track STR(k+1), the data corresponding to the segment SEP0b of the parity sector SCP0 is written to the track STRk or the track STR(k+1). That is, before the data corresponding to the segments SE0b, SE1b, and SE2b are written to the track STR(k+1), the data corresponding to the segment SEP0b is written to the track STR(k+1).

In that case, the parity generation unit 4W4 performs an XOR operation on the data corresponding to all the segments SE0b, SE1b, SE2b, SE3b, and SE4b belonging to the group and completes the data of the segment SEP0b of the parity sector SCP0 in advance. Before the data corresponding to the segments SE0b, SE1b, and SE2b are written, the result of the XOR operation of the data corresponding to the segments SE0b, SE1b, and SE2b can be applied to the data corresponding to the segment SEP0b. After the data is written to the segment SE4b, the data can be written to the segment SEP0b. Therefore, it is possible to implement sequential write processing of sequentially writing data to the track STR(k+1).

Next, in step ST13, the write processing unit 62 executes third write processing of writing data to the second segment (segment SE0b) constituting a part of the first data sector (sector SC0) in the second data track (track STR(k+1)).

Next, in step ST14, the write processing unit 62 writes data to the second segment (segment SE1b) constituting a part of the second data sector (sector SC1) in the second data track. At that time, the write processing unit 62 maintains a state in which the write head WHD faces the second data track.

Thereafter, in step ST15, the write processing unit 62 writes data to one or more remaining segments SEb (segments SE2b) of the second data track.

Thus, the write processing method ends.

In the write processing method described above, after the data is written to the segment SE0a of the track STRk, the data is written to the segment SE1a of the track STRk, and then the data is written to the segment SE0b of the track STR(k+1). In substantially two rotations of the disk DK, the data can be written to the track STRk and the track STR (k+1). Since the data can be written to the track STR(k+1) after the writing of the data to the track STRk is completed, the efficiency of the data write processing can be increased.

For example, after the data is written to the segment SE0a of the track STRk, in a case where the data is written to the segment SE0b of the track STR(k+1), and then the data is written to the segment SE1a of the track STRk, four rotations or more is required to write the data to the track STRk and the track STR(k+1). In a case where processing of sequentially writing data sent from the host 100 to the disk DK is performed, the write processing described above may be performed. In that case, since the time period required for the seek operation and the rotation-standby operation increases, it is difficult to increase the efficiency of the data write processing.

FIG. 15 is a block diagram illustrating a configuration of a part of the magnetic disk device 1, and is a diagram illustrating a configuration of the volatile memory 4W3 inside the write channel 4W.

As illustrated in FIG. 15, FIG. 8, and FIG. 9, the data is input to the volatile memory 4W3 from the LDPC encoder 4W2 in units of one sector. When passing through the RLL encoder 4W1 and the LDPC encoder 4W2, the data is processed in units of one sector. The data is divided into two in the volatile memory 4W3 in units of one sector.

After data DT0a corresponding to the first segment (segment SE0a) of the first data sector (sector SC0) is written to the first storage region of the volatile memory 4W3 and data DT0b corresponding to the second segment (segment SE0b) of the first data sector is written to the second storage region of the volatile memory 4W3, the write processing unit 62 can execute the first write processing (ST1 in FIG. 12).

The data DT0a and the data DT0b indicate data DT0 corresponding to the sector SC0. Data DT1a is data corresponding to the segment SE1a of the sector SC1, and DT1b is data corresponding to the segment SE1b of the sector SC1. The data DT1a and the data DT1b indicate data DT1 corresponding to the sector SC1.

Until the third write processing is executed after the data DT0b is written to the second storage region (ST6 in FIG. 12), the write processing unit 62 can cause the second storage region of the volatile memory 4W3 to hold the data DT0b. Alternatively, the write processing unit 62 can move the data DT0b from the second storage region of the volatile memory 4W3 to the volatile memory 70. In this example, the write processing unit 62 sequentially sends the data DT0a and data DT1a corresponding to the track STRk to the write head WHD, and sequentially saves the data DT0b and data DT1b corresponding to the track STR(k+1) in the volatile memory 70.

Furthermore, the write processing unit 62 can increase the free capacity of the volatile memory 4W3 inside the write channel 4W. After executing the first write processing (ST1 in FIG. 12), the write processing unit 62 can release the first storage region of the volatile memory 4W3 and permit overwriting to the first storage region. The write processing unit 62 can permit overwriting to the second storage region in a case where the data DT0*b* is moved from the second storage region of the volatile memory 4W3 to the volatile memory 70. As described above, the free capacity of the volatile memory 4W3 can be increased.

In a case where the data DT0*b* is held in the second storage region of the volatile memory 4W3 without being moved to the volatile memory 70, the write processing unit 62 can prohibit overwriting to the second storage region.

The data DT0*a*, the data DT0*b*, the data DT1*a*, and the data DT1*b* are stored in a plurality of storage regions to which different addresses are allocated in the volatile memory 4W3.

An address corresponding to the data DT1*a* is linked to an address corresponding to the data DT0*a*. When executing the write processing, the write processing unit 62 can select addresses in the order of the linked addresses and sequentially send pieces of data of the selected addresses to the write head WHD. For example, after the data DT0*a* is sent to the write head WHD, the data DT1*a* can be sent to the write head WHD.

Furthermore, an address corresponding to the data DT1*b* is linked to an address corresponding to the data DT0*b*. The write processing unit 62 can select addresses in the order of the linked addresses and sequentially move pieces of data of the selected addresses to the volatile memory 70. For example, after the data DT0*b* is saved in the volatile memory 70, the data DT1*b* can be saved in the volatile memory 70. When the write processing is executed on the track STR(k+1), the data DT0*b* and the data DT1*b* are retransferred to the volatile memory 4W3, and thus the data DT0*b* and the data DT1*b* can be sent to the write head WHD.

FIG. 16 is a block diagram illustrating a configuration of a part of the magnetic disk device 1, and is a diagram illustrating a configuration of the volatile memory 70 outside the write channel 4W.

As illustrated in FIG. 16 and FIG. 8, after the data DT0*a* corresponding to the first segment (segment SE0*a*) of the first data sector (sector SC0) is written to the first storage region of the volatile memory 70, the data DT0*b* corresponding to the second segment (segment SE0*b*) of the first data sector is written to the second recording region of the volatile memory 70, and then the data DT0*a* is moved from the first recording region to the volatile memory 4W3, the write processing unit 62 can execute the first write processing (ST1 in FIG. 12). Until the third write processing is executed after the data DT0*b* is written to the second recording region (ST6 in FIG. 12 or ST13 in FIG. 14), the write processing unit 62 can cause the second recording region to hold the data DT0*b*.

Furthermore, the write processing unit 62 can increase the free capacity of the volatile memory 70 outside the write channel 4W. After executing the first write processing (ST1 in FIG. 12), the write processing unit 62 can release the first recording region of the volatile memory 70 and permit overwriting to the first recording region. As described above, the free capacity of the volatile memory 70 can be increased.

Until the third write processing is executed after the data DT0*b* is written to the second recording region, the write processing unit 62 can prohibit overwriting to the second recording region.

The volatile memory 70 has a recording capacity capable of recording at least data corresponding to two tracks. Therefore, the volatile memory 70 can record data corresponding to the track STRk and the track STR(k+1).

The write processing unit 62 can cause the write channel 4W to process the data corresponding to the tracks STRk and STR(k+1). The write processing unit 62 can write the data corresponding to the tracks STRk and STR(k+1) processed by the write channel 4W to the volatile memory 70. After the data corresponding to the track STRk and track STR(k+1) are stored in the volatile memory 70, the write processing unit 62 can start data write processing on the tracks STRk and STR(k+1).

When the data corresponding to the track STRk is stored in the volatile memory 70, the writing of data to the track STRk can be completed while the disk DK is rotated once. After the data corresponding to the tracks STRk and STR (k+1) are stored in the volatile memory 70, the write (k+1) processing unit 62 can move the data corresponding to the track STRk from the volatile memory 70 to the volatile memory 4W3 and execute first sequential write processing of sequentially writing the data corresponding to the track STRk to a plurality of the first segments (segments SEa) of the track STRk.

The data corresponding to the track STRk includes data corresponding to the first segment (segment SE0*a*) of the first data sector (sector SC0), and data corresponding to the first segment (segment SE1*a*) of the second data sector (sector SC1). Each of the segments SEa (segments SE0*a*, SE1*a*, SE2*a*, SE3*a*, SE4*a*, SEP0*a*, SE5*a*, SE6*a*, SE7*a*, SE8*a*, SE9*a*, and SEP1*a*) constitutes a part of one corresponding sector SC among a plurality of the sectors SC (sector SC0, sector SC1, sector SC2, sector SC3, sector SC4, parity sector SCP0, sector SC5, sector SC6, sector SC7, sector SC8, sector SC9, and parity sector SCP1).

All the segments SEa and SEb constituting the corresponding one sector SC are not allocated to the track STRk. For example, the segment SE2*a* constituting the sector SC2 is allocated to the track STRk, but the segment SE2*b* constituting the sector SC2 is not allocated to the track STRk.

Moreover, when the data corresponding to the track STR(k+1) is stored in the volatile memory 70, the writing of data to the track STR(k+1) can be completed while the disk DK is rotated once. First, the write processing unit 62 drives the VCM 24, controls seek operation of seeking the write head WHD, and causes the write head WHD to face the track STR(k+1).

Next, the write processing unit 62 can execute the first sequential write processing after moving the data corresponding to the tracks STRk and STR(k+1) from the volatile memory 70 to the volatile memory 4W3, and then execute second sequential write processing of sequentially writing the data corresponding to the track STR(k+1) to a plurality of the segments SEb of the track STR(k+1).

Since the data corresponding to the track STRk and track STR(k+1) are temporarily stored in the volatile memory 70, the data can be written to the tracks STRk and STR(k+1) sequentially in two rotations.

Furthermore, as long as the data of the volatile memory 4W3 can be temporarily stored in the volatile memory 70 or sequentially written to the disk DK, the free capacity of the volatile memory 4W3 can be easily secured. In a case where seek operation is required while the data is being written to the track STRk, the remaining data to be written to the track STRk is temporarily stored in the volatile memory 70.

The data corresponding to the track STR(k+1) includes data corresponding to the second segment (segment SE0*b*) of the first data sector (sector SC0), and data corresponding to the second segment (segment SE1*b*) of the second data sector (sector SC1). Each of the segments SEb (segments SE0*b*, SE1*b*, SE2*b*, SE3*b*, SE4*b*, SEP0*b*, SE5*b*, SE6*b*, SE7*b*, SE8*b*, SE9*b*, and SEP1*b*) constitutes a part of one corresponding sector SC among a plurality of the sectors SC (sector SC0, sector SC1, sector SC2, sector SC3, sector SC4, parity sector SCP0, sector SC5, sector SC6, sector SC7, sector SC8, sector SC9, and parity sector SCP1).

All the segments SEa and SEb constituting one corresponding sector SC are not allocated to the track STR(k+1). For example, the segment SE3b constituting the sector SC3 is allocated to the track STR(k+1), but the segment SE3a constituting the sector SC3 is not allocated to the track STR(k+1).

The data DT0a, the data DT0b, the data DT1a, and the data DT1b are stored in a plurality of regions to which different addresses are allocated in the volatile memory 70.

When the data corresponding to the track STRk is stored in the volatile memory 70, the write processing unit 62 can store the data corresponding to the track STRk in a plurality of regions to which a plurality of first addresses are allocated in the volatile memory 70, and can sequentially link a plurality of the first addresses. For example, the first address corresponding to the data DT1a is linked to the first address corresponding to the data DT0a, and the first address corresponding to data DT2a is linked to the first address corresponding to the data DT1a.

When the data corresponding to the track STR(k+1) is stored in the volatile memory 70, the write processing unit 62 can store the data corresponding to the track STR(k+1) in a plurality of regions to which a plurality of second addresses are allocated in the volatile memory 70, and can sequentially link a plurality of the second addresses. For example, the second address corresponding to the data DT1b is linked to the second address corresponding to the data DT0b, and the second address corresponding to data DT2b is linked to the second address corresponding to the data DT1b.

When the first sequential write processing is executed, the write processing unit 62 can select a plurality of the first addresses in the order of the linked first addresses, sequentially move the data of the selected first addresses from the volatile memory 70 to the volatile memory 4W3, and sequentially write the data corresponding to the track STRk to a plurality of the segments SEa of the track STRk in the order of pieces of the data moved from the volatile memory 70 to the volatile memory 4W3.

When the second sequential write processing is executed, the write processing unit 62 can select a plurality of the second addresses in the order of the linked second addresses, sequentially move the data of the selected second addresses from the volatile memory 70 to the volatile memory 4W3, and sequentially write the data corresponding to the track STR(k+1) to a plurality of the segments SEb of the track STR(k+1) in the order of pieces of the data moved from the volatile memory 70 to the volatile memory 4W3.

Next, processing performed by the parity generation unit 4W4 of the write channel 4W will be described.

As illustrated in FIGS. 8 and 9, a plurality of the sectors SC allocated across the tracks STRk and STR(k+1) include the sector SC0 and the sector SC1, and includes a plurality of the sectors SC0, SC1, SC2, SC3, and SC4 belonging to a group and a parity sector SCP0 in which a parity for recovering data of a plurality of the sectors SC0, SC1, SC2, SC3, and SC4 belonging to the group is recorded, and each of the sectors SC is configured by the segment SEa and the segment SEb.

The data processing unit (the RLL encoder 4W1 and the LDPC encoder 4W2) can process the data corresponding to a plurality of the sectors SC0, SC1, SC2, SC3, and SC4 belonging to the group and write the processed data to the volatile memory 4W3.

The parity generation unit 4W4 can perform an XOR operation on the data corresponding to a plurality of the segments SE0a, SE1a, SE2a, SE3a, and SE4a belonging to the group among the data processed by the data processing unit, generate data corresponding to the segment SEP0a of the parity sector SCP0, and write the data to the third storage region of the volatile memory 4W3.

The parity generation unit 4W4 can perform an XOR operation on the data corresponding to a plurality of the segments SE0b, SE1b, SE2b, SE3b, and SE4b belonging to the group among the data processed by the data processing unit, generate data corresponding to the segment SEP0b of the parity sector SCP0, and write the data to the fourth storage region of the volatile memory 4W3.

Data corresponding to the segments SEP0a and SEP0b of the parity sector SCP0 can be generated while being updated.

When the parity generation unit 4W4 generates data corresponding to the parity sector SCP0 and writes the data to the volatile memory 4W3, after the data processing unit processes the data corresponding to the sector SC0, the parity generation unit 4W4 can perform an XOR operation on the data corresponding to the segment SE0a of the sector SC0, generate a part of the data corresponding to the segment SEP0a of the parity sector SCP0, and write the data to the third storage region of the volatile memory 4W3.

Subsequently, the parity generation unit 4W4 can perform an XOR operation on the data corresponding to the segment SE0b of the sector SC0, generate a part of the data corresponding to the segment SEP0b of the parity sector SCP0, and write the data to the fourth storage region of the volatile memory 4W3.

Subsequently, after the data processing unit processes the data corresponding to the sector SC1, the parity generation unit 4W4 can perform an XOR operation on the data corresponding to the segment SE1a of the sector SC1, generate a part of the data corresponding to the segment SEP0a of the parity sector SCP0, and write the data to the third storage region of the volatile memory 4W3. At that time, the data of the third storage region of the volatile memory 4W3 can be updated by adding the result of the XOR operation of the data corresponding to the segment SE1a to the result of the XOR operation of the data corresponding to the segment SE0a.

Subsequently, the parity generation unit 4W4 can perform an XOR operation on the data corresponding to the segment SE1b of the sector SC1, generate a part of the data corresponding to the segment SEP0b of the parity sector SCP0, and write the data to the fourth storage region of the volatile memory 4W3. At that time, the data of the fourth storage region of the volatile memory 4W3 can be updated by adding the result of the XOR operation of the data corresponding to the segment SE1b to the result of the XOR operation of the data corresponding to the segment SE0b.

Thereafter, similar processing can be performed even after the data processing unit processes the data corresponding to the sectors SC2, SC3, and SC4. Thus, the data (parity segment) in the third storage region and the data (parity segment) in the fourth storage region can be completed.

In the magnetic disk device 1, the write processing method, and the read processing method according to the first embodiment configured as described above, the magnetic disk device 1 includes the disk DK having a plurality of data tracks, the write head WHD, and the write processing unit 62 capable of executing the write processing. The write processing unit 62 can execute the first write processing of writing the data to the segment SE0a of the track STRk, execute the second write processing of writing the data to the segment SE1a of the track STRk, and then execute the third write processing of writing the data to the segment SE0b of the track STR(k+1). The time period required for the seek operation and the rotation-standby operation can be reduced, and the efficiency of the data write processing can be increased.

The magnetic disk device 1 can simultaneously read the data corresponding to the track STRk and the data corresponding to the track STR(k+1) by using two read heads RHD1 and RHD2. Therefore, the efficiency of the data read processing can be increased.

In addition, according to the first embodiment, it is possible to obtain the magnetic disk device 1, the write processing method, and the read processing method. in which the above-described various effects can be obtained and the efficiency of processing data can be increased.

First Modification Example of First Embodiment

Next, a first modification example of the first embodiment will be described. FIG. 17 is a block diagram illustrating a configuration of a part of a magnetic disk device 1 according to the first modification example, and is a diagram illustrating a configuration of a write channel 4W. The magnetic disk device 1 is configured similarly to the magnetic disk device 1 of the first embodiment except for a configuration to be described in the first modification example.

As illustrated in FIG. 17, the head HD includes two write heads of a write head WHD1 and a write head WHD2. For example, by moving the write head WHD1 to a position facing the track STRk, the write head WHD2 can be disposed facing the track STR(k+1).

Data can be simultaneously written to the segment SE0a and the segment SE0b, which are adjacent in the radial direction d1, among the tracks STRk and STR(k+1) by using the write head WHD1 and the write head WHD2, and the data of the sector SC0 can be collectively written.

Thereafter, similarly, the data can be written to the track STRk and the track STR(k+1). For example, the data can be simultaneously written to the segment SE1a and the segment SE1b, which are adjacent in the radial direction d1, by using the write head WHD1 and the write head WHD2, and the data of the sector SC1 can be collectively written.

Even in the first modification example, the same effect as that of the first embodiment described above can be obtained.

Second Modification Example of First Embodiment

Figure 19:
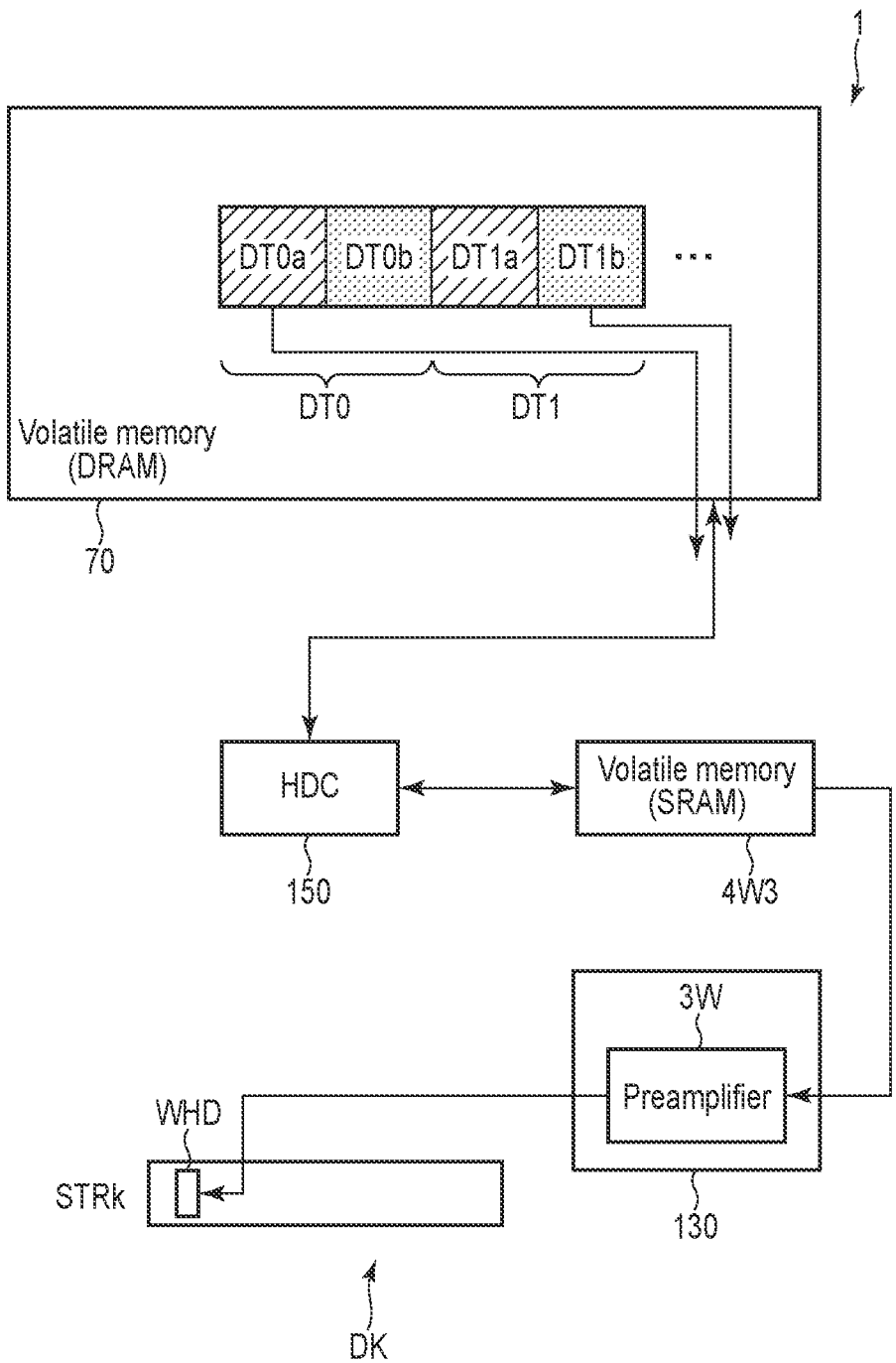
FIG. 19 is a block diagram illustrating a configuration of a part of a magnetic disk device according to the second modification example, and is a diagram illustrating a configuration of a volatile memory outside a write channel.

Next, a second modification example of the first embodiment will be described. FIG. 18 is a schematic diagram illustrating two tracks STRk and STR(k+1) in the first zone Zu of a magnetic disk device 1 according to the second modification example. FIG. 19 is a block diagram illustrating a configuration of a part of the magnetic disk device 1 according to the second modification example, and is a diagram illustrating a configuration of a volatile memory 70 outside a write channel 4W. The magnetic disk device 1 is configured similarly to the magnetic disk device 1 of the first embodiment except for a configuration to be described in the second modification example.

In FIG. 18, for convenience of description, each track STR is illustrated in a rectangular shape. Furthermore, in FIG. 18, the servo region of each track STR is omitted. In the drawing, in the sector SC0, the sector SC1, the sector SC2, the sector SC3, the sector SC4, and the parity sector SCP0, hatching is applied to regions indicating a plurality of the segments SEa, and a dot pattern is applied to regions indicating a plurality of the segments SEb. Furthermore, outer peripheral edges of the regions indicating the segment SEP0a, the segment SEP0b, the segment SEP1a, and the segment SEP1b are indicated by thick lines.

As illustrated in FIGS. 18 and 19, a plurality of the segments SEa and a plurality of the segments SEb are disposed in a staggered manner. In other words, the arrangement of the segment SEa and the arrangement of the segment SEb are switched every time one segment is shifted in the circumferential direction. In each track STR, the segment SEa and the segment SEb are alternately disposed in the circumferential direction.

Even when squeeze occurs at the time of the write processing, the adverse effect caused by the squeeze can be distributed to the segments (segments SE0a, SE1a, SE2a, SE3a, SE4a, and SEP0a) of the group to which the segment SEP0a belongs and the segments (segments SE0b, SE1b, SE2b, SE3b, SE4b, and SEP0b) of the group to which the segment SEP0b belongs. It is possible to avoid a situation in which a plurality of the segments of the same group are intensively adversely affected by the squeeze.

As compared with the first embodiment (FIG. 8), the correction capability of the track ECC using the segments SEP0a and SEP0b of the parity sector SCP0 is hardly lost, and thus the ECC processing using the parity sector SCP0 can be effectively executed. The success rate of correction by the ECC processing is higher when the segment SE on which multiple write processing can be performed is distributed to the first half segment SEa of the sector SC and the second half segment SEb of the sector SC.

The data corresponding to the segment SEP0a of the parity sector SCP0 is generated by performing an XOR operation on the data corresponding to a plurality of the segments SE0a, SE1a, SE2a, SE3a, and SE4a. The data corresponding to the segment SEP0b of the parity sector SCP0 is generated by performing an XOR operation on the data corresponding to a plurality of the segments SE0b, SE1b, SE2b, SE3b, and SE4b.

The data corresponding to the segment SEP1a of the parity sector SCP1 is generated by performing an XOR operation on the data corresponding to a plurality of the segments SE5a, SE6a, SE7a, SE8a, and SE9a. The data corresponding to the segment SEP1b of the parity sector SCP1 is generated by performing an XOR operation on the data corresponding to a plurality of the segments SE5b, SE6b, SE7b, SE8b, and SE9b.

For example, the write processing unit 62 can sequentially write the data corresponding to a plurality of the segments (segments SE0a, SE1b, SE2a, SE3b, SE4a, SEP0b, SE5a, SE6b, SE7a, SE8b, SE9a, and SEP1b) to the track STRk, and then sequentially write the data corresponding to a plurality of the segments (segments SE0b, SE1a, SE2b, SE3a, SE4b, SEP0a, SE5b, SE6a, SE7b, SE8a, SE9b, and SEP1a) to the track STR(k+1).

For example, the write processing unit 62 executes the first write processing of writing data to the first segment (segment SE0a) constituting a part of the first data sector (sector SC0) in the track STRk (ST1 in FIG. 12). Subsequently, the write processing unit 62 executes second write processing of writing data to the first segment (segment SE1b) constituting a part of the second data sector (sector SC1) in the first data track (ST2 in FIG. 12). Thereafter, the write processing unit 62 executes third write processing of writing data to the second segment (segment SE0b) constituting a part of the first data sector (sector SC0) in the second data track (track STR(k+1)) (ST6 in FIG. 12 or ST13 in FIG. 14).

When the data corresponding to the track STRk is stored in the volatile memory 70, the writing of data to the track STRk can be completed while the disk DK is rotated once. After the data corresponding to the tracks STRk and STR (k+1) are stored in the volatile memory 70, the write processing unit 62 can move the data corresponding to the track STRk from the volatile memory 70 to the volatile memory 4W3 and execute first sequential write processing of sequentially writing the data corresponding to the track STRk to a plurality of the first segments (segments SE) of the track STRk.

The data corresponding to the track STRk includes data corresponding to the first segment (segment SE0a) of the first data sector (sector SC0), and data corresponding to the first segment (segment SE1b) of the second data sector (sector SC1). Each of the segments SE (segments SE0a, SE1b, SE2a, SE3b, SE4a, SEP0b, SE5a, SE6b, SE7a, SE8b, SE9a, and SEP1b) constitutes a part of one corresponding sector SC among a plurality of the sectors SC (sector SC0, sector SC1, sector SC2, sector SC3, sector SC4, parity sector SCP0, sector SC5, sector SC6, sector SC7, sector SC8, sector SC9, and parity sector SCP1).

All the segments SEa and SEb constituting the corresponding one sector SC are not allocated to the track STRk.

Moreover, when the data corresponding to the track STR(k+1) is stored in the volatile memory 70, the writing of data to the track STR(k+1) can be completed while the disk DK is rotated once. The write processing unit 62 can execute the first sequential write processing after moving the data corresponding to the tracks STRk and STR(k+1) from the volatile memory 70 to the volatile memory 4W3, and then execute second sequential write processing of sequentially writing the data corresponding to the track STR(k+1) to a plurality of the segments SE of the track STR(k+1).

The data corresponding to the track STR(k+1) includes data corresponding to the second segment (segment SE0b) of the first data sector (sector SC0), and data corresponding to the second segment (segment SE1a) of the second data sector (sector SC1). Each of the segments SE (segments SE0b, SE1a, SE2b, SE3a, SE4b, SEP0a, SE5b, SE6a, SE7b, SE8a, SE9b, and SEP1a) constitutes a part of one corresponding sector SC among a plurality of the sectors SC (sector SC0, sector SC1, sector SC2, sector SC3, sector SC4, parity sector SCP0, sector SC5, sector SC6, sector SC7, sector SC8, sector SC9, and parity sector SCP1).

All the segments SEa and SEb constituting one corresponding sector SC are not allocated to the track STR(k+1).

The data DT0a, the data DT0b, the data DT1a, and the data DT1b are stored in a plurality of regions to which different addresses are allocated in the volatile memory 70.

When the data corresponding to the track STRk is stored in the volatile memory 70, the write processing unit 62 can store the data corresponding to the track STRk in a plurality of regions to which a plurality of first addresses are allocated in the volatile memory 70, and can sequentially link a plurality of the first addresses. For example, the first address corresponding to the data DT1b is linked to the first address corresponding to the data DT0a, and the first address corresponding to data DT2a is linked to the first address corresponding to the data DT1b.

When the data corresponding to the track STR(k+1) is stored in the volatile memory 70, the write processing unit 62 can store the data corresponding to the track STR(k+1) in a plurality of regions to which a plurality of second addresses are allocated in the volatile memory 70, and can sequentially link a plurality of the second addresses. For example, the second address corresponding to the data DT1a is linked to the second address corresponding to the data DT0b, and the second address corresponding to data DT2b is linked to the second address corresponding to the data DT1a.

When the first sequential write processing is executed, the write processing unit 62 can select a plurality of the first addresses in the order of the linked first addresses, sequentially move the data of the selected first addresses from the volatile memory 70 to the volatile memory 4W3, and sequentially write the data corresponding to the track STRk to a plurality of the segments SE of the track STRk in the order of pieces of the data moved from the volatile memory 70 to the volatile memory 4W3.

When the second sequential write processing is executed, the write processing unit 62 can select a plurality of the second addresses in the order of the linked second addresses, sequentially move the data of the selected second addresses from the volatile memory 70 to the volatile memory 4W3, and sequentially write the data corresponding to the track STR(k+1) to a plurality of the segments SE of the track STR(k+1) in the order of pieces of the data moved from the volatile memory 70 to the volatile memory 4W3.

Even in the second modification example, the same effect as that of the first embodiment described above can be obtained.

Third Modification Example of First Embodiment

Next, a third modification example of the first embodiment will be described. FIG. 20 is a schematic diagram illustrating two tracks STRk and STR(k+1) in the first zone Zu of the magnetic disk device 1 according to the third modification example. The magnetic disk device 1 is configured similarly to the magnetic disk device 1 of the first embodiment except for a configuration to be described in the third modification example.

In FIG. 20, for convenience of description, each track STR is illustrated in a rectangular shape. Furthermore, in FIG. 20, the servo region of each track STR is omitted. In the drawing, in the sector SC0, the sector SC2, the sector SC4, the sector SC6, the sector SC8, and the parity sector SCP0, hatching is applied to regions indicating a plurality of the first segments (segments SEa), and a dot pattern is applied to regions indicating a plurality of the second segments (segments SEb). Furthermore, outer peripheral edges of the regions indicating the segment SEP0a, the segment SEP0b, the segment SEP1a, and the segment SEP1b are indicated by thick lines.

As illustrated in FIG. 20, the data corresponding to the segment SEP0a of the parity sector SCP0 is generated by performing an XOR operation on the data corresponding to a plurality of the segments SE0a, SE2a, SE4a, SE6a, and SE8a. A plurality of the segments SE0a, SE2a, SE4a, SE6a, SE8a, and SEP0a belong to the first group and are disposed in the track STRk.

The data corresponding to the segment SEP0b of the parity sector SCP0 is generated by performing an XOR operation on the data corresponding to a plurality of the segments SE0b, SE2b, SE4b, SE6b, and SE8b. A plurality of the segments SE0b, SE2b, SE4b, SE6b, SE8b, and SEP0b belong to a second group and are disposed in the track STR(k+1).

The data corresponding to the segment SEP1a of the parity sector SCP1 is generated by performing an XOR operation on the data corresponding to a plurality of the segments SE1a, SE3a, SE5a, SE7a, and SE9a. A plurality of the segments SE1a, SE3a, SE5a, SE7a, SE9a, and SEP1a belong to a third group and are disposed in the track STRk.

The data corresponding to the segment SEP1b of the parity sector SCP1 is generated by performing an XOR operation on the data corresponding to a plurality of the segments SE1b, SE3b, SE5b, SE7b, and SE9b. A plurality of the segments SE1b, SE3b, SE5b, SE7b, SE9b, and SEP1b belong to a fourth group and are disposed in the track STR(k+1).

In the track STRk, a plurality of the segments SE belonging to the first group and a plurality of the segments SE belonging to the third group are alternately disposed in the circumferential direction. In the track STR(k+1), a plurality of the segments SE belonging to the second group and a plurality of the segments SE belonging to the fourth group are alternately disposed in the circumferential direction.

Even when the squeeze occurs at the time of write processing, adverse effects caused by the squeeze can be distributed to a plurality of the segments SE of a plurality of the groups. For example, in a case where six segments of the segments SE0b to SE5b of the track STR(k+1) are squeezed to the track STRk side, the segments SE0a to SE5a of the track STRk are adversely affected. However, since a plurality of the segments SE0a, SE2a, and SE4a belong to the first group and a plurality of the segments SE1a, SE3a, and SE5a belong to the third group, adverse effects caused by the squeeze can be distributed to the first group and the third group.

Since a plurality of the segments SE belonging to each group can be distributed in the circumferential direction (track direction), it is possible to avoid a situation in which only a plurality of the segments SE of a specific group are subjected to excessive multiple write processing. Furthermore, the success rate of correction by the ECC processing can be increased.

Even in the third modification example, the same effect as that of the first embodiment described above can be obtained.

Fourth Modification Example of First Embodiment

Next, a fourth modification example of the first embodiment will be described. FIG. 21 is a schematic diagram illustrating two tracks STRk and STR(k+1) in the first zone Zu of a magnetic disk device 1 according to the fourth modification example. The magnetic disk device 1 is configured similarly to the magnetic disk device 1 of the third modification example except for a configuration to be described in the fourth modification example.

In FIG. 21, for convenience of description, each track STR is illustrated in a rectangular shape. Furthermore, in FIG. 21, the servo region of each track STR is omitted. In the drawing, in the sector SC0, the sector SC2, the sector SC4, the sector SC6, the sector SC8, and the parity sector SCP0, hatching is applied to regions indicating a plurality of the segments SEa, and a dot pattern is applied to regions indicating a plurality of the segments SEb. Furthermore, outer peripheral edges of the regions indicating the segment SEP0a, the segment SEP0b, the segment SEP1a, and the segment SEP1b are indicated by thick lines.

As illustrated in FIG. 21, a plurality of the segments SE belonging to each group are disposed in a staggered manner. For example, when focusing on the hatched first group, a plurality of the segments SE0a, SE2a, SE4a, SE6a, SE8a, and SEP0a are disposed in a staggered manner.

The technology of FIG. 21 corresponds to a combination of the technology of FIG. 18 and the technology of FIG. 20.

Even when the squeeze occurs at the time of write processing, adverse effects caused by the squeeze can be distributed to a plurality of the segments SE of a plurality of the groups. For example, in a case where six segments of the segment SE0b, the segment SE1b, the segment SE2a, the segment SE3a, the segment SE4b, and the segment SE5b of the track STR(k+1) are squeezed to the track STRk side, the segment SE0a, the segment SE1a, the segment SE2b, the segment SE3b, the segment SE4a, and the segment SE5a of the track STRk are adversely affected.

However, since a plurality of the segments SE0a and SE4a belong to the first group, the segment SE2b belongs to the second group, a plurality of the segments SE1a and SE5a belong to the third group, and the segment SE3b belongs to the fourth group, adverse effects caused by the squeeze can be distributed to the first to fourth groups.

Since a plurality of the segments SE belonging to each group can be distributed in the circumferential direction (track direction) and in the radial direction d1, it is possible to avoid a situation in which only a plurality of the segments SE of a specific group are subjected to excessive multiple write processing. The success rate of correction by the ECC processing can be increased since the segment SE on which multiple write processing can be performed is distributed to the first half segment SEa of the sector SC and the second half segment SEb of the sector SC.

Even in the fourth modification example, the same effect as that of the first embodiment described above can be obtained.

Fifth Modification Example of First Embodiment

Next, a fifth modification example of the first embodiment will be described. FIG. 22 is a schematic diagram illustrating two tracks STRk and STR(k+1) in the first zone Zu of a magnetic disk device 1 according to the fifth modification example. The magnetic disk device 1 is configured similarly to the magnetic disk device 1 of the first embodiment except for a configuration to be described in the fifth modification example.

In FIG. 22, for convenience of description, each track STR is illustrated in a rectangular shape. Furthermore, in FIG. 22, the servo region of each track STR is omitted. In the drawing, in the sector SC0, the sector SC1, the sector SC2, the sector SC3, the sector SC4, and the parity sector SCP0, hatching is applied to regions indicating a plurality of the first segments (segments SEa), and a dot pattern is applied to regions indicating a plurality of the second segments (segments SEb). Furthermore, outer peripheral edges of the regions indicating the segment SEP0a, the segment SEP0b, the segment SEP1a, and the segment SEP1b are indicated by thick lines.

As illustrated in FIG. 22, in a case where the writing of data to the track STRk is completed, and subsequently, the data is sequentially written to the track STR(k+1), it is necessary to start the data writing to the track STR(k+1) in consideration of the time period required for the seek operation. For example, the write processing unit 62 can start writing data from the segment SE0b at a position shifted in the circumferential direction by the segment considering the period of time of the seek performed from the head (the segment SE8b adjacent to the segment SE0a) of the track STR(k+1). In this example, the write start position is shifted by three segments.

When the writing of data to the track STR(k+1) is started, the data corresponding to the track STR(k+1) is written to the volatile memory 70. The write processing unit 62 first writes the data to the segment SE0b adjacent to the segment SE3a in the track STR(k+1), and subsequently sequentially writes the data to a plurality of the segments SE1b, SE2b, SE3b, SE4b, SEP0b, SE5b, SE6b, and SE7b consecutive in the circumferential direction. Next, the write processing unit 62 sequentially writes the data to a plurality of the segments SE8b and SE9b, and finally writes the data to the segment SEP1b.

Alternatively, when the writing of data to the track STR(k+1) is started, the data corresponding to the segments SEP0b and SEP1b may not be written to the volatile memory 70. In other words, the data corresponding to the segments SEP0b and SEP1b may not be generated in advance. In this case, generation of the data corresponding to the segment SEP0b can be started simultaneously with the processing of writing the data to the segments SE0b, SE1b, SE2b, SE3b, and SE4b of the track STR(k+1). Since the data corresponding to the segment SEP0b can be generated while the data is written to the track STR(k+1), the data can be written to the segment SEP0b subsequent to the writing of data to the segment SE4b.

Similarly, generation of the data corresponding to the segment SEP1b can be started simultaneously with the processing of writing the data to the segments SE5b, SE6b, SE7b, SE8b, and SE9b of the track STR(k+1). Since the data corresponding to the segment SEP1b can be generated while the data is written to the track STR(k+1), the data can be written to the segment SEP1b subsequent to the writing of data to the segment SE9b.

The writing of data to the track STR(k+1) can be completed during one rotation of the disk DK, and the writing of data to two tracks STRk and STR(k+1) can be completed during substantially two rotations of the disk DK.

Sixth Modification Example of First Embodiment

Figure 23:
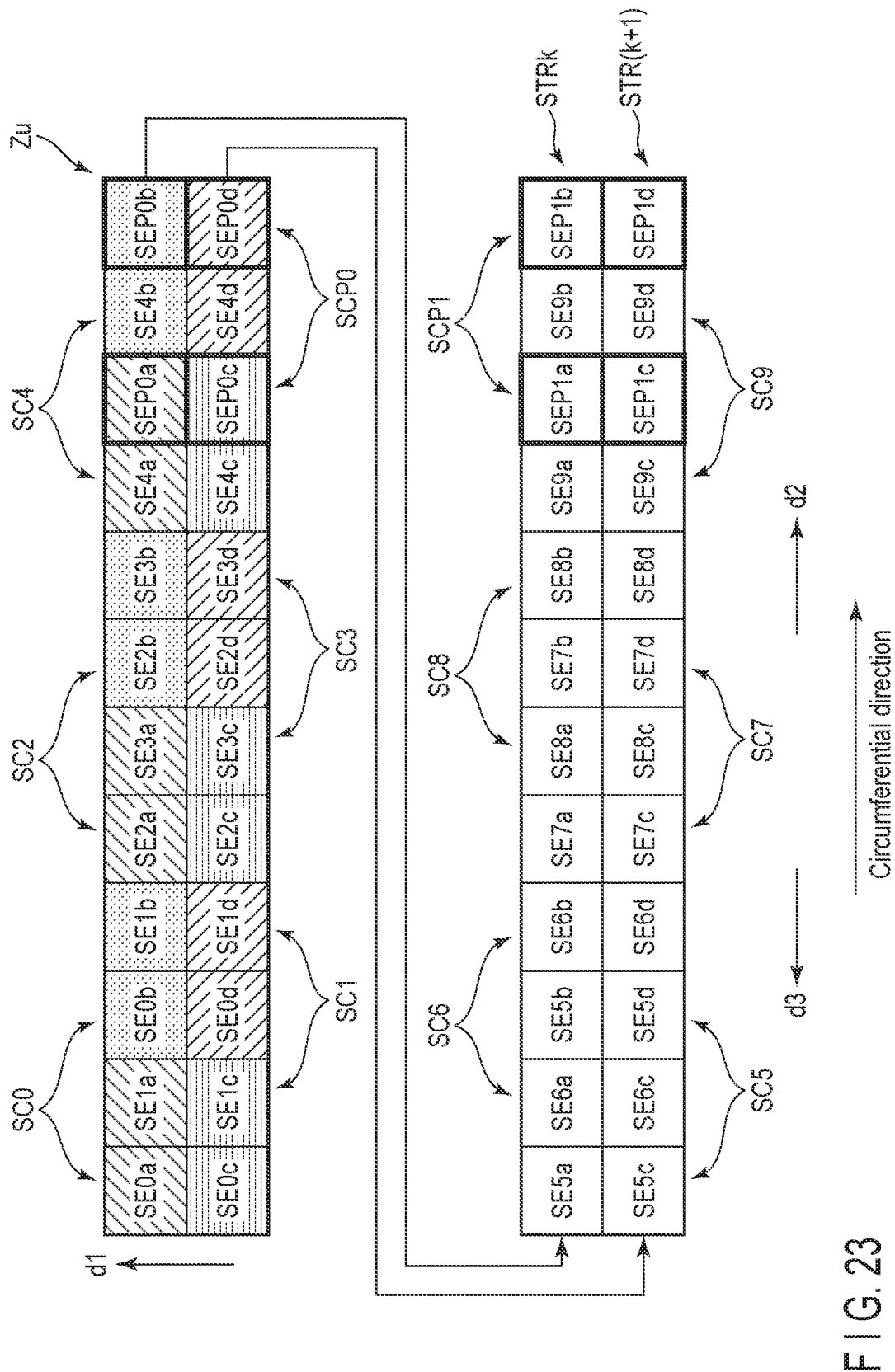
FIG. 23 is a schematic diagram illustrating two tracks in a first zone of a magnetic disk device according to a sixth modification example of the first embodiment.

Next, a sixth modification example of the first embodiment will be described. FIG. 23 is a schematic diagram illustrating two tracks STRk and STR(k+1) in the first zone Zu of a magnetic disk device 1 according to the sixth modification example. The magnetic disk device 1 is configured similarly to the magnetic disk device 1 of the first embodiment except for a configuration to be described in the sixth modification example.

In FIG. 23, for convenience of description, each track STR is illustrated in a rectangular shape. In the circumferential direction, the segment SEP0b and the segment SE5a are consecutive, and a segment SEP0d and a segment SE5c are consecutive. Furthermore, in FIG. 23, the servo region of each track STR is omitted. In the drawing, in the sector SC0, the sector SC1, the sector SC2, the sector SC3, the sector SC4, and the parity sector SCP0, hatching diagonally rising to the right is applied to regions indicating a plurality of the segments SEa, and a dot pattern is applied to regions indicating a plurality of the segments SEb, horizontal hatching is applied to regions indicating a plurality of segments SEc, and hatching diagonally falling to the right is applied to regions indicating a plurality of segments SEd. Furthermore, outer peripheral edges of regions indicating the segment SEP0a, the segment SEP0b, the segment SEP0c, the segment SEP0d, the segment SEP1a, the segment SEP1b, a segment SEP1c, and a segment SEP1d are indicated by thick lines.

As illustrated in FIG. 23, each sector SC is divided into four instead of two. Each sector SC includes a segment SEa corresponding to a first quarter, a segment SEb corresponding to a second quarter, a segment SEc corresponding to a third quarter, and a segment SEd corresponding to a fourth quarter.

The data corresponding to the segment SEP0a of the parity sector SCP0 is generated by performing an XOR operation on the data corresponding to a plurality of the segments SE0a, SE1a, SE2a, SE3a, and SE4a. The data corresponding to the segment SEP0b of the parity sector SCP0 is generated by performing an XOR operation on the data corresponding to a plurality of the segments SE0b, SE1b, SE2b, SE3b, and SE4b. The data corresponding to the segment SEP0c of the parity sector SCP0 is generated by performing an XOR operation on the data corresponding to a plurality of segments SE0c, SE1c, SE2c, SE3c, and SE4c. The data corresponding to the segment SEP0d of the parity sector SCP0 is generated by performing an XOR operation on the data corresponding to a plurality of segments SE0d, SE1d, SE2d, SE3d, and SE4d.

The relationship described above is similarly applied to the sectors SC5 to SC9 and the parity sector SCP1. For example, the data corresponding to the segment SEP1a of the parity sector SCP1 is generated by performing an XOR operation on the data corresponding to a plurality of the segments SE5a, SE6a, SE7a, SE8a, and SE9a.

Focusing on the sector SC0, the segment SE0a and the segment SE0b are disposed with a space corresponding to one segment in the circumferential direction, and the segment SE0c and the segment SE0d are disposed with a space corresponding to one segment in the circumferential direction. The segment SE0a and the segment SE0c are adjacent to each other in the radial direction d1, and the segment SE0b and the segment SE0d are adjacent to each other in the radial direction d1.

Two segments SE belonging to the same sector SC in FIG. 23 are not continuous in the circumferential direction. In the arrangement of the segments SE in FIG. 23, the sectors SC can be distributed in the circumferential direction as compared with the arrangement of the segments SE in FIG. 8. Therefore, adverse effects caused by squeeze can be distributed to a plurality of the sectors SC.

Unlike the example of FIG. 23, two or more segments SE belonging to another sector may be disposed between two segments SE belonging to the same sector SC in the circumferential direction. Furthermore, each sector SC is not divided into four, and may be divided into eight, or may be divided into 16.

Even in the sixth modification example, the same effect as that of the first embodiment described above can be obtained.

Seventh Modification Example of First Embodiment

Next, a seventh modification example of the first embodiment will be described. FIG. 24 is a schematic diagram illustrating two tracks STRk and STR(k+1) in the first zone Zu of a magnetic disk device 1 according to the seventh modification example. The magnetic disk device 1 is configured similarly to the magnetic disk device 1 of the sixth modification example except for a configuration to be described in the seventh modification example.

In FIG. 24, for convenience of description, each track STR is illustrated in a rectangular shape. In the circumferential direction, the segment SE5b and the segment SE6a are consecutive, and a segment SE5d and a segment SE6c are consecutive. Furthermore, in FIG. 24, the servo region of each track STR is omitted. In the drawing, in the sector SC0, the sector SC2, the sector SC4, the sector SC6, the sector SC8, and the parity sector SCP0, hatching diagonally rising to the right is applied to regions indicating a plurality of the segments SEa, and a dot pattern is applied to regions indicating a plurality of the segments SEb, horizontal hatching is applied to regions indicating a plurality of segments SEc, and hatching diagonally falling to the right is applied to regions indicating a plurality of segments SEd. Furthermore, outer peripheral edges of regions indicating the segment SEP0a, the segment SEP0b, the segment SEP0c, the segment SEP0d, the segment SEP1a, the segment SEP1b, a segment SEP1c, and a segment SEP1d are indicated by thick lines.

As illustrated in FIG. 24, the data corresponding to the segment SEP0a of the parity sector SCP0 is generated by performing an XOR operation on the data corresponding to a plurality of the segments SE0a, SE2a, SE4a, SE6a, and SE8a. A plurality of the segments SE0a, SE2a, SE4a, SE6a, SE8a, and SEP0a belong to the first group and are disposed in the track STRk.

The data corresponding to the segment SEP0b of the parity sector SCP0 is generated by performing an XOR operation on the data corresponding to a plurality of the segments SE0b, SE2b, SE4b, SE6b, and SE8b. A plurality of the segments SE0b, SE2b, SE4b, SE6b, SE8b, and SEP0b belong to the second group and are disposed in the track STRk.

The data corresponding to the segment SEP0c of the parity sector SCP0 is generated by performing an XOR operation on the data corresponding to a plurality of segments SE0c, SE2c, SE4c, SE6c, and SE8c. A plurality of the segments SE0c, SE2c, SE4c, SE6c, SE8c, and SEP0c belong to the third group and are disposed in the track STR(k+1).

The data corresponding to the segment SEP0d of the parity sector SCP0 is generated by performing an XOR operation on the data corresponding to a plurality of segments SE0d, SE2d, SE4d, SE6d, and SE8d. A plurality of the segments SE0d, SE2d, SE4d, SE6d, SE8d, and SEP0d belong to the fourth group and are disposed in the track STR(k+1).

In the track STRk, a plurality of the segments SEa belonging to the first group and a plurality of the segments SEb belonging to the second group are alternately disposed in the circumferential direction, and one segment SE that does not belong to the first to fourth groups is interposed between the segment SEa and the segment SEb. In the track STR(k+1), a plurality of the segments SEc belonging to the third group and a plurality of the segments SEd belonging to the fourth group are alternately disposed in the circumferential direction, and one segment SE that does not belong to the first to fourth groups is interposed between the segment SEc and the segment SEd.

Even when the squeeze occurs at the time of write processing, adverse effects caused by the squeeze can be distributed to a plurality of the segments SE of a plurality of the groups. Furthermore, since a plurality of the segments SE belonging to each group can be distributed in the circumferential direction (track direction), it is possible to avoid a situation in which only a plurality of the segments SE of a specific group are subjected to excessive multiple write processing.

Even in the seventh modification example, the same effect as that of the first embodiment described above can be obtained.

Eighth Modification Example of First Embodiment

Figure 25:
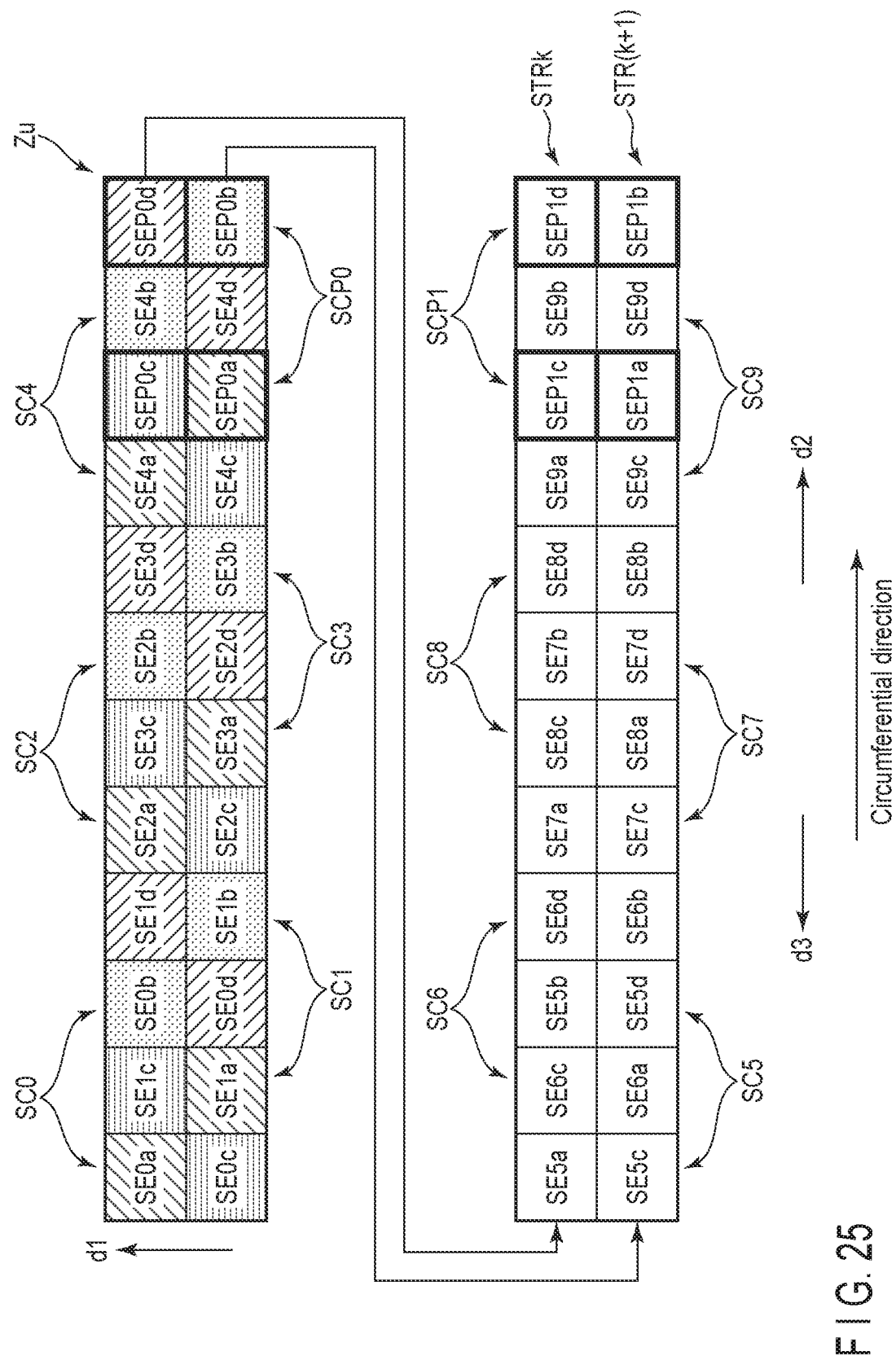
FIG. 25 is a schematic diagram illustrating two tracks in a first zone of a magnetic disk device according to an eighth modification example of the first embodiment.

Next, an eighth modification example of the first embodiment will be described. FIG. 25 is a schematic diagram illustrating two tracks STRk and STR(k+1) in the first zone Zu of a magnetic disk device 1 according to the eighth modification example. The magnetic disk device 1 is configured similarly to the magnetic disk device 1 of the sixth modification example except for a configuration to be described in the eighth modification example.

In FIG. 25, for convenience of description, each track STR is illustrated in a rectangular shape. In the circumferential direction, the segment SEP0d and the segment SE5a are consecutive, and a segment SEP0b and a segment SE5c are consecutive. Furthermore, in FIG. 25, the servo region of each track STR is omitted. In the drawing, in the sector SC0, the sector SC1, the sector SC2, the sector SC3, the sector SC4, and the parity sector SCP0, hatching diagonally rising to the right is applied to regions indicating a plurality of the segments SEa, and a dot pattern is applied to regions indicating a plurality of the segments SEb, horizontal hatching is applied to regions indicating a plurality of segments SEc, and hatching diagonally falling to the right is applied to regions indicating a plurality of segments SEd. Furthermore, outer peripheral edges of regions indicating the segment SEP0a, the segment SEP0b, the segment SEP0c, the segment SEP0d, the segment SEP1a, the segment SEP1b, a segment SEP1c, and a segment SEP1d are indicated by thick lines.

As illustrated in FIG. 25, a plurality of the segments SEa are disposed in a staggered manner, a plurality of the segments SEb are disposed in a staggered manner, a plurality of the segments SEc are disposed in a staggered manner, and a plurality of the segments SEd are disposed in a staggered manner.

Here, a plurality of the sectors SC0 to SC4 and the parity sector SCP0 are focused. As compared with the example of FIG. 23, in the radial direction d1, the arrangement of the segment SE1a and the arrangement of the segment SE1c are switched, the arrangement of the segment SE1b and the arrangement of the segment SE1d are switched, the arrangement of the segment SE3a and the arrangement of the segment SE3c are switched, the arrangement of the segment SE3b and the arrangement of the segment SE3d are switched, the arrangement of the segment SEP0a and the arrangement of the segment SEP0c are switched, and the arrangement of the segment SEP0b and the arrangement of the segment SEP0d are switched.

In the track STRk, the segment SEa, the segment SEc, the segment SEb, and the segment SEd are repeatedly disposed in the circumferential direction. In the track STR(k+1), the segment SEc, the segment SEa, the segment SEd, and the segment SEb are repeatedly disposed in the circumferential direction.

Even when the squeeze occurs at the time of write processing, adverse effects caused by the squeeze can be distributed to a plurality of the sectors SC. Moreover, the success rate of correction by the ECC processing can be increased since the segment SE on which multiple write processing can be performed is distributed to a plurality of the segments SEa, SEb, SEc, and SEd of a plurality of the sectors SC.

Even in the eighth modification example, the same effect as that of the first embodiment described above can be obtained.

Ninth Modification Example of First Embodiment

Figure 26:
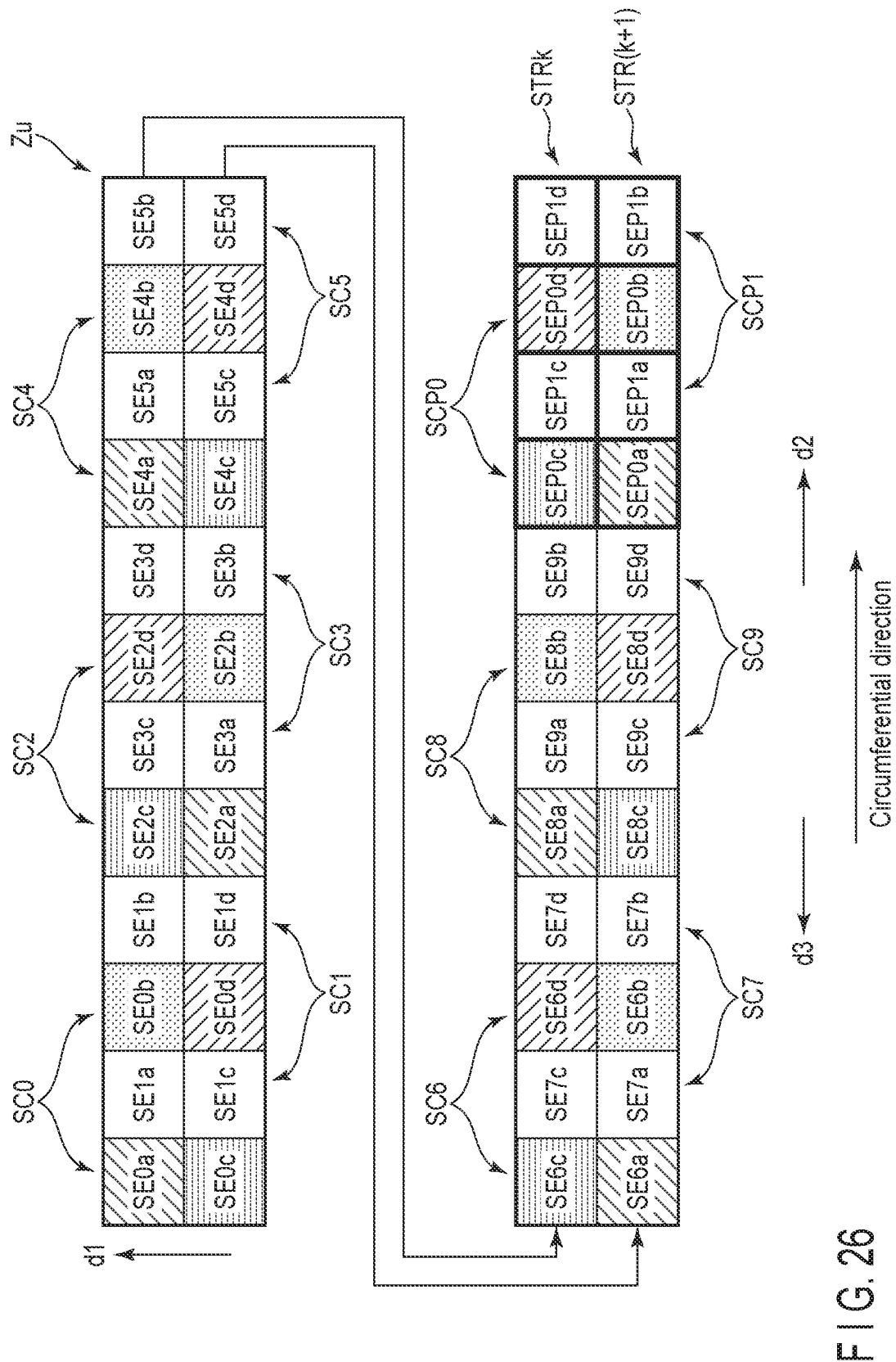
FIG. 26 is a schematic diagram illustrating two tracks in a first zone of a magnetic disk device according to a ninth modification example of the first embodiment.

Next, a ninth modification example of the first embodiment will be described. FIG. 26 is a schematic diagram illustrating two tracks STRk and STR(k+1) in the first zone Zu of a magnetic disk device 1 according to the ninth modification example. The magnetic disk device 1 is configured similarly to the magnetic disk device 1 of the seventh modification example except for a configuration to be described in the ninth modification example.

In FIG. 26, for convenience of description, each track STR is illustrated in a rectangular shape. In the circumferential direction, the segment SE5b and the segment SE6c are consecutive, and a segment SE5d and a segment SE6a are consecutive. Furthermore, in FIG. 26, the servo region of each track STR is omitted. In the drawing, in the sector SC0, the sector SC2, the sector SC4, the sector SC6, the sector SC8, and the parity sector SCP0, hatching diagonally rising to the right is applied to regions indicating a plurality of the segments SEa, and a dot pattern is applied to regions indicating a plurality of the segments SEb, horizontal hatching is applied to regions indicating a plurality of segments SEc, and hatching diagonally falling to the right is applied to regions indicating a plurality of segments SEd. Furthermore, outer peripheral edges of regions indicating the segment SEP0a, the segment SEP0b, the segment SEP0c, the segment SEP0d, the segment SEP1a, the segment SEP1b, a segment SEP1c, and a segment SEP1d are indicated by thick lines.

As illustrated in FIG. 26, when focusing on a plurality of the sectors SC0, SC2, SC4, SC6 and SC8, and the parity sector SCP0, a plurality of the segments SEa are disposed in a staggered manner, a plurality of the segments SEb are disposed in a staggered manner, a plurality of the segments SEc are disposed in a staggered manner, and a plurality of the segments SEd are disposed in a staggered manner. As compared with the example of FIG. 24, in the radial direction d1, the arrangement of the segment SE2a and the arrangement of the segment SE2c are switched, the arrangement of the segment SE2b and the arrangement of the segment SE2d are switched, the arrangement of the segment SE6a and the arrangement of the segment SE6c are switched, the arrangement of the segment SE6b and the arrangement of the segment SE6d are switched, the arrangement of the segment SEP0a and the arrangement of the segment SEP0c are switched, and the arrangement of the segment SEP0b and the arrangement of the segment SEP0d are switched.

The technology of FIG. 26 corresponds to a combination of the technology of FIG. 24 and the technology of FIG. 25.

Even when the squeeze occurs at the time of write processing, adverse effects caused by the squeeze can be distributed to a plurality of the sectors SC. Moreover, the success rate of correction by the ECC processing can be increased since the segment SE on which multiple write processing can be performed is distributed to a plurality of the segments SEa, SEb, SEc, and SEd of a plurality of the sectors SC.

Even in the ninth modification example, the same effect as that of the first embodiment described above can be obtained.

Tenth Modification Example of First Embodiment

Next, a tenth modification example of the first embodiment will be described. FIG. 27 is a schematic diagram illustrating two tracks STRk and STR(k+1) in the first zone Zu of a magnetic disk device 1 according to the tenth modification example. The magnetic disk device 1 is configured similarly to the magnetic disk device 1 of the first embodiment except for a configuration to be described in the tenth modification example.

In FIG. 27, for convenience of description, each track STR is illustrated in a rectangular shape. Furthermore, in FIG. 27, the servo region of each track STR is omitted. In the drawing, in the sector SC0, the sector SC1, the sector SC2, the sector SC3, the sector SC4, and the parity sector SCP0, hatching diagonally rising to the right is applied to regions indicating a plurality of the segments SEa, a dot pattern is applied to regions indicating a plurality of the segments SEb, and horizontal hatching is applied to regions indicating a plurality of segments SEc. Furthermore, outer peripheral edges of regions indicating the segment SEP0a, the segment SEP0b, the segment SEP0c, the segment SEP1a, the segment SEP1b, and a segment SEP1c are indicated by thick lines.

As illustrated in FIG. 27, each sector SC is divided into three instead of two. Each sector SC includes a segment SEa corresponding to a first one-third thereof, a segment SEb corresponding to a second one-third thereof, and a segment SEc corresponding to a third one-third thereof.

The track STRk includes 12 segments of a segment SE0a, a segment SE1a, a segment SE2a, a segment SE3a, a segment SE4a, a segment SEP0a, a segment SE5a, a segment SE6a, a segment SE7a, a segment SE8a, a segment SE9a, and a segment SEP1a.

The track STR(k+1) includes 12 segments of a segment SE0b, a segment SE1b, a segment SE2b, a segment SE3b, a segment SE4b, a segment SEP0b, a segment SE5b, a segment SE6b, a segment SE7b, a segment SE8b, a segment SE9b, and a segment SEP1b.

The track STR(k+2) includes 12 segments of the segment SE0c, the segment SE1c, the segment SE2c, the segment SE3c, the segment SE4c, the segment SEP0c, the segment SE5c, the segment SE6c, the segment SE7c, the segment SE8c, the segment SE9c, and the segment SEP1c.

The data corresponding to the segment SEP0a of the parity sector SCP0 is generated by performing an XOR operation on the data corresponding to a plurality of the segments SE0a, SE1a, SE2a, SE3a, and SE4a. The data corresponding to the segment SEP0b of the parity sector SCP0 is generated by performing an XOR operation on the data corresponding to a plurality of the segments SE0b, SE1b, SE2b, SE3b, and SE4b. The data corresponding to the segment SEP0c of the parity sector SCP0 is generated by performing an XOR operation on the data corresponding to a plurality of segments SE0c, SE1c, SE2c, SE3c, and SE4c.

Even in the tenth modification example, the same effect as that of the first embodiment described above can be obtained.

Second Embodiment

Next, a second embodiment will be described. FIG. 28 is a block diagram illustrating a configuration of a part of a magnetic disk device 1 according to the second embodiment, and is a diagram illustrating a configuration of a read channel 4R. The magnetic disk device 1 is configured similarly to the magnetic disk device 1 of the first embodiment except for a configuration to be described in the second embodiment.

As illustrated in FIG. 28, the read channel 4R of the R/W channel 140 includes two-dimensional FIR filters 4R3c and 4R3d, a two-dimensional viterbi decoder 4R4, and an LDPC decoder 4R5 instead of the FIR filters 4R3a and 4R3b, the viterbi decoders 4R4a and 4R4b, and the LDPC decoders 4R5a and 4R5b. The data of the two tracks STRk and STR(k+1) can be simultaneously read by using the read channel 4R. The above-described "two-dimensional" means that data corresponding to two tracks can be processed simultaneously.

The two-dimensional FIR filter 4R3c functions as a first two-dimensional FIR filter and is connected to the ADCs 4R2a and 4R2b. The two-dimensional FIR filter 4R3c can perform first waveform equalization processing of equalizing a waveform of synthesis data obtained by synthesizing a first read signal read by the read head RHD1 and a second read signal read by the read head RHD2 such that an error rate (BER) of data written to the track STRk is minimized, and can output first waveform equalization data that is a result obtained by performing the first waveform equalization processing on the synthesis data.

The two-dimensional FIR filter 4R3d functions as a second two-dimensional FIR filter and is connected to the ADCs 4R2a and 4R2b. The two-dimensional FIR filter 4R3d can perform second waveform equalization processing of equalizing a waveform of synthesis data obtained by synthesizing a first read signal read by the read head RHD1 and a second read signal read by the read head RHD2 such that an error rate (BER) of data written to the track STR(k+1) is minimized, and can output second waveform equalization data that is a result obtained by performing the second waveform equalization processing on the synthesis data.

The read head RHD1 can read not only the data of the track STRk but also the data of the track STR(k+1). The read head RHD2 can read not only the data of the track STR(k+1) but also the data of the track STRk. Only the data of the track STRk can be extracted by performing subtraction processing of subtracting the second read signal from the first read signal by using the two-dimensional FIR filter 4R3c. Only the data of the track STR(k+1) can be extracted by performing subtraction processing of subtracting the first read signal from the second read signal by using the two-dimensional FIR filter 4R3d. A satisfactory BER can be obtained when the data is read with an inter track interference cancellation (ITIC) effect.

The two-dimensional viterbi decoder 4R4 is connected to the two-dimensional FIR filter 4R3c and the two-dimensional FIR filter 4R3d. The first waveform equalization data and the second waveform equalization data are input to the two-dimensional viterbi decoder 4R4. The two-dimensional viterbi decoder 4R4 can output the decoding data obtained by simultaneously decoding the first waveform equalization data and the second waveform equalization data. The internal operation of the two-dimensional viterbi decoder 4R4 can be performed by an algorithm considering two tracks STRk and STR(k+1). The signal average value, the noise variance value, and the tap coefficient of the noise whitening filter in the metric operation of the two-dimensional viterbi decoder 4R4 are held for each path metric considering two tracks, and are optimized such that the BER of each track is minimized.

The LDPC decoder 4R5 is connected to the two-dimensional viterbi decoder 4R4. The LDPC decoder 4R5 can execute decoding processing of the LDPC code on the decoding data input from the two-dimensional viterbi decoder 4R4.

Even in the second embodiment configured as above, the same effect as that of the first embodiment described above can be obtained. Then, the satisfactory BER can be obtained when the data is read.

Third Embodiment

Figure 29:
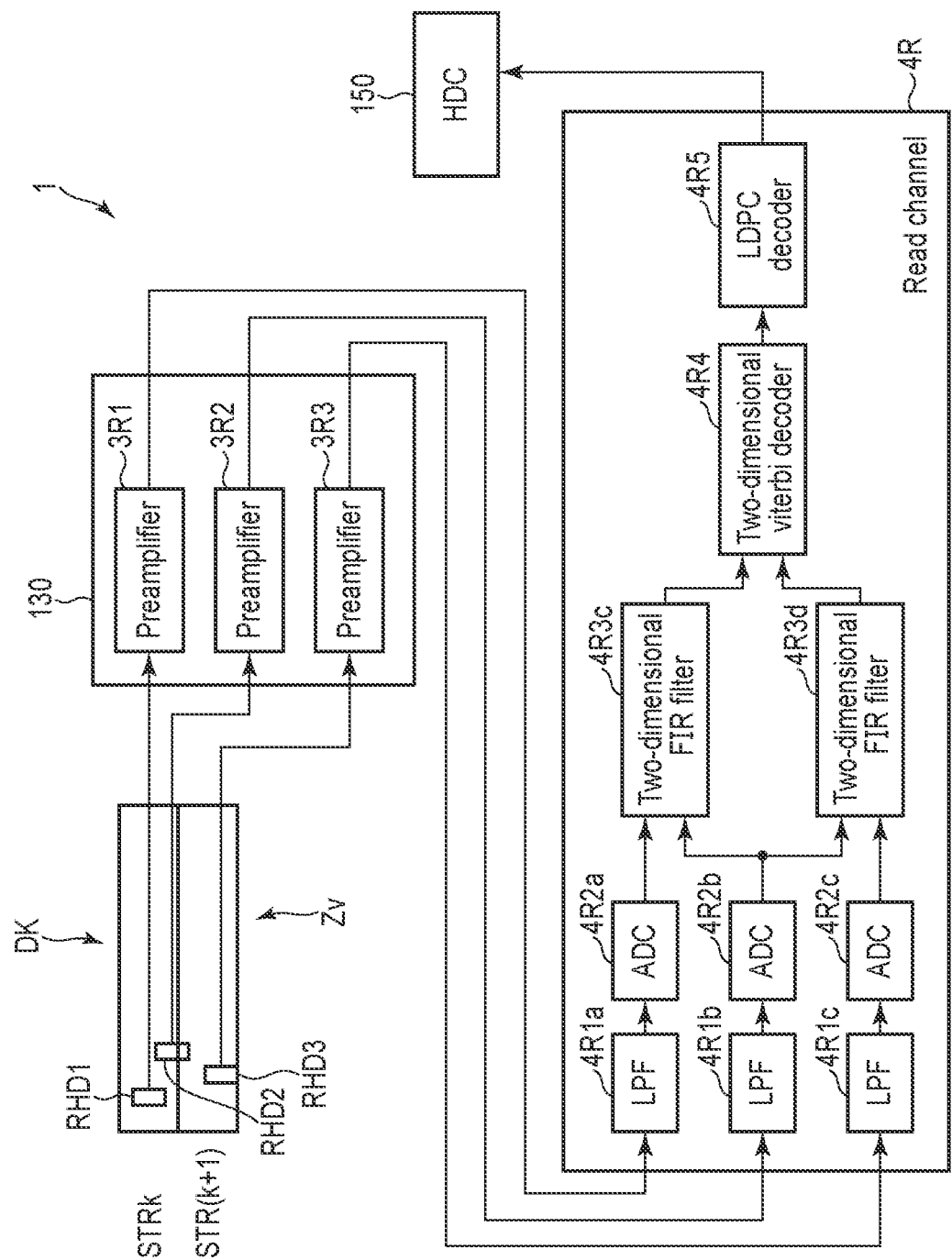
FIG. 29 is a block diagram illustrating a configuration of a part of a magnetic disk device according to a third embodiment, and is a diagram illustrating a configuration of a read channel.

Next, a third embodiment will be described. FIG. 29 is a block diagram illustrating a configuration of a part of a magnetic disk device 1 according to the third embodiment, and is a diagram illustrating a configuration of a read channel 4R. FIG. 30 is a plan view illustrating an example of a geometric arrangement of a write head WHD and three read heads RHD1, RHD2, and RHD3 in the third embodiment. The magnetic disk device 1 is configured similarly to the magnetic disk device 1 of the second embodiment except for a configuration to be described in the third embodiment.

As illustrated in FIGS. 29 and 30, a third zone Zv is located in a third data region between the first data region (first zone Zu) and the second data region (second zone Zw) in the recording layer L of the disk DK in the radial direction d1.

The head HD includes three read heads RHD1, RHD2, and RHD3 that read data from the recording layer L of the disk DK. The positions of the read heads RHD1, RHD2, and RHD3 are shifted from each other in the seek direction. The read head RHD1 functions as a first read head, the read head RHD2 functions as a second read head, the read head RHD3 functions as a third read head. The head HD may include four or more read heads RHD. For example, the read heads RHD1, RHD2, and RHD3 can simultaneously read the data corresponding to two tracks STRk and STR(k+1) in the third zone Zv. The read heads RHD1, RHD2, and RHD3 and the write head WHD are supported by an arm 30.

When the data corresponding to the tracks STRk and STR(k+1) are simultaneously read, the read processing unit 63 can drive the VCM 24, control seek operation of seeking the read heads RHD1, RHD2, and RHD3, and move the read head RHD1 to a position facing the track STRk. For example, the barycenter (geometric center) RC1 of the read head RHD1 is positioned at the track center STC of the track STRk.

In the third zone Zv, the skew angle of the read head RHD1 increases, and the data of the track STR(k+1) may not be sufficiently read by the read head RHD2. Then, the data of the track STR(k+1) can be read using the read head RHD3. The barycenter RC3 of the read head RHD3 is closer to the track center STC of the track STR(k+1) than the barycenter RC2 of the read head RHD2. The data of the track STRk can be read by the read head RHD1 and the read head RHD2, and the data of the track STR(k+1) can be read by the read head RHD3 and the read head RHD2. The write head WHD has a barycenter WC.

The read channel 4R further includes an LPF 4R1c and an ADC 4R2c. The LPF 4R1c is connected to the read head RHD3 of the head HD via a preamplifier 3R3 of the head amplifier IC 130. The LPF 4R1c can remove noise included in a third read signal read by the read head RHD3 and amplified by the preamplifier 3R3. The ADC 4R2c is connected to the LPF 4R1c and can convert the third read signal into a digital signal.

The two-dimensional FIR filter 4R3c is connected to the ADCs 4R2a and 4R2b. The two-dimensional FIR filter 4R3c can perform first waveform equalization processing of equalizing a waveform of first synthesis data obtained by synthesizing a first read signal read by the read head RHD1 and a second read signal read by the read head RHD2 such that an error rate (BER) of data written to the track STRk is minimized, and can output first waveform equalization data that is a result obtained by performing the first waveform equalization processing on the first synthesis data.

The two-dimensional FIR filter 4R3d is connected to the ADCs 4R2c and 4R2b. The two-dimensional FIR filter 4R3d can perform second waveform equalization processing of equalizing a waveform of second synthesis data obtained by synthesizing the second read signal read by the read head RHD2 and the third read signal read by the read head RHD3 such that an error rate (BER) of data written to the track STR(k+1) is minimized, and can output second waveform equalization data that is a result obtained by performing the second waveform equalization processing on the second synthesis data.

Even in the third embodiment configured as above, the same effect as that of the first embodiment described above can be obtained. The magnetic disk device 1 includes three read heads RHD1, RHD2, and RHD3. Even when the third data region (third zone Zv) in which the skew angle of the read head RHD1 increases exists in the recording layer L of the disk DK, data corresponding to two tracks can be simultaneously read by using the read heads RHD1, RHD2, and RHD3.

Fourth Embodiment

Next, a fourth embodiment will be described. FIG. 31 is a block diagram illustrating a configuration of a part of a magnetic disk device 1 according to the fourth embodiment, and is a diagram illustrating a configuration of a read channel 4R. The magnetic disk device 1 is configured similarly to the magnetic disk device 1 of the third embodiment except for a configuration to be described in the fourth embodiment.

As illustrated in FIG. 31, the head amplifier IC 130 includes a selection circuit 3Ra instead of the preamplifier 3R3. The read channel 4R does not include the LPF 4R1c and the ADC 4R2c. The read heads RHD1, RHD2, and RHD3 are connected to input terminals of the selection circuit 3Ra, and the preamplifiers 3R1 and 3R2 are connected to output terminals of the selection circuit 3Ra. The selection circuit 3Ra is a three-input two-output circuit. The two-dimensional FIR filter 4R3c is connected to the ADCs 4R2a and 4R2b, and the two-dimensional FIR filter 4R3d is connected to the ADCs 4R2a and 4R2b.

When the data corresponding to the tracks STRk and STR(k+1) are simultaneously read, the read processing unit 63 can drive the VCM 24, control seek operation of seeking the read heads RHD1, RHD2, and RHD3, and move the read head RHD1 to a position facing the track STRk. For example, the barycenter RC1 of the read head RHD1 is positioned at the track center STC of the track STRk.

Subsequently, the read processing unit 63 selects a first selection read head that is the read head RHD1 and a second selection read head that is a read head closest to the track STR(k+1) of the read heads RHD2 and RHD3 according to the skew angle of the read head RHD1. In the present embodiment, the second selection read head is the read head RHD3.

The read processing unit 63 can simultaneously read the data of the segment SE of the track STRk and the data of the segment SE of the track STR(k+1) by using the first and second selection read heads (read heads RHD1 and RHD3). Two segments SE to be simultaneously read are adjacent to each other in the radial direction d1.

Even in the fourth embodiment configured as above, the same effect as that of the first embodiment described above can be obtained. In the magnetic disk device 1 and the read processing method, the read processing unit 63 can select two read heads from three read heads RHD1, RHD2, and RHD3 by controlling the drive of the selection circuit 3Ra. Since the read processing can be performed using two preamplifiers 3R1 and 3R2 instead of three preamplifiers, low power consumption can be achieved. Moreover, the use of electronic components such as large-scale integrated circuits (LSIs) can be reduced, which contributes to reduction in manufacturing cost.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the case where the write processing is performed on two consecutive tracks STRk and STR(k+1) in the radial direction d1 or the case where the write processing is performed on three consecutive tracks STRk, STR(k+1), and STR(k+2) has been described as an example, but the tracks to be subjected to the write processing may not be consecutive in the radial direction d1. For example, in the example of FIG. 8, the data may be written to the track STR(k+2) instead of the track STR(k+1). In the example of FIG. 27, the data may be written to the track STR(k+3) adjacent to the track STR(k+2) instead of the track STR(k+2).

Of two segments of the same sector SC, the track STR in which one segment is disposed and the track STR in which the other segment is disposed may be separated by 50 tracks in the radial direction d1. However, it is necessary to hold data of one segment in the volatile memory 70 at the time of the read processing. From the viewpoint of increasing the free capacity of the volatile memory 70, it is desirable that a plurality of the segments of the same sector SC are distributed in a plurality of the tracks STR consecutive in the radial direction d1.

It is desirable that a plurality of the segments of the same sector SC are adjacent and consecutive in the radial direction d1. A segment that is adversely affected by squeeze and a segment that is not adversely affected by squeeze can be paired. Therefore, the data quality of the sectors SC can be averaged. Then, since the occurrence of the read error can be reduced, the frequency of the ECC processing can be reduced.

The error correction unit 65 may not be provided outside the R/W channel 140. For example, the LDPC decoders 4R5a and 4R5b of the read channel 4R inside the R/W channel 140 may have a function of the error correction unit 65. In that case, the magnetic disk device 1 can be formed without the error correction unit 65.

The ECC processing (track ECC processing) using the parity may be performed not outside the R/W channel 140 but inside the R/W channel 140.

The read channel 4R illustrated in FIG. 32 further includes a volatile memory 4R6a, a parity generation unit 4R7a, a volatile memory 4R6b, and a parity generation unit 4R7b as compared with the read channel 4R illustrated in FIG. 10 (first embodiment).

The volatile memory 4R6a is connected between the LDPC decoder 4R5a and the HDC 150. The volatile memory 4R6a is a random access memory, herein, an SRAM. The parity generation unit 4R7a is connected to the volatile memory 4R6a. When the read processing unit 63 detects the error of the data read from the track STRk, the volatile memory 4R6a and the parity generation unit 4R7a can recover the data of the sector in which the read error has occurred by using the result obtained by performing an XOR operation on a sector group in which the read error has not occurred in the sector ECC of the track STRk.

The volatile memory 4R6b is connected between the LDPC decoder 4R5b and the HDC 150. The volatile memory 4R6b is a random access memory, herein, an SRAM. The parity generation unit 4R7b is connected to the volatile memory 4R6b. When the read processing unit 63 detects the error of the data read from the track STR(k+1), the volatile memory 4R6b and the parity generation unit 4R7b can recover the data of the sector in which the read error has occurred by using the result obtained by performing an XOR operation on a sector group in which the read error has not occurred in the sector ECC of the track STR(k+1).

The technology described above is not limited to a hybrid recording magnetic disk device, and may be applied to a shingled magnetic recording magnetic disk device or a conventional magnetic recording magnetic disk device.

What is claimed is:

1. A magnetic disk device comprising:
a disk that includes a plurality of data tracks including a first data track and a second data track in a recording layer;
a write head that writes data to the recording layer of the disk; and
a write processing unit that is capable of executing write processing of writing data to the recording layer,
the write processing unit
executing first write processing of writing data to a first segment constituting a part of a first data sector in the first data track,
executing second write processing of writing data to the first segment constituting a part of a second data sector in the first data track after the first write processing is executed, and
executing third write processing of writing data to a second segment constituting a part of the first data sector in the second data track after the second write processing is executed.

2. The magnetic disk device according to claim 1, wherein the write head is used for writing data to the first data track and writing data to the second data track.

3. The magnetic disk device according to claim 2, further comprising:
an arm that supports the write head; and
an actuator that moves the arm,
wherein
the write processing unit
drives the actuator and controls seek operation of seeking the write head,
moves the write head to a position facing the first data track by the seek operation when executing the first write processing,
maintains a state in which the write head faces the first data track when executing the second write processing, and
moves the write head to a position facing the second data track by the seek operation when executing the third write processing.

4. The magnetic disk device according to claim 1, further comprising:
a write channel including a data processing unit that processes received data and a first memory that includes a first storage region and a second storage region and to which the data processed by the data processing unit is written; and a second memory to which the data processed by the data processing unit is written,
wherein
the write processing unit
executes the first write processing after data corresponding to the first segment of the first data sector is written to the first storage region and data corresponding to the second segment of the first data sector is written to the second storage region, and
holds the data in the second storage region or moves the data from the second storage region to the second memory until the third write processing is executed after the data is written to the second storage region.

5. The magnetic disk device according to claim 4, wherein the first memory is a random access memory, and
the write processing unit
releases the first storage region of the first memory and permits overwriting to the first storage region after executing the first write processing,
prohibits overwriting to the second storage region in a case where the data is held in the second storage region, and
permits the overwriting to the second storage region in a case where the data is moved from the second storage region to the second memory.

6. The magnetic disk device according to claim 4, wherein the data processing unit executes processing of encoding the received data.

7. The magnetic disk device according to claim 1, further comprising:
a write channel including a data processing unit that processes received data and a first memory to which the data processed by the data processing unit is written; and
a second memory that includes a first recording region and a second recording region and to which the data processed by the data processing unit is written,
wherein
the write processing unit
executes the first write processing after data corresponding to the first segment of the first data sector is written to the first recording region, data corresponding to the second segment of the first data sector is written to the second recording region, and the data is moved from the first recording region to the first memory, and
holds the data in the second recording region until the third write processing is executed after the data is written to the second recording region.

8. The magnetic disk device according to claim 7, wherein the second memory is a random access memory, and
the write processing unit
releases the first recording region of the second memory and permits overwriting to the first recording region after executing the first write processing, and
prohibits overwriting to the second recording region until the third write processing is executed after the data is written to the second recording region.

9. The magnetic disk device according to claim 1, further comprising:
a write channel including a data processing unit that processes received data and a first memory to which the data processed by the data processing unit is written; and
a second memory that has recording capacity with which data corresponding to at least two data tracks of the data tracks are capable of being recorded and to which the data processed by the data processing unit is written, wherein the write processing unit causes the write channel to process data corresponding to the first and second data tracks, writes the data corresponding to the first and second data tracks, which are processed by the write channel, to the second memory, and starts the data write processing on the first and second data tracks after the data corresponding to the first and second data tracks are stored in the second memory.

10. The magnetic disk device according to claim 9, wherein the write processing unit moves the data corresponding to the first data track from the second memory to the first memory and executes first sequential write processing of sequentially writing the data corresponding to the first data track to a plurality of the first segments of the first data track after the data corresponding to the first and second data tracks are stored in the second memory, the data corresponding to the first data track includes the data corresponding to the first segment of the first data sector and the data corresponding to the first segment of the second data sector, each of the first segments constitutes a part of a corresponding data sector among a plurality of the data sectors, and all the segments constituting the corresponding data sector are not allocated to the first data track.

11. The magnetic disk device according to claim 10, wherein the write processing unit executes the first sequential write processing and then executes second sequential write processing of sequentially writing the data corresponding to the second data track to a plurality of the second segments of the second data track after moving the data corresponding to the first and second data tracks from the second memory to the first memory, the data corresponding to the second data track includes the data corresponding to the second segment of the first data sector and the data corresponding to the second segment constituting a part of the second data sector, each of the second segments constitutes a part of the corresponding data sector, and all the segments constituting the corresponding data sector are not allocated to the second data track.

12. The magnetic disk device according to claim 11, wherein each of the data sectors is divided into the first segment and the second segment.

13. The magnetic disk device according to claim 11, wherein the write processing unit stores the data corresponding to the first data track in a plurality of regions to which a plurality of first addresses are allocated in the second memory and sequentially links the first addresses when storing the data corresponding to the first data track in the second memory, stores the data corresponding to the second data track in a plurality of regions to which a plurality of second addresses are allocated in the second memory and sequentially links the second addresses when storing the data corresponding to the second data track in the second memory, selects the first addresses in an order of the linked first addresses, sequentially moves data of the selected first addresses from the second memory to the first memory, and sequentially writes the data corresponding to the first data track to the first segments of the first data track in an order of moving the data from the second memory to the first memory when executing the first sequential write processing, and selects the second addresses in an order of the linked second addresses, sequentially moves data of the selected second addresses from the second memory to the first memory, and sequentially writes the data corresponding to the second data track to the second segments of the second data track in an order of moving the data from the second memory to the first memory when executing the second sequential write processing.

14. The magnetic disk device according to claim 1, further comprising a write channel including a data processing unit that processes received data, a parity generation unit that performs an XOR operation on the data processed by the data processing unit, and a first memory that includes a third storage region and a fourth storage region and to which the data processed by the data processing unit and the data subjected to the XOR operation by the parity generation unit are written, wherein a plurality of sectors allocated across the first and second data tracks include a plurality of data sectors including the first data sector and the second data sector, and belonging to a group, and a parity sector in which a parity for recovering data of the data sectors belonging to the group is recorded, and each of the sectors is constituted by a first segment and a second segment, the data processing unit processes the data corresponding to the data sectors belonging to the group and writes the processed data to the first memory, and the parity generation unit performs an XOR operation on data corresponding to a plurality of first segments belonging to the group among the data processed by the data processing unit, generates data corresponding to the first segment of the parity sector, and writes the data to the third storage region, and performs the XOR operation on data corresponding to a plurality of second segments belonging to the group among the data processed by the data processing unit, generates data corresponding to the second segment of the parity sector, and writes the data to the fourth storage region.

15. The magnetic disk device according to claim 14, wherein when the parity generation unit generates data corresponding to the parity sector and writes the data to the first memory, after the data processing unit processes the data corresponding to the first data sector, the parity generation unit performs the XOR operation on the data corresponding to the first segment of the first data sector, generates a part of data corresponding to the first segment of the parity sector, and writes the data to the third storage region, and subsequently performs the XOR operation on the data corresponding to the second segment of the first data sector, generates a part of data corresponding to the second segment of the parity sector, and writes the data to the fourth storage region.

16. The magnetic disk device according to claim 14, wherein in a case where the data corresponding to the second segment of the parity sector is written to the first or second data track before the data corresponding to all the second segments belonging to the group are written to at least one of the first data track or the second data track, the parity generation unit performs the XOR operation on the data corresponding to all the second segments belonging to the group and completes the data corresponding to the second segment of the parity sector in advance.

17. The magnetic disk device according to claim 1, wherein the data tracks further include a third data track,
the first and second data tracks are provided in a first data region of the recording layer,
the third data track is provided in a second data region of the recording layer, the second data region being located to be shifted from the first data region in a radial direction, and
all of third data sectors are allocated to the third data track.

18. A magnetic disk device comprising:

a disk that includes a plurality of data tracks including a first data track and a second data track in a recording layer;
a first read head, a second read head, and a third read head that each reads data from the recording layer of the disk;
an arm that supports the first to third read heads;
an actuator that moves the arm; and
a read processing unit that is capable of executing read processing of reading data from the recording layer,
the first data track including a first segment constituting a part of a first data sector,
the second data track including a second segment that constitutes a part of the first data sector and being adjacent to the first segment in a radial direction, and
the read processing unit
driving the actuator and controlling seek operation of seeking the first to third read heads to move the first read head to a position facing the first data track,
selecting a first selection read head that is the first read head and a second selection read head that is a read head closest to the second data track of the second and third read heads according to a skew angle of the first read head, and
simultaneously reading data corresponding to the first segment of the first data track and data corresponding to the second segment of the second data track by using the first and second selection read heads.

19. The magnetic disk device according to claim 18, further comprising a read channel that includes a first two-dimensional FIR filter and a second two-dimensional FIR filter,
wherein
the first two-dimensional FIR filter performs first waveform equalization processing of equalizing a waveform of synthesis data obtained by synthesizing a first read signal read by the first selection read head and a second read signal read by the second selection read head such that an error rate of data written to the first data track is minimized, and outputs first waveform equalization data, and
the second two-dimensional FIR filter performs second waveform equalization processing of equalizing the waveform of the synthesis data such that an error rate of data written to the second data track is minimized, and outputs second waveform equalization data.

20. The magnetic disk device according to claim 19, wherein the read channel further includes a two-dimensional viterbi decoder that outputs decoding data obtained by simultaneously decoding the first waveform equalization data and the second waveform equalization data.

* * * * *